(12) United States Patent
Goff

(10) Patent No.: US 9,821,867 B2
(45) Date of Patent: Nov. 21, 2017

(54) BICYCLE SEAT

(71) Applicant: Jared S. Goff, St. George, UT (US)

(72) Inventor: Jared S. Goff, St. George, UT (US)

(*) Notice: Subject to any disclaimer, the term of this patent is extended or adjusted under 35 U.S.C. 154(b) by 99 days.

(21) Appl. No.: 15/042,110

(22) Filed: Feb. 11, 2016

(65) Prior Publication Data

US 2017/0233020 A1 Aug. 17, 2017

(51) Int. Cl.
| | | |
|---|---|---|
| B60N 2/38 | (2006.01) | |
| B62J 1/00 | (2006.01) | |
| B62J 1/18 | (2006.01) | |
| B62J 1/10 | (2006.01) | |
| B62J 1/08 | (2006.01) | |
| B62J 1/02 | (2006.01) | |
| B62J 1/04 | (2006.01) | |

(52) U.S. Cl.
CPC ............... *B62J 1/005* (2013.01); *B62J 1/007* (2013.01); *B62J 1/08* (2013.01); *B62J 1/10* (2013.01); *B62J 1/18* (2013.01); *B62J 1/00* (2013.01); *B62J 1/002* (2013.01); *B62J 1/02* (2013.01); *B62J 1/04* (2013.01)

(58) Field of Classification Search
CPC ..... B62J 1/00; B62J 1/007; B62J 1/002; B62J 1/04; B62J 1/02; B62J 1/005
USPC .... 297/195.1, 215.13, 215.15, 215.16, 215.1
See application file for complete search history.

(56) References Cited

U.S. PATENT DOCUMENTS

| | | |
|---|---|---|
| 694,875 A | 3/1902 | Meighan |
| 3,897,101 A | 7/1975 | Hess |
| 4,176,880 A | 12/1979 | Marchello |
| 4,673,212 A | 6/1987 | Mayer |
| 4,877,286 A | 10/1989 | Hobson et al. |
| 5,123,698 A | 6/1992 | Hodges |
| 5,286,082 A * | 2/1994 | Hanson .................... B62J 1/007 297/195.1 |
| 5,641,203 A | 6/1997 | Van De Riet et al. |
| 5,725,274 A * | 3/1998 | Bergmeister ............. B62J 1/005 297/201 |

(Continued)

OTHER PUBLICATIONS

Hobson Asssociates, Inc., "The Shape of Better Biking", Copyright Notice Date 2015, 3 Pages.

(Continued)

*Primary Examiner* — Chi Q Nguyen
(74) *Attorney, Agent, or Firm* — Jared S. Goff; Goff Patent Law PLLC

(57) ABSTRACT

A bicycle seat can include an attachment structure configured to be secured to a bicycle frame. The seat can also include a support frame, which can include right and left arms extending laterally out on opposite sides of a vertically-oriented medial plane of the bicycle seat. The seat can include walls, which can include a front wall and a rear wall that extend up and laterally out from the attachment structure to support the right and left arms. Right and left seat pads can be selectively securable to the right and left arms, and can be adjusted between different positions relative to each other. Each seat pad can include a main pad portion that is secured to the corresponding arm and is configured to provide upward support to a corresponding ischium (sometimes referred to as the sit bone) of the rider, and an elongate extension that can extend laterally out and forward beyond the main pad portion.

8 Claims, 48 Drawing Sheets

(56) References Cited

U.S. PATENT DOCUMENTS

| | | | | |
|---|---|---|---|---|
| 5,823,618 A | * | 10/1998 | Fox | B62J 1/005 297/195.1 |
| 5,911,474 A | * | 6/1999 | Lee | B62J 1/002 297/201 |
| 5,938,278 A | | 8/1999 | Langevin | |
| 6,039,395 A | * | 3/2000 | Culbertson | B62J 1/002 297/195.1 |
| 6,068,333 A | | 5/2000 | Dixon | |
| 6,152,524 A | * | 11/2000 | Cox | B62J 1/002 297/201 |
| 6,209,954 B1 | | 4/2001 | Bombardier | |
| 6,264,279 B1 | | 7/2001 | Chow | |
| 6,357,825 B1 | * | 3/2002 | Bavaresco | B62J 1/002 297/201 |
| 6,402,235 B1 | * | 6/2002 | Letendre | B62J 1/005 297/195.1 |
| 6,488,334 B1 | | 12/2002 | Geyer et al. | |
| 6,554,355 B2 | | 4/2003 | Kaptur | |
| 6,575,529 B1 | * | 6/2003 | Yu | B62J 1/10 297/201 |
| 6,705,674 B1 | | 3/2004 | McMahan et al. | |
| 6,761,400 B2 | * | 7/2004 | Hobson | B62J 1/10 297/195.1 |
| 7,249,800 B2 | * | 7/2007 | Jalkanen | A47C 7/022 297/195.11 |
| 7,494,181 B2 | | 2/2009 | Tucker | |
| 7,661,756 B2 | * | 2/2010 | Chen | B62J 1/007 297/195.1 |
| 7,703,846 B2 | | 4/2010 | Geyer et al. | |
| 8,480,169 B2 | * | 7/2013 | Bailie | B62J 1/002 297/201 |
| 8,668,259 B2 | | 3/2014 | Ulrich | |
| 2004/0174051 A1 | * | 9/2004 | Scholz | B62J 1/005 297/195.1 |
| 2015/0251717 A1 | * | 9/2015 | Portz | B62J 1/005 297/201 |

OTHER PUBLICATIONS

"Hubby Green Machine Owner's Manual", Copyright Notice Date 2012, 32 Pages.

* cited by examiner

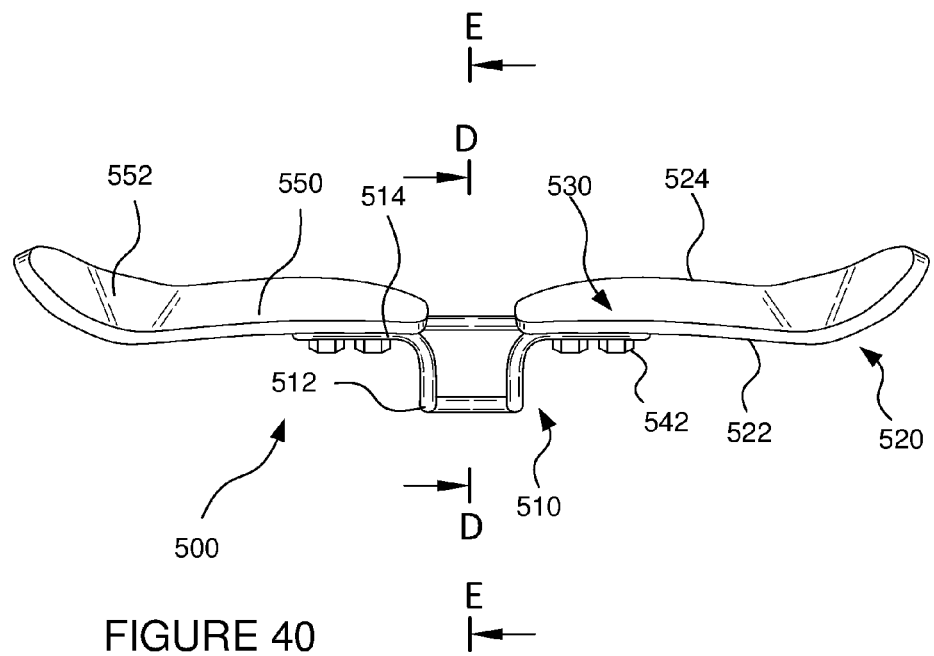
FIGURE 40
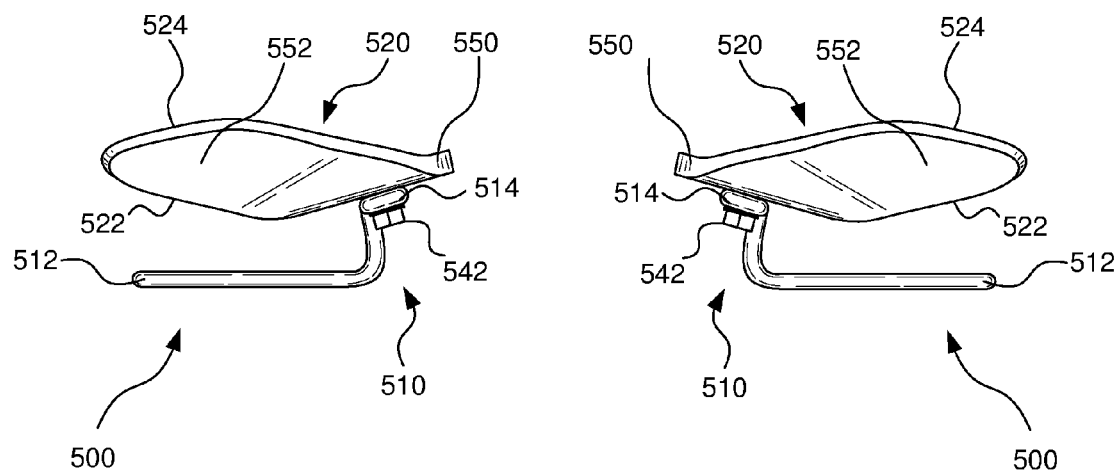
FIGURE 41
FIGURE 42

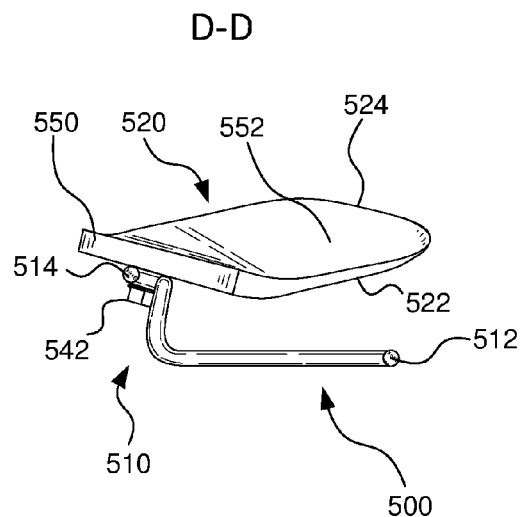
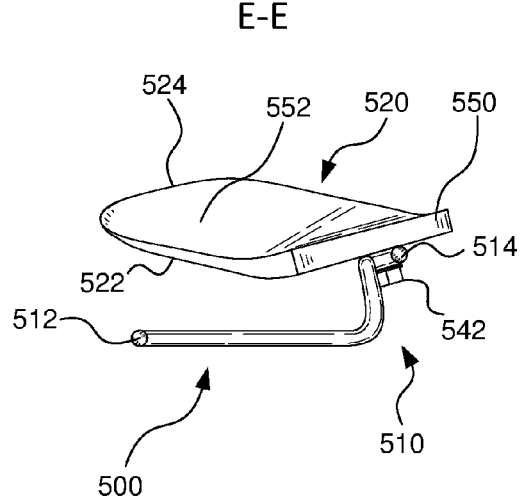
FIGURE 43    FIGURE 44
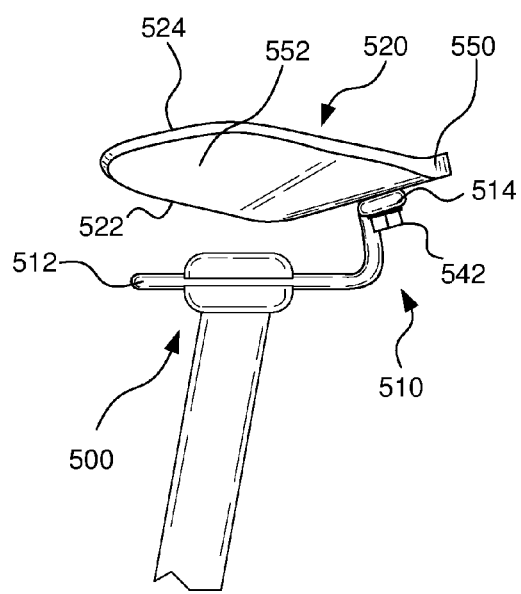
FIGURE 45

G-G

H-H

J-J

BICYCLE SEAT

BACKGROUND

Seats for bicycles have traditionally been shaped as saddles having a broad padded rear portion that narrows into a forward-protruding nose, with the nose extending between the rider's legs. The pressure that such noses can place on the sensitive tissue between the rider's legs has caused discomfort in many riders, and has generated concerns about the health effects of traditional bicycle seats. Such concerns have given rise to various different types of non-traditional bicycle seats. Some such seats have been saddles with cutouts in the center of the nose, with a split nose (where the seat has two protruding noses), and/or with a shortened nose. Some such seats have been provided with additional adjustability features, attempting to position the nose in a more optimal position between the rider's legs. Other non-traditional bicycle seats have eliminated the nose of the bicycle seat altogether, producing nose-less bicycle seats that do not have the traditional saddle shape.

SUMMARY

This disclosure describes various features of a non-traditional bicycle seat that can be combined in various ways to provide one or more of various benefits, such as providing a bicycle seat that is comfortable for a rider, that provides the rider with upward support, that provides the rider with lateral support, and/or that provides a features having aesthetically pleasing ornamental designs. The claims should not be limited to these benefits unless so stated in particular claims. Indeed, the features described herein may provide other benefits in addition to and/or instead of these benefits or others discussed herein.

In one aspect, a bicycle seat can include a support frame secured to an attachment structure that is configured to be attached to a bicycle frame of a bicycle; a right seat pad attached to the support frame; and a left seat pad attached to the support frame. The right seat pad can be adjusted to a right seat pad position, with the adjusting of the right seat pad comprising translating and/or rotating the right seat pad relative to the left seat pad, and the right seat pad position comprising a position wherein a right main pad portion of the right seat pad directly provides upward support to a rider's right ischium, and wherein a right extension of the right seat pad extends to the right and forward beyond the right main pad portion. The right seat pad can be secured to the support frame in the right seat pad position. The left seat pad can be adjusted to a left seat pad position. The adjusting of the left seat pad can include translating and/or rotating the left seat pad relative to the right seat pad. The left seat pad position can include a position wherein a left main pad portion of the left seat pad directly provides upward support to the rider's left ischium and wherein a left extension of the left seat pad extends to the left and forward beyond the left main pad portion. The left seat pad can be secured to the support frame in the left seat pad position.

A rider can be seated on the seat with the right seat pad in the right seat pad position and the left seat pad in the left seat pad position. Additionally, the following can be performed with the bicycle seat with the rider seated on the seat: the right main pad portion of the right seat pad providing upward support to the rider's right ischium; the right extension of the right seat pad extending to the right and forward beyond the right main pad portion, with the right extension applying a medial pressure against the rider's right coxal bone (such as directly applying such pressure or applying such pressure via an upper extremity of the rider's right femur bone); the left main pad portion of the left seat pad providing upward support to the rider's left ischium; and the left extension of the left seat pad extending to the left and forward beyond the left main pad portion, with the left extension applying a medial pressure against the rider's left coxal bone (such as directly applying such pressure or applying such pressure via an upper extremity of the rider's right femur bone).

In another aspect, a bicycle seat can include an attachment structure configured to be secured to a bicycle frame. The seat can also include a support frame, which can include the following: a plurality of walls extending upward from the attachment structure, the plurality of walls comprising a front wall extending upward and laterally out from the attachment structure and a rear wall located rearward of the front wall and extending laterally out from the attachment structure; a right arm supported by the walls and extending laterally to the right of a vertically-oriented medial plane of the bicycle seat; and a left arm supported by the walls and extending laterally to the left of the medial plane. A right seat pad can be selectively securable to the right arm, and a right adjustment mechanism can be movable to move the right seat pad between different positions relative to the right arm wherein the right seat pad can be selectively securable to the right arm. The seat can also include a left seat pad selectively securable to the left arm, and left adjustment mechanism being movable to move the left seat pad between different positions relative to the left arm wherein the left seat pad is selectively securable to the left arm.

In yet another aspect, a bicycle seat can include a support frame that includes an attachment structure that is configured to be attached to a bicycle frame of a bicycle; a right arm secured to the attachment structure and extending laterally to the right from a vertically-oriented medial plane of the bicycle seat; and a left arm secured to the attachment structure and extending laterally to the left from the medial plane. A right seat pad can be adjustably attached to the right arm, and the right seat pad can include a right main pad portion that is secured to the right arm and is configured to provide upward support to a rider's right ischium, and a right elongate extension that extends to the right and forward beyond the right main pad portion. The seat can also include a left seat pad adjustably attached to the left arm, the left seat pad comprising a left main pad portion that is secured to the right arm and is configured to provide upward support to a rider's left ischium, and a left elongate extension that extends to the left and forward beyond the left main pad portion.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

BRIEF DESCRIPTION OF THE DRAWINGS

FIG. 40 is a front view of the bicycle seat of FIG. 36.
FIG. 41 is a left side view of the bicycle seat of FIG. 36.
FIG. 42 is a right side view of the bicycle seat of FIG. 36.
FIG. 43 is a sectional view taken along line D-D of FIG. 40.
FIG. 44 is a sectional view taken along line E-E of FIG. 40.
FIG. 45 is a left side view of the bicycle seat of FIG. 36 mounted on a bicycle seat clamp and seat stem.

In FIG. 48 and subsequent figures, example ornamental bicycle seat designs are illustrated in solid lines, with dashed lines being excluded from the example design. In the illustrated designs, right and left side views are mirror images of each other.

DETAILED DESCRIPTION

Different embodiments of bicycle seats are discussed herein. The seats illustrated in the figures are nose-less seats, not having a nose portion extending between the rider's legs. For example, the bicycle seat may be configured so that it does not have a nose that extends between a rider's legs farther forward that the remainder of the seat that is positioned laterally outside of the nose. However, features discussed herein could be used with bicycle seats having noses in some situations.

In some embodiments, the bicycle seat can include a right and left main pad portions providing a rider with direct support in the area of the rider's traditional "sit bones" (the rider's ischium, such as at the ischial tuberosity, with the ischium being part of the rider's coxal bone otherwise known as the hip bone, as is discussed more below) via the flesh of the rider's buttocks. As used herein, pressure or support to a rider's bone is considered to be direct if it is applied through non-bone tissue, but is considered indirect if it is applied via another bone. The bicycle seat can also provide left and right extensions from the respective left and right main pad portions that extend laterally and forward from the main pad portions to providing lateral support to the rider with direct or indirect medial pressure (i.e., pressure having an inward or medial component) on the rider's coxal bone via the flesh of the rider's buttocks. The bicycle seat may be adjusted so that medial pressure is provided by the right and left extensions at the same time, such as pressure directly to the rider's coxal bone, and/or pressure to the rider's femur. Such a bicycle seat can provide a comfortable bicycle seat that supports the rider and assists the rider in the lateral control of the bicycle.

The disclosure herein may also describe features that can be useful for bicycle seats without such features. For example, the novel seat support structure discussed herein may be useful in supporting pads having features that are different from those illustrated and discussed herein. As an example, the support structure may be used with pads that are generally circular or some other similar shape without having laterally and forwardly extending extensions. Similarly, the seat pads discussed herein with laterally and forwardly extending extensions may be used with other support structures, which may or may not provide the adjustability features discussed herein.

Figure 1:
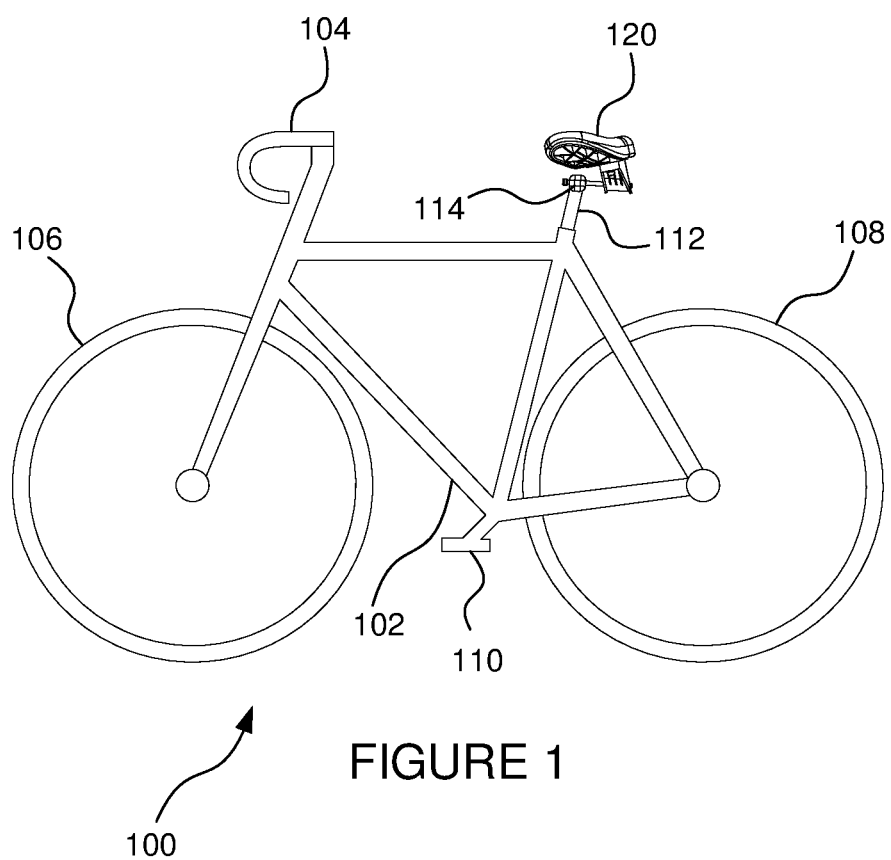
FIG. 1 is a side view of a bicycle including a bicycle seat.

Referring now to FIG. 1, a bicycle 100 is illustrated in simplified form. The bicycle 100 can include a frame 102, handlebars 104, a front wheel 106, a rear wheel 108, and pedals 110. The bicycle 100 can also include a seat stem 112 that extends up to a seat clamp 114, which secures a bicycle seat 120 to the seat stem 112, and thereby to the remainder of the bicycle 100. An imaginary vertically-oriented plane extends through the center of the bicycle—through the center of the front wheel 106, the center of the rear wheel 108, and the center of the frame 102 to divide the bicycle 100 into right and left halves. If the seat 120 is aligned straight with this vertically oriented plane, then the plane can be considered a medial plane of the seat 120, dividing the seat 120 into right and left halves. The left and right halves of the seat 120 can be mirror images of each other, although alternative designs may include differences in left and right sides, and left and right seat pads of the seat may be adjusted independently of each other so that the left and right seat pads may be positioned differently from each other. If a rider is seated on the seat 120 and is aligned straight with the seat 120, this medial plane of the seat 120 will coincide with a medial sagittal plane of the rider. As used herein, left and right will refer to the left and right sides of this medial plane, coinciding with left and right sides of the rider. Likewise, the term medial refers to going toward the medial plane, and lateral refers to going away from the medial plane. Forward refers to going in a forward direction (such as toward the handlebars 104 from the seat 120) with the seat 120 situated on a bicycle 100, and rearward refers to going in a rearward direction (such as toward the seat 120 from the handlebars 104) with the seat 120 situated on a bicycle 100.

General Description of Example Seat Structure

Figure 2:
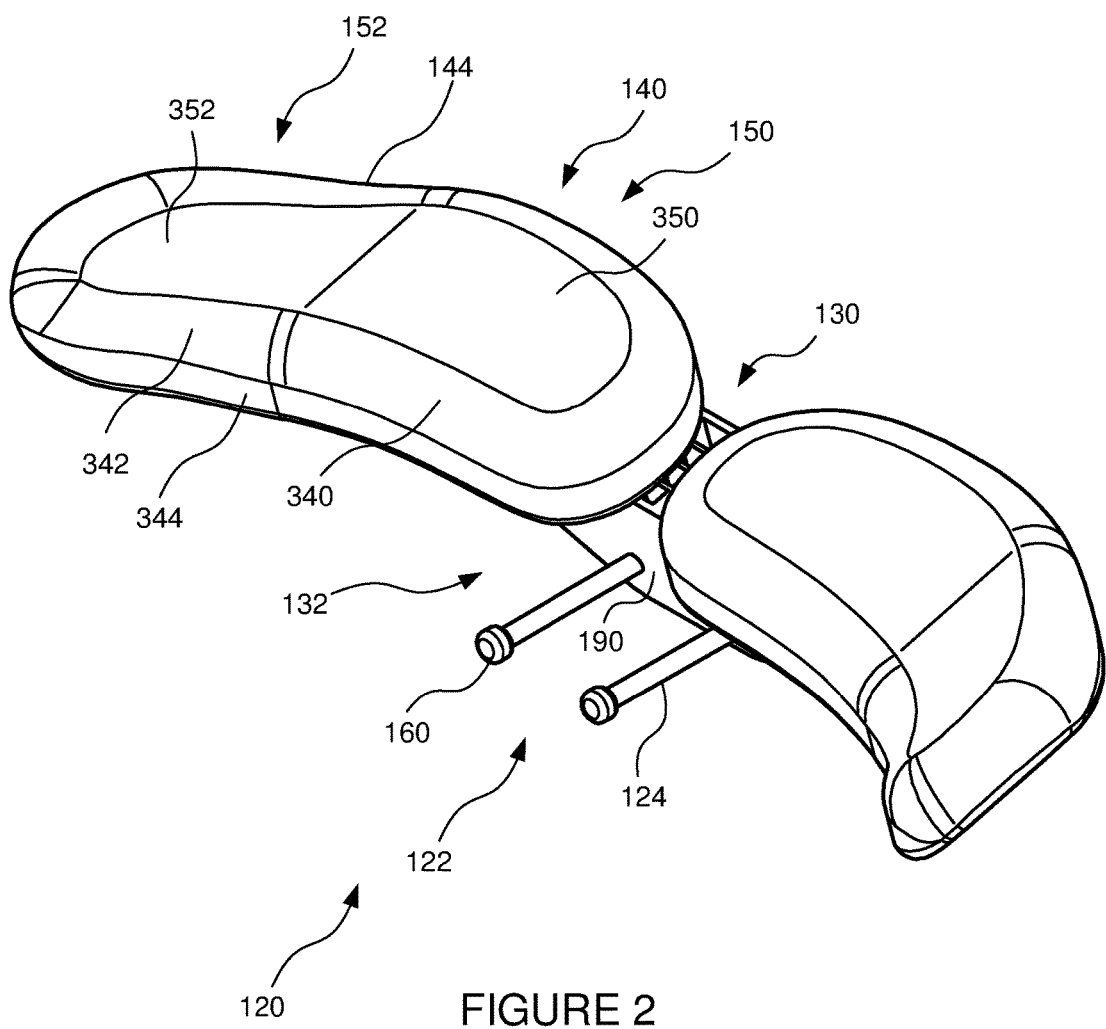
FIG. 2 is a front top perspective view of the bicycle seat of FIG. 1.
Figure 3:
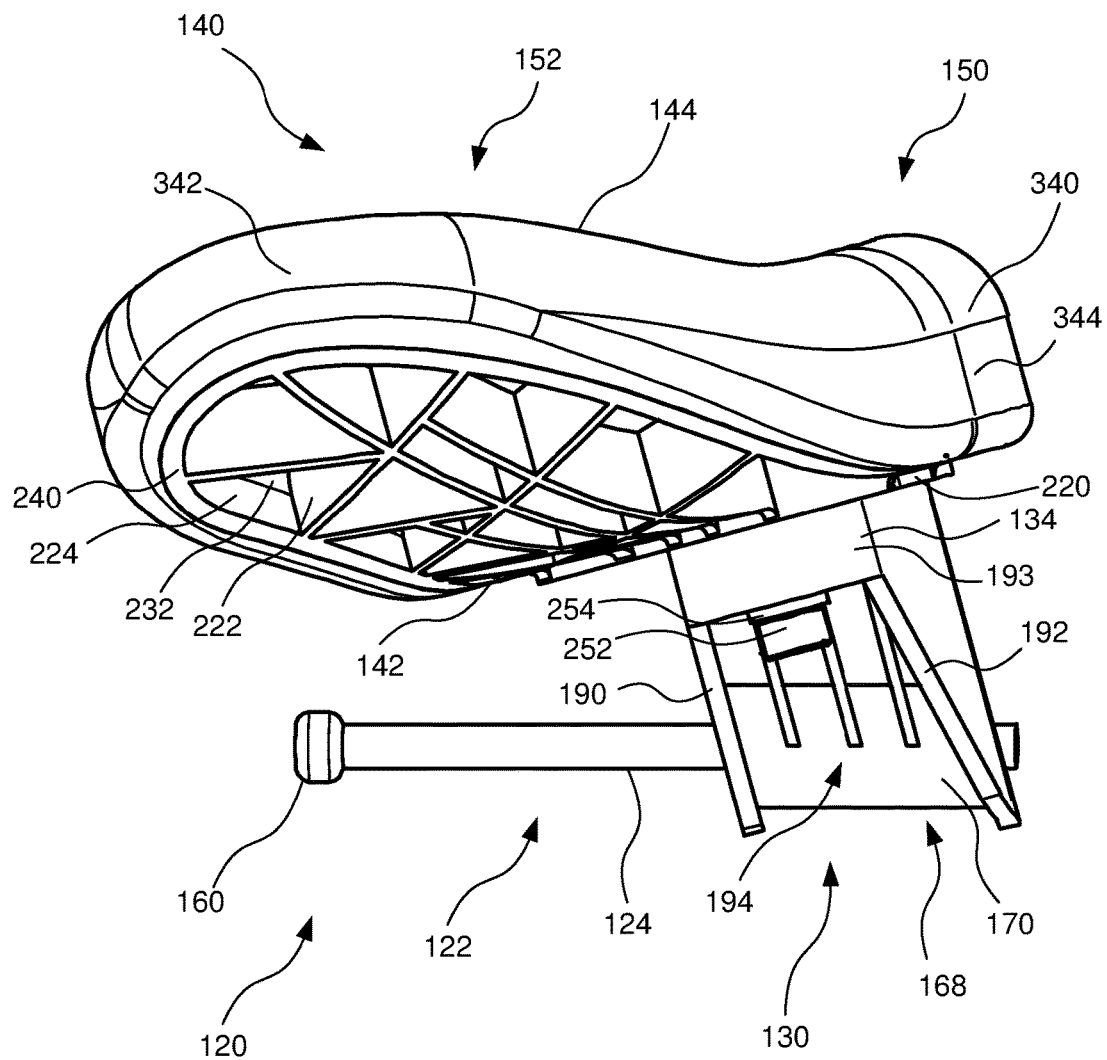
FIG. 3 is a left side view of the bicycle seat of FIG. 1.
Figure 4:
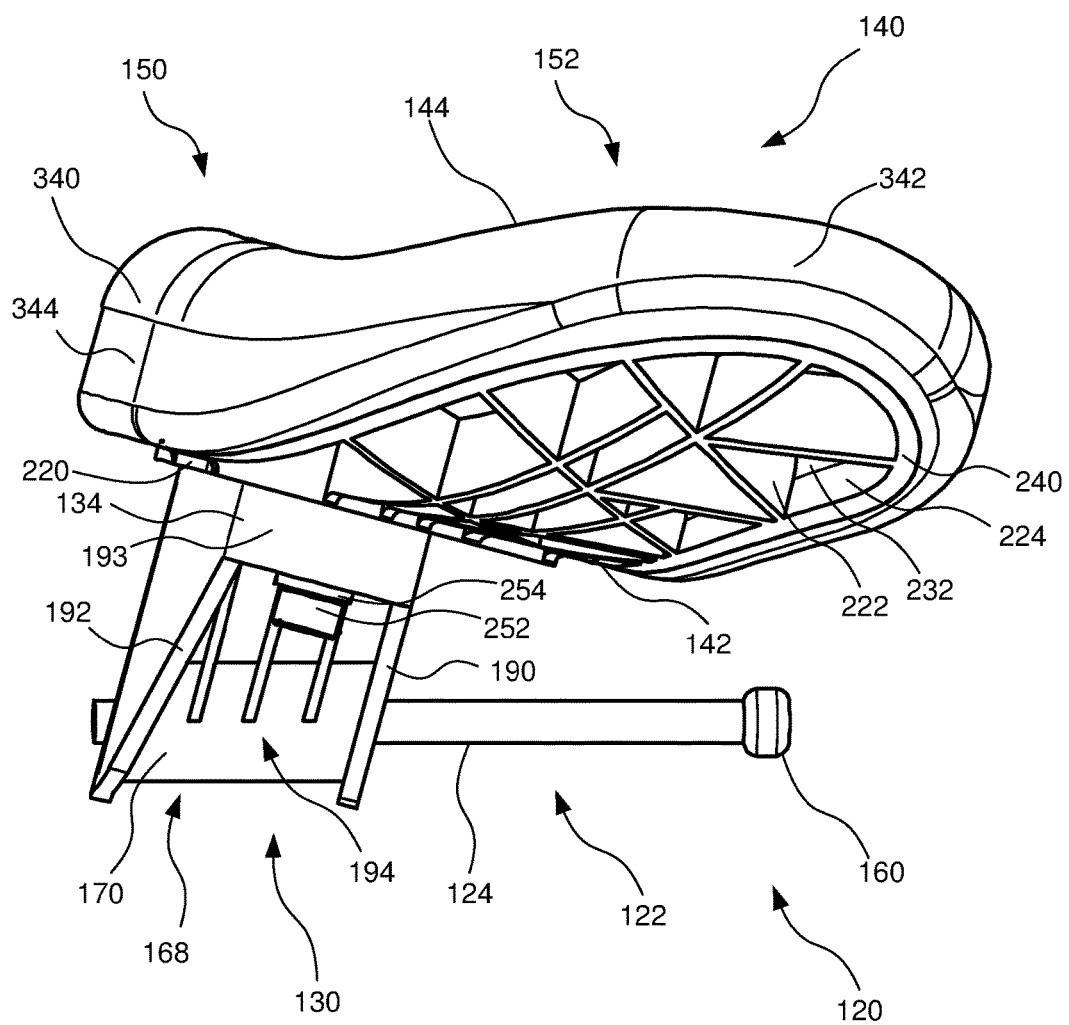
FIG. 4 is a right side view of the bicycle seat of FIG. 1.
Figure 5:
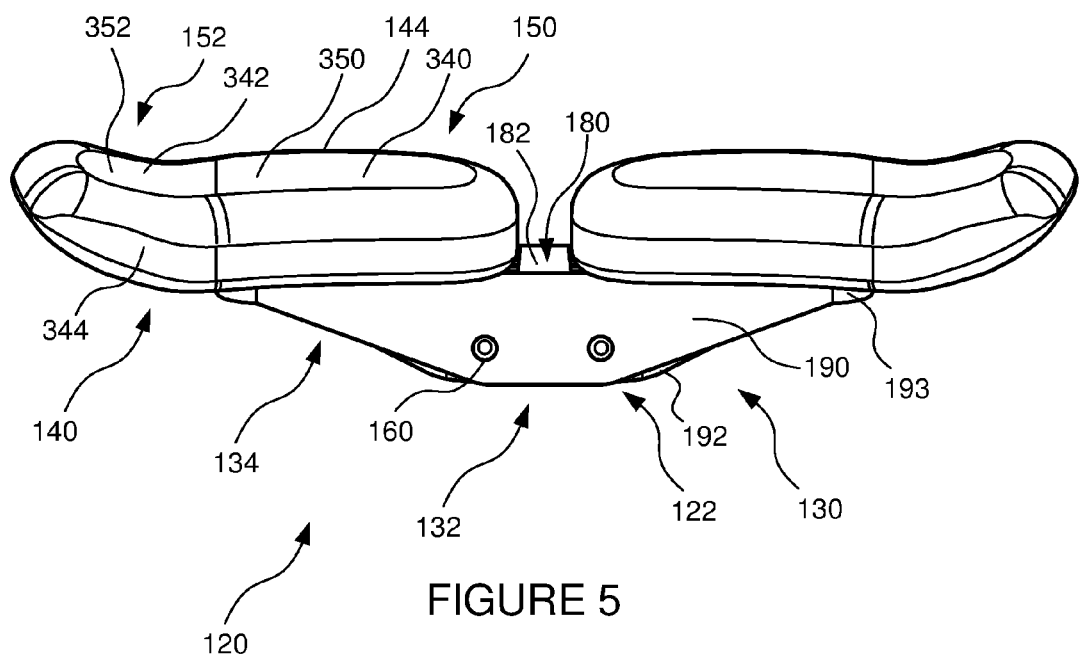
FIG. 5 is a front view of the bicycle seat of FIG. 1.
Figure 6:
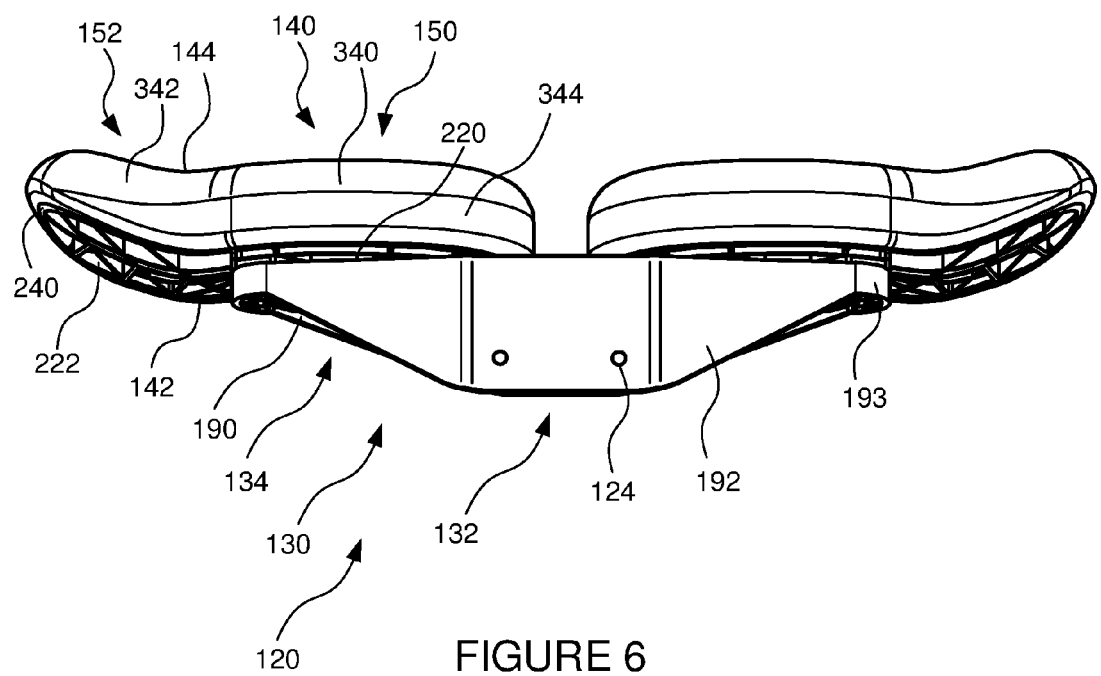
FIG. 6 is a rear view of the bicycle seat of FIG. 1.
Figure 7:
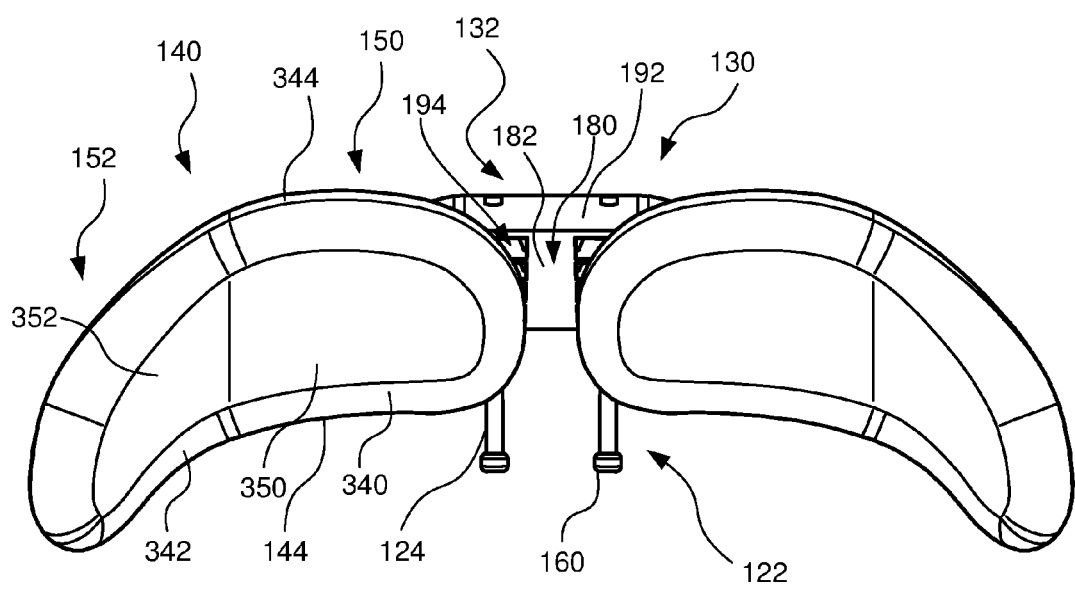
FIG. 7 is a top view of the bicycle seat of FIG. 1.
Figure 8:
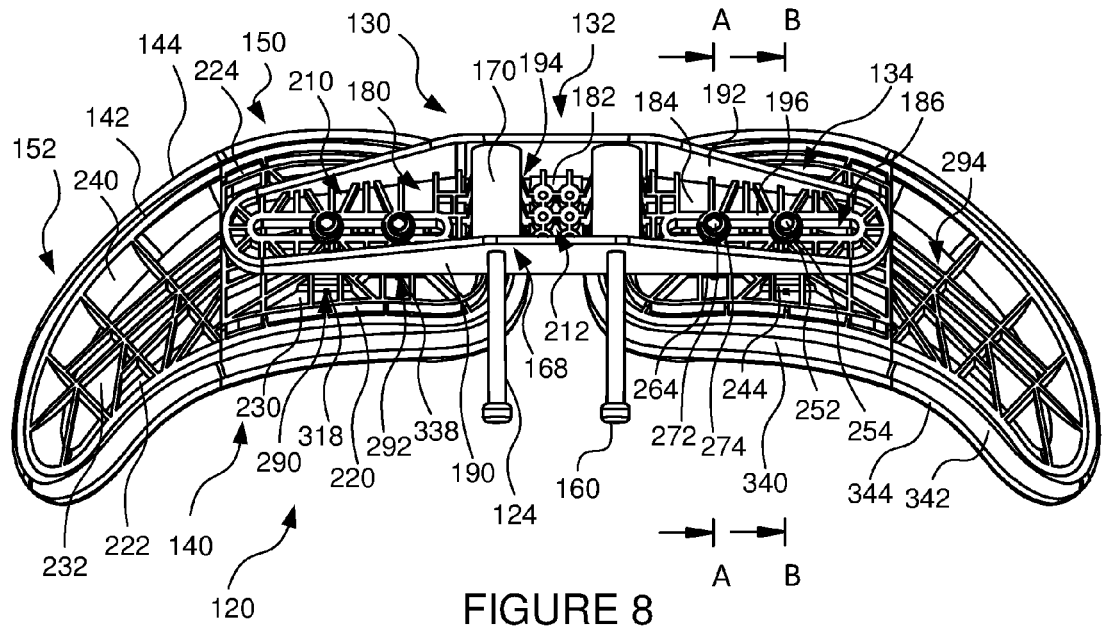
FIG. 8 is a bottom view of the bicycle seat of FIG. 1.
Figure 9:
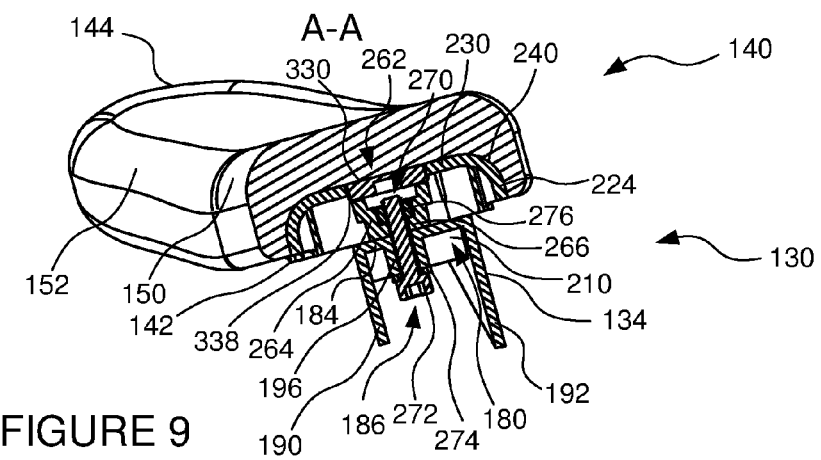
FIG. 9 is a section view taken along line A-A of FIG. 8.
Figure 10:
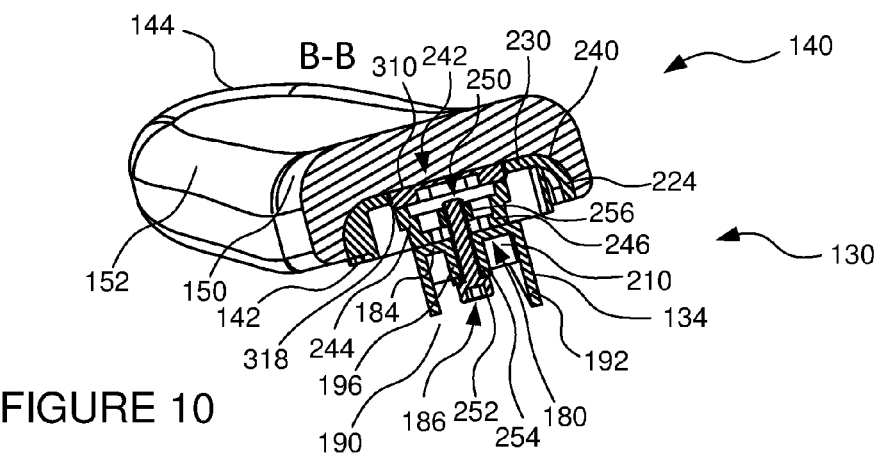
FIG. 10 is a section view taken along line B-B of FIG. 8.
Figure 11:
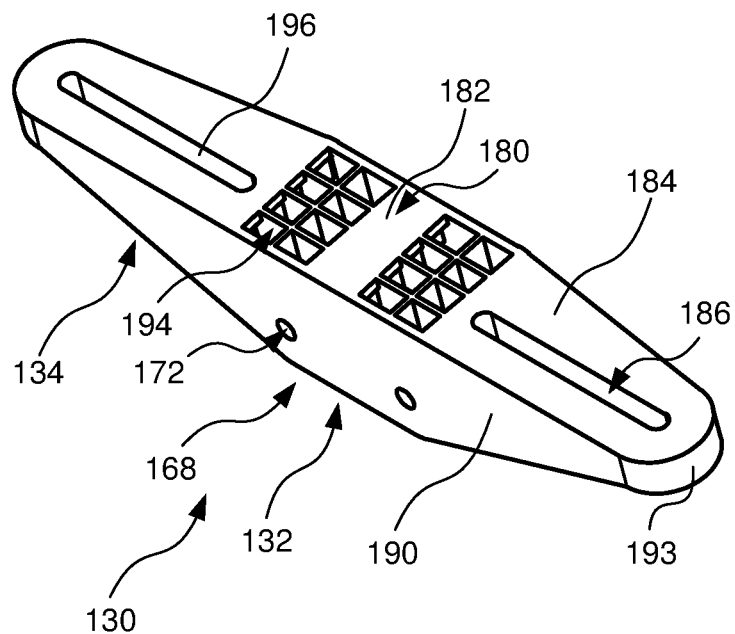
FIG. 11 is a front top perspective view of a support frame of the bicycle seat of FIG. 1.
Figure 12:
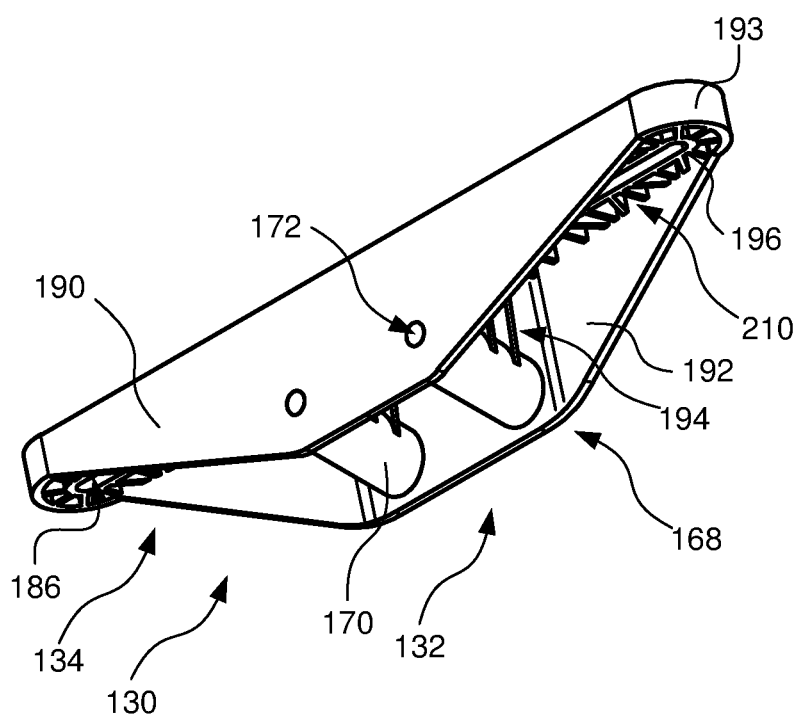
FIG. 12 is a front bottom perspective view of the support frame of FIG. 11.
Figure 13:
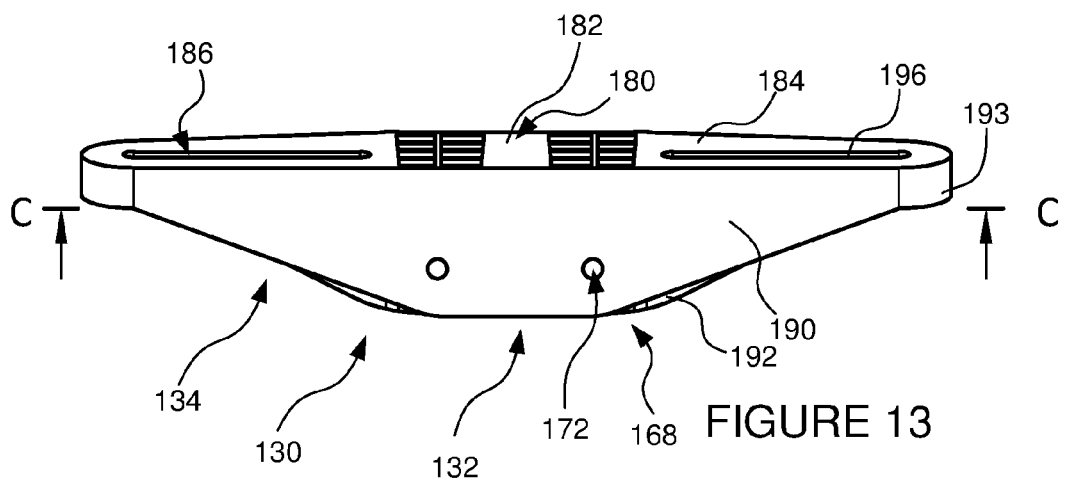
FIG. 13 is a front view of the support frame of FIG. 11.
Figure 14:
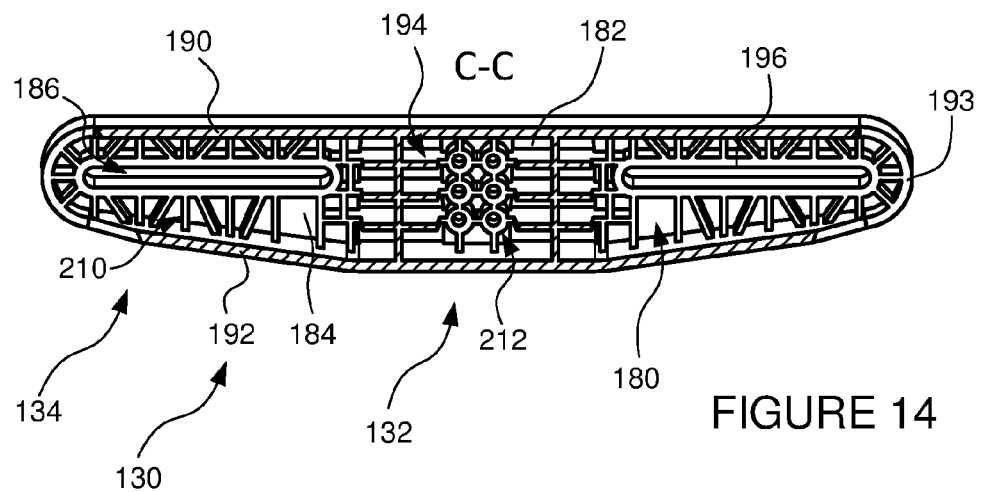
FIG. 14 is a section view taken along line C-C of FIG. 13.
Figure 15:
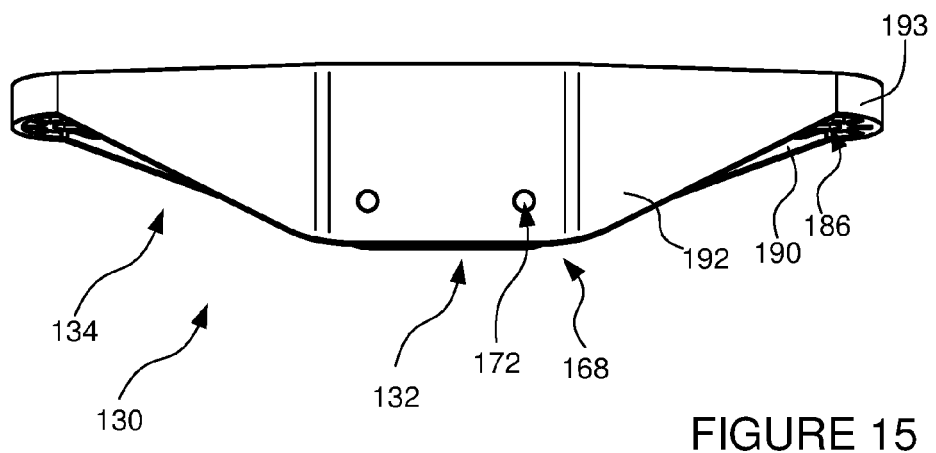
FIG. 15 is a rear view of the support frame of FIG. 11.
Figure 16:
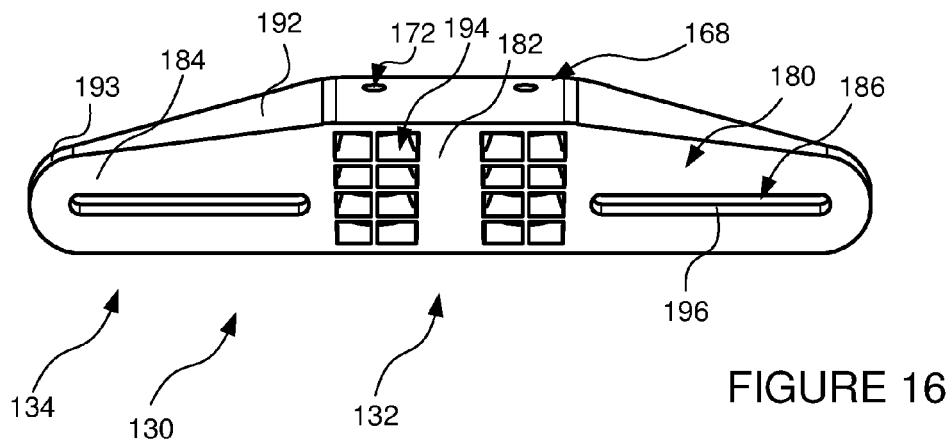
FIG. 16 is a top view of the support frame of FIG. 11.
Figure 17:
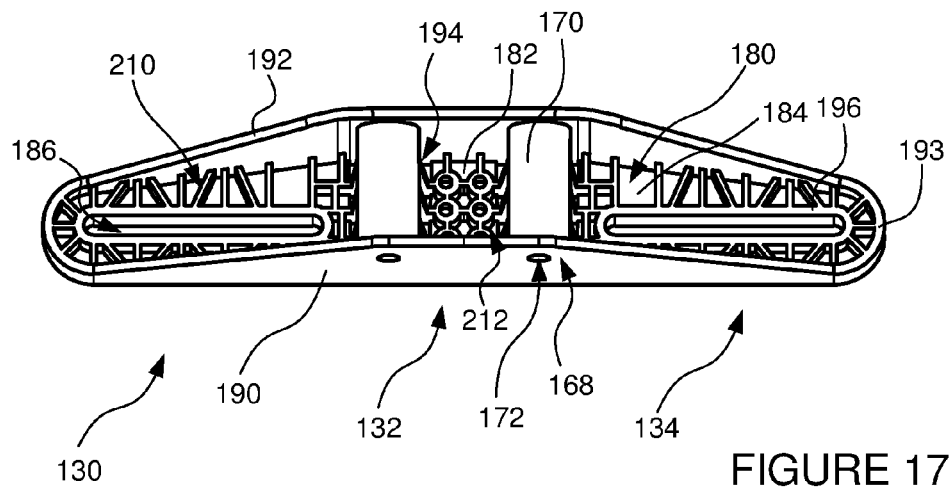
FIG. 17 is a bottom view of the support frame of FIG. 11.
Figures 18, 19:
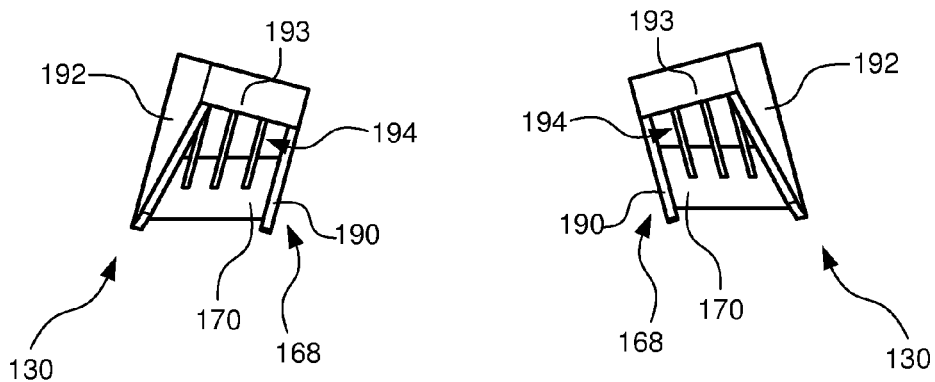
FIG. 18 is a right side view of the support frame of FIG. 11.
FIG. 19 is a left side view of the support frame of FIG. 11.
Figure 20:
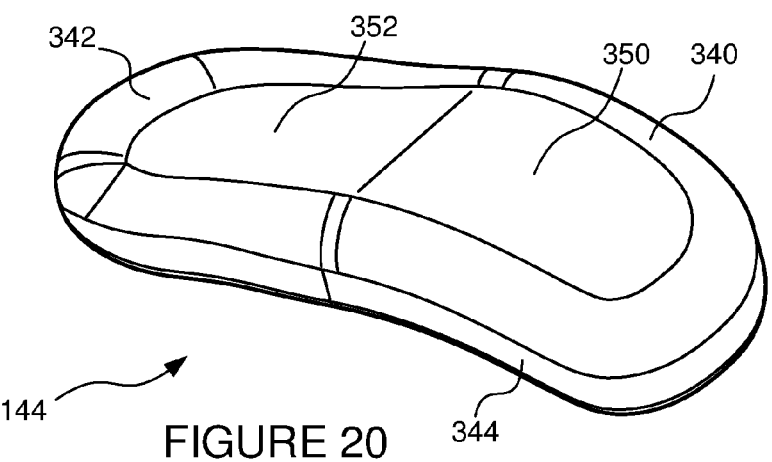
FIG. 20 is a top left perspective view of a right side seat cushion of the bicycle seat of FIG. 1. The left side seat cushion of the bicycle seat of FIG. 1 can be a mirror image of the right side seat cushion. Indeed, the entire bicycle seat of FIG. 1 can include right and left sides that can be mirror images of each other across the vertical medial plane extending through the middle of the bicycle of FIG. 1.
Figure 21:
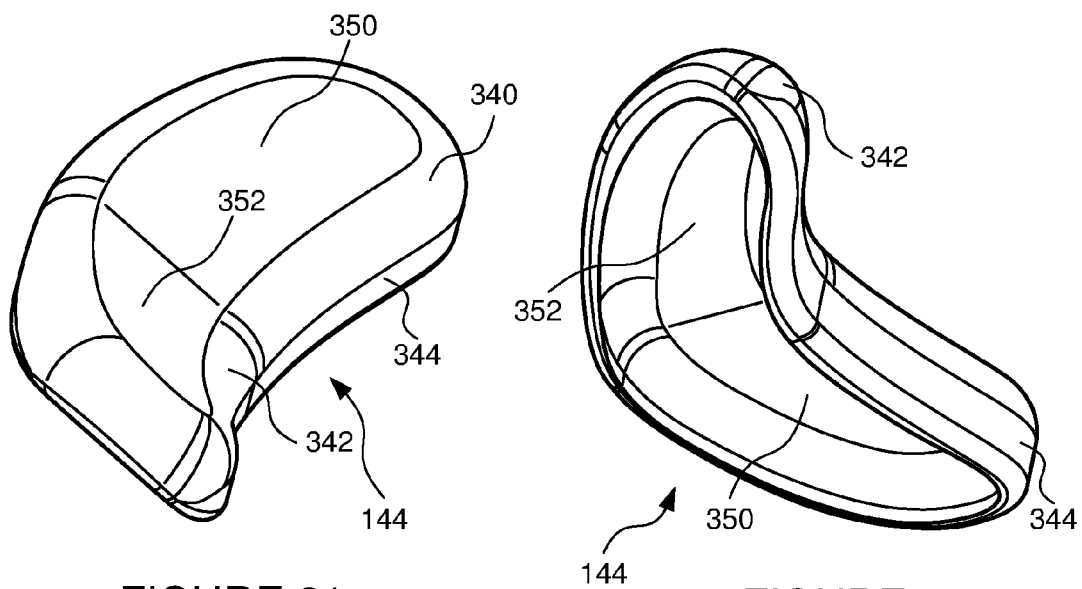
FIG. 21 is a top right perspective view of the seat cushion of FIG. 20.
Figure 22:
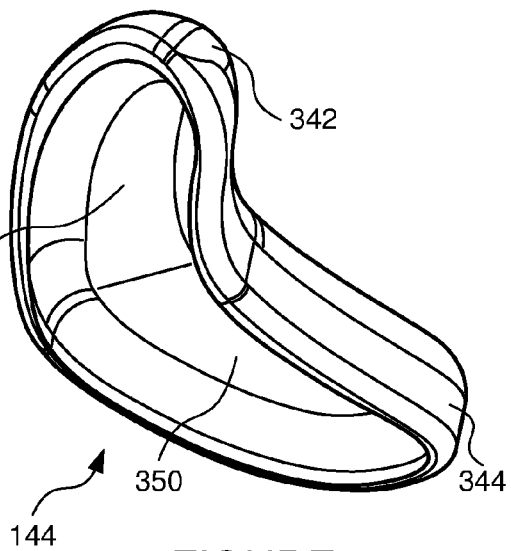
FIG. 22 is a bottom right perspective view of the seat cushion of FIG. 20.
Figure 23:
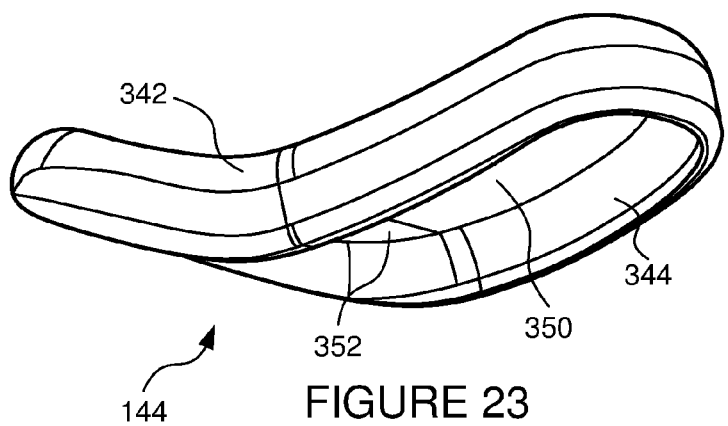
FIG. 23 is a bottom left perspective view of the seat cushion of FIG. 20.
Figure 24:
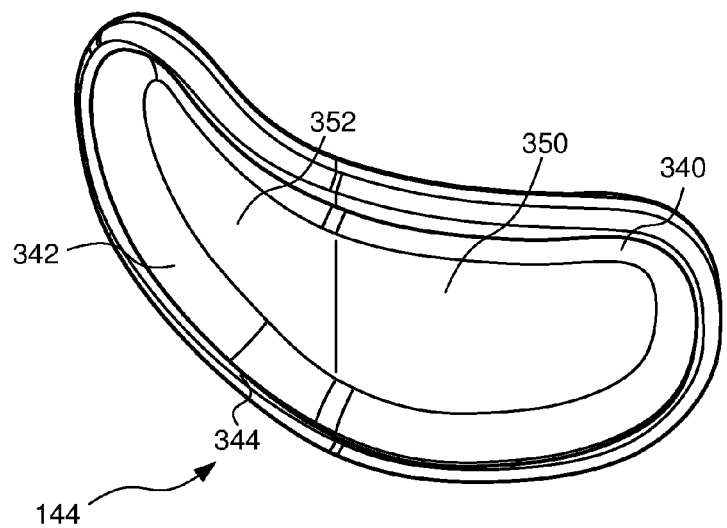
FIG. 24 is a bottom view of the seat cushion of FIG. 20.
Figure 25:
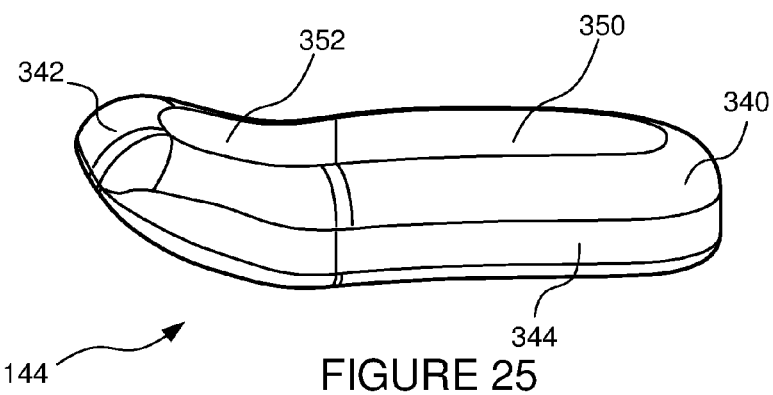
FIG. 25 is a front view of the seat cushion of FIG. 20.
Figure 26:
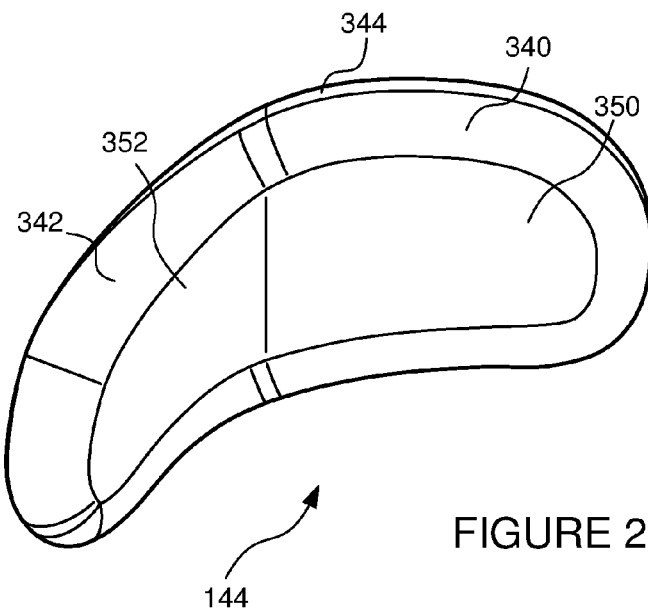
FIG. 26 is a top view of the seat cushion of FIG. 20.
Figure 27:
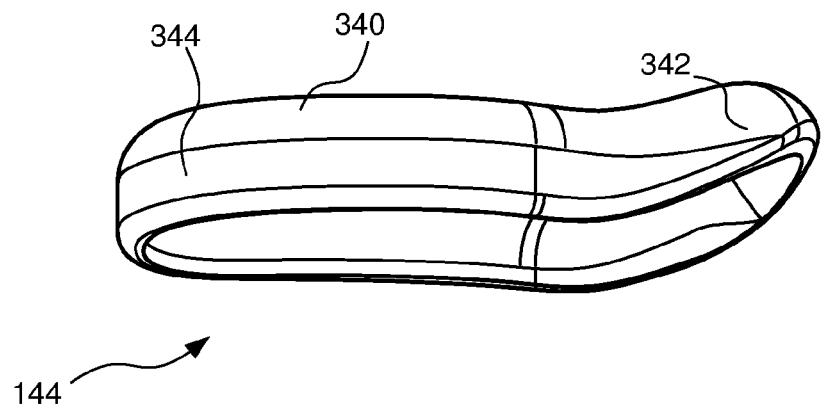
FIG. 27 is a rear view of the seat cushion of FIG. 20.
Figure 28:
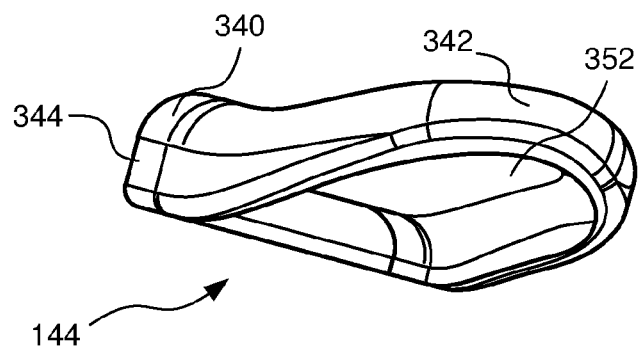
FIG. 28 is a right side view of the seat cushion of FIG. 20.
Figure 29:
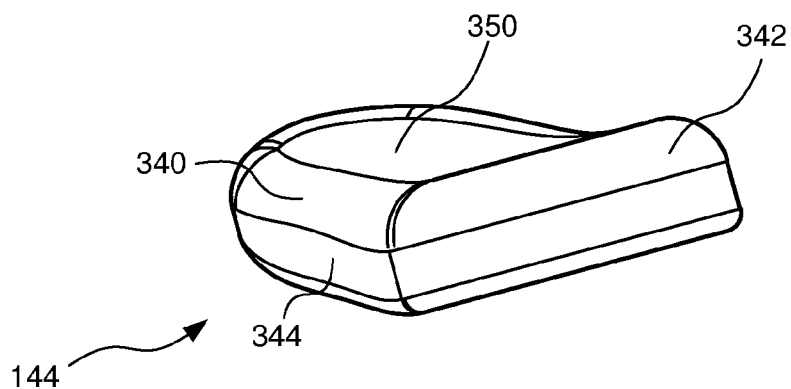
FIG. 29 is a left side view of the seat cushion of FIG. 20.
Figure 30:
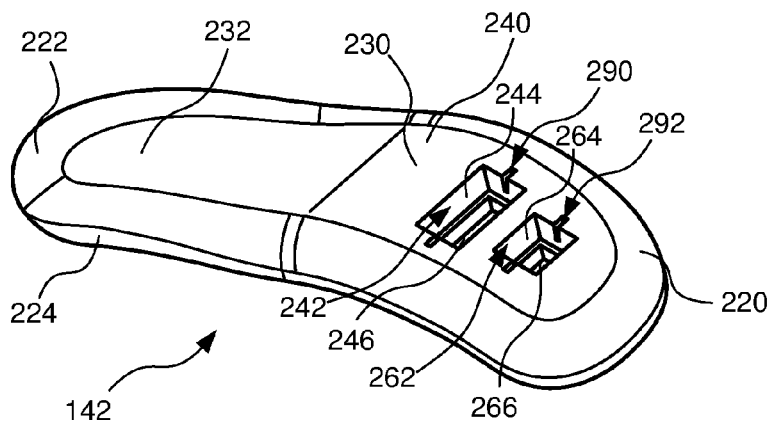
FIG. 30 is a top left perspective view of a seat pad base from the bicycle seat of FIG. 1. A left side seat pad base can be a mirror image of the right side seat pad base.
Figure 31:
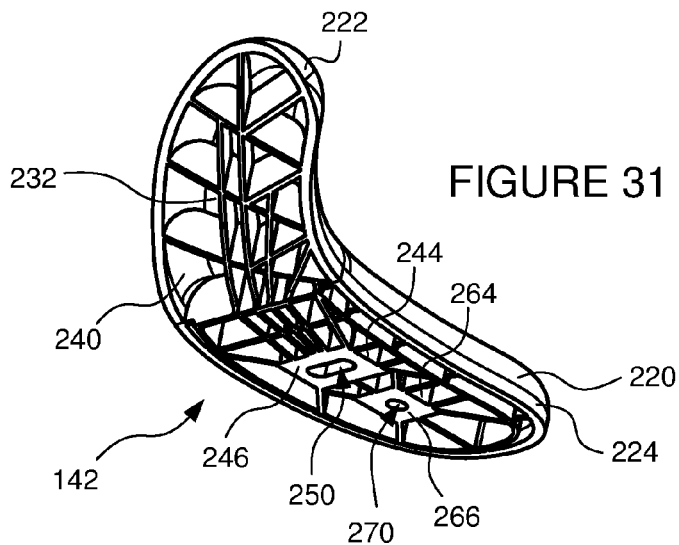
FIG. 31 is a bottom right perspective view of the seat pad base of FIG. 30.
Figure 32:
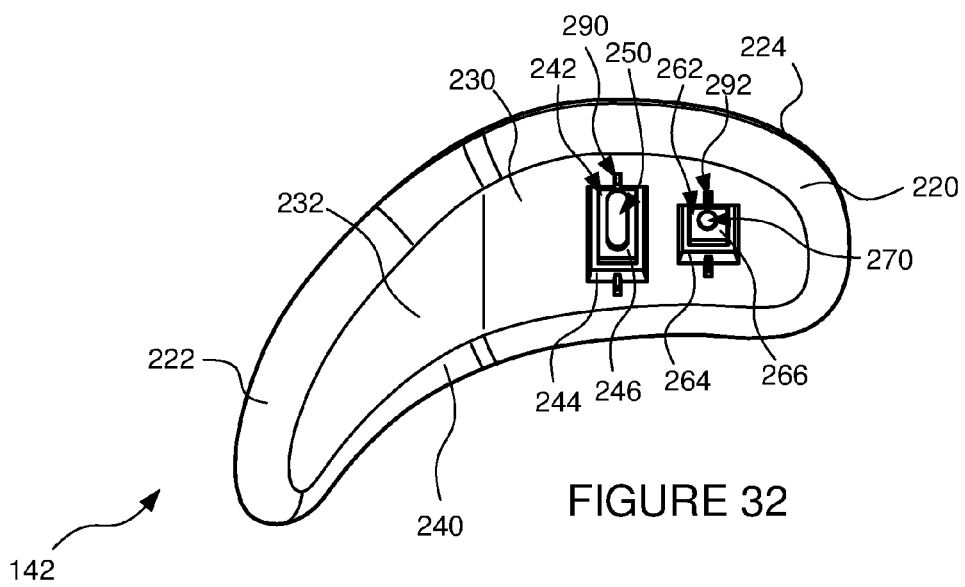
FIG. 32 is a top view of the seat pad base of FIG. 30.
Figure 33:
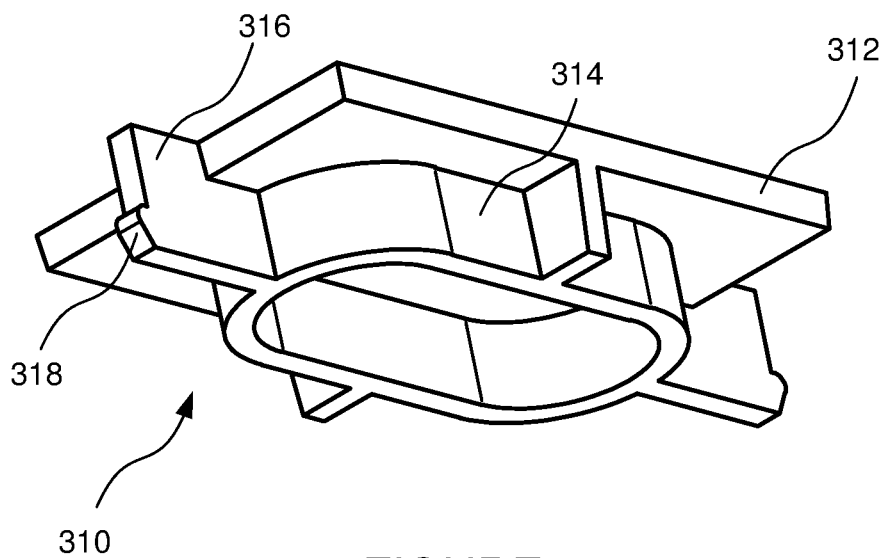
FIG. 33 is a bottom perspective view of a rectangular insert that is inserted into the rectangular opening in the seat pad base of FIG. 30.
Figure 34:
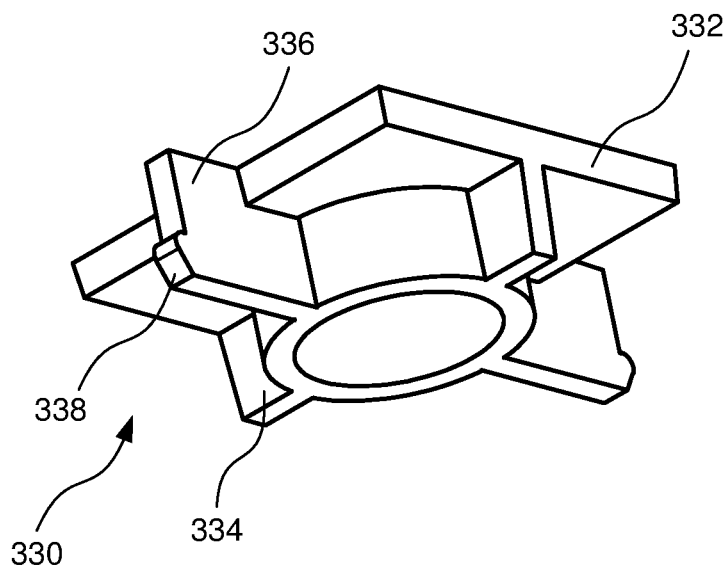
FIG. 34 is a bottom perspective view of a square insert that is inserted into the square opening in the seat pad base of FIG. 30.

Referring now to FIGS. 1-2, the seat 120 will be described in general terms. The seat 120 can include an attachment structure 122 that includes a pair of right and left rails 124 secured to the seat clamp 114. Rearward of the seat clamp 114, the rails 124 can extend into a support frame 130, with the rails being secured to the support frame 130. Thus, the attachment structure 122 can secure the support frame 130 to the seat clamp, and thus to the seat stem 112 and the frame 102 of a bicycle 100. The support frame 130 can generally include a centrally located core 132 that can receive the rails 124, and a pair of left and right arms 134 extending laterally from the core 132. Left and right seat pads 140 can be adjustably secured to the left and right arms 134, respectively, so that the seat pads 140 can each be independently adjusted between different positions by translating and/or rotating each seat pad 140. For example, the seat pads 140 can translate in a purely transverse (medial/lateral) direction, or in another direction with a transverse component (for example, an outwardly angled direction, which can be considered translation in a transverse direction). The translation may also be along a curved path. As an example, the translation may be within forty-five degrees of transverse, within thirty degrees of being transverse, or within fifteen degrees of being transverse. The rotation may be in a plane that is within forty-five degrees of being horizontal, or within thirty degrees of being horizontal, or within twenty degrees of being horizontal, such as rotation in a plane that slanted forwardly fifteen degrees from horizontal. Once adjusted, each seat pad 140 can be secured to the corresponding arm 134 to inhibit movement of the seat pad 140 relative to the arm 134 during use of the seat 120.

Each seat pad 140 can include a seat pad base 142 adjustably secured to the corresponding arm 134, and a cushion 144 mounted on the seat pad base. The cushion 144 can include a cover such as a vinyl, leather, or elastomeric fabric (e.g., polyester-polyurethane copolymer). Such a cover may include a skin of a self-skinning molded polymeric foam. Each pad can include a main pad portion 150 and an extension 152 that extends laterally and forward from the main pad portion 150, and may also slope upwardly from the main pad portion. Each extension 152 can be an elongate shape that can be narrower than the main pad portion 150.

II. Details of Example Seat Structure

Referring to FIGS. 1-34, details of the structure of the example seat 120 illustrated in these figures will be discussed. As noted above, the attachment structure 122 can include the rails 124. The rails 124 can be sized and spaced to fit a standard bicycle seat clamp 114 (the seat clamp 114 is illustrated in a simplified schematic-type form, and such clamps for securing bicycle seat rails can take a variety of forms). The rails 124 can be adjustably secured to the seat clamp 114. Thus, the seat clamp 114 can be loosened to allow the rails to slide forward and rearward within the seat clamp 114 to move the seat 120 between forward and rearward positions. The seat clamp 114 can be tightened to secure the rails 124 and thus the seat 120 in one of these positions. Besides such translational adjustment of the overall seat 120 (which may be linear translation or translation along a curved path, such as if the rails are curved) the seat clamp 114 may also allow a rotational adjustment of the clamp 114 along the medial plane, thereby tilting the rails 124 and thus the seat 120 to have a more downward slope or a more upward slope.

The rails 124 may be substantially parallel rods, and their axes may be spaced sufficiently apart to fit a standard seat clamp. Similarly, the rails 124 may each have radius that is sized to be clamped by the associated seat clamp 114. The rails 124 may extend forward from the support frame 130 a sufficient length to allow sufficient forward and rearward adjustment of the seat 120 as the rails 124 slide within the seat clamp 114. The rails 124 can be made of strong and stiff material, such as high strength stainless steel or titanium alloys. A knob 160 can be a cap that is attached to a forward extremity of each rail 124. For example, each knob can be made of a plastic material, or a metal material. Each knob 160 can be secured to the corresponding rail 124 such as by a pin or other elongate fastener, by a friction fit, and/or an adhesive. Instead of the rails, the seat may include some other type of attachment structure. For example, the support frame could be configured to directly receive and attach to a seat stem.

A rear extremity of each rail 124 can extend into the support frame 130, and can be secured within the support frame 130 by a pin or other elongate fastener, by a friction fit, and/or an adhesive. Thus, the rails 124 can act as cantilever beams being supported by the seat clamp 114 and supporting the support frame 130. The support frame 130 may be made from any of a variety of materials that are sufficiently stiff and strong to support the seat pads 140 and to be supported by the rails 124 during use. For example, the support frame 130 may be made from a metal or a polymer material, such as a fiber filled polymer material. The support frame 130 may be made from any of various different processes, such as milling, die casting, or injection molding.

Referring to FIGS. 11-19, the support frame 130 is illustrated by itself. The core 132 (the central portion) of the support frame 130 can include a rail receptacle 168, which can include a pair of right and left rail receptacles 170, which can each define a hole 172 that can extend partially into or fully through the support frame 130. The rail receptacles 170 can each include a cylinder that is concentric with the corresponding hole 172. Alternatively, the rail receptacle 168 may each include any of various other shapes, such as a generally rectangular shape or an oval shape, so long as the rail receptacles 170 are each configured to hold a rail 124 securely and to be secured to the remainder of the support frame 130. The right and left rail receptacles 170 can alternatively form a single continuous shaped receptacle 168, such as a single rounded and/or rectangular-shaped structure.

Walls can extend up from the rail receptacles 170 to join the rail receptacles 170 with a roof 180 of the support frame 130. The roof 180 may be continuous, or it can be discontinuous. For example, in the illustrated support frame 130, the roof includes a central roof section 182 over an area of the core 132 between the rail receptacles 170, and left and right seat pad support sections 184 of the roof 180 extending laterally from outside of the rail receptacles 170 to form roofs of the arms 134. Each pad support section 184 can define an arm slot 186 that extends through the pad support section 184 and that extends transversely (medially and laterally) along the pad support section 184. The pad support sections 184 can take various shapes, but in the embodiment, the front edge of the pad support sections 184 extends in a non-angled medial-lateral direction, while rear edges of the pad support sections 184 can angle forward as they extend laterally from the core 132, so that the pad support sections 184 are narrower farther from the core 132.

The roof 180 can slope down as it extends forward, as compared to the rails 124. For example, if the rails 124 are horizontal, the roof 180 may be sloped downward at an angle of thirty degrees or less, such as an angle of fifteen degrees. Also, the walls of the support frame 130 that are described herein as extending vertically (such as those described as extending up or down) may be at an angle from vertical, but still have an upward or downward component direction, such as where the walls are within thirty degrees of being vertically-oriented. For example, a front wall 190 and a rear wall 192 may slope back as they extend down from the roof 180 so that the front and rear walls are perpendicular to the downwardly-sloping roof 180. The roof 180 can define openings between the central roof section 182 and the pad support sections 184 that extend down to upper surfaces of the rail receptacles 170.

The walls extending up from the rail receptacles 170 can include the front wall 190 that can extend up and transversely out from front extremities of the rail receptacles 170 to meet a front edge of the central roof section 182 and front edges of the pad support sections 184. Additionally, the front wall 190 can extend between the central roof section 182 and the pad support sections 184 to join those sections together. Lower edges of the front wall 190 can angle upward toward the outer extremities of the arms 134, so that the front wall thins as it extends out from the core 132. Additionally, the front wall 190 can extend between the rail receptacles 170.

The walls extending up from the rail receptacles 170 can include the rear wall 192 that can extend up and transversely out from rear extremities of the rail receptacles 170 to meet a rear edge of the central roof section 182 and rear edges of the pad support sections 184. Additionally, the rear wall 192 can extend between the central roof section 182 and the pad support sections 184 to join those sections together. Lower edges of the rear wall 192 can angle upward toward the outer extremities of the arms 134, so that the rear wall thins as it extends out from the core 132. The rear wall 192 can also extend between the rail receptacles 170. The front wall 190 and/or the rear wall 192 can extend out different distances depending on the amount of support to be provided by the walls 190 and 192. In the embodiment illustrated in the figures, the support frame 130 can also include end walls 193 that extend down from the ends of the pad support sections 184, extending from the front wall 190 around the end of each arm 134

Additionally, the walls extending up from each of the rail receptacles 170 can include an interior web 194 of walls extending up from each rail receptacle 170 within the openings formed by the roof 180. The interior web 194 may include forward-rearward extending walls, walls extending transversely, and/or angled walls that extend forward-rearward and transversely. As illustrated in the example of the figures, each interior web 194 includes a forward-rearward extending wall and a set of three parallel transversely-extending walls that are also parallel to the front wall 190 and the core section of the rear wall 192, although different configurations can be utilized.

Thus, the pad support sections 184 of the roof 180, the upwardly angled sections of the front wall 190 that extend laterally from the core 132, the upwardly angled sections of the rear wall 192 that extend laterally from the core 132, and the end walls 193 can form a basic structure for the arms 134. The arms 134 can also include slot walls 196 extending down from edges of the pad support sections 184 that surround the arm slots 186. Accordingly, the slot walls 196 can further define the slots 186 as the slot walls 196 extend down from the pad support sections 184.

Each arm 134 can also include a web of interior arm walls 210 extending between the pad support sections 184, the slot walls 196, the front wall 190 and the rear wall 192. The interior arm walls 210 can also meet the interior web 194 of walls that extend up from each of the rail receptacles 170. A web of interior core walls 212 can extend down from the central roof section 182, and can also extend between the left and right interior web 194 of walls, and between the front wall 190 and the rear wall 192. The interior webs 194, the front wall 190, the rear wall 192, the interior core walls 212, the slot walls 196, the end walls 193, and the interior arm walls 210 can connect the rail receptacles 170 to the seat pad support sections 184 of the roof 180, and can strengthen and stiffen the overall support frame 130, including the rail receptacles 170 and the seat pad support sections 184.

As noted above, each seat pad 140 can include a seat pad base 142, which will now be discussed in more detail with particular reference to FIGS. 30-32 and FIGS. 9-10. The right and left seat pads 140 can be mirror images of each other, and the same reference numbers and description are used herein for corresponding parts of both seat pads 140 (as with other parts herein that are can be mirror images of each other) although in some implementations it is possible to have differences between the right and left seat pads 140. Each seat pad base 142 can include main base portion 220 that forms part of the main pad portion 150 and a base extension 222 that can extend laterally and forward from a lateral side of the main base portion 220. A continuous wall 224 can extend around a periphery of the base 142, including the main base portion 220 and the base extension 222. The continuous wall 224 can extend up to meet a roof 230 of the main base portion 220 and a roof 232 of the extension 222. The wall 224, the roof 230 of the main base portion 220, and the roof 232 of the extension 222 can all combine to form a continuous rounded shell that forms a body 240 of the base 142.

The roof 230 of the main base portion 220 can define an elongate opening such as a generally rectangular-shaped fastener opening 242. From edges of the roof 230 that define the rectangular fastener opening 242, rectangular opening walls 244 can descend downwardly, further defining the space of the rectangular fastener opening 242. A floor 246 can extend inwardly from bottom edges of the walls 244, and can define a pad fastener slot 250 therein that extends in a forward-rearward direction, so that the pad fastener slot 250 extends at an angle to the corresponding arm slot 186 of the support frame 130. A portion of pad fastener slot 250 can be located over the corresponding arm slot 186 of the support frame 130, and a fastener 252 such as threaded fastener can extend through the arm slot 186 of the support frame 130 and through the pad fastener slot 250. For example, the fastener 252 can be a threaded bolt with the bolt head located below the arm slot 186 (possibly with a washer 254 between the bolt head and the support frame arm 134) and a shaft of the bolt extending up through the arm slot 186 of the support frame 130 and through the pad fastener slot 250. A nut 256 such as a square nut can be seated within the rectangular fastener opening 242, and can be threaded onto the fastener 252 to clamp the seat pad base 142 to the arm 134 of the support frame 130. The walls 244 can engage the nut 256 to inhibit rotation of the nut 256, allowing the nut 256 to be rotated relative to the fastener 252 as the fastener 252 is turned, so that the fastener 252 can be rotated to tighten or loosen the clamping of the seat pad base 142 to the arm 134 of the support frame 130.

The roof 230 of the main base portion 220 can further define an opening such as a generally square-shaped fastener opening 262. From edges of the roof 230 that define the square fastener opening 262, square opening walls 264 can descend downwardly, further defining the space of the square fastener opening 262. A floor 266 can extend inwardly from bottom edges of the walls 264, and can define a circular pad fastener hole 270 therein. As illustrated, the pad fastener hole 270 is located medially from the pad fastener slot 250, but this could be reversed, with the pad fastener hole 270 located laterally from the pad fastener slot 250. The walls 264 can engage the nut 256 to inhibit rotation of the nut 256, allowing the nut 256 to be rotated relative to the fastener 252 as the fastener 252 is turned, so that the fastener 252 can be rotated to tighten or loosen the clamping of the seat pad base 142 to the arm 134 of the support frame 130.

The pad fastener hole 270 can be located over the corresponding arm slot 186 of the support frame 130, and a fastener 272 such as threaded fastener can extend through the arm slot 186 of the support frame 130 and through the pad fastener hole 270. For example, the fastener 272 can be a threaded bolt with the bolt head located below the arm slot 186 (possibly with a washer 274 between the bolt head and the support frame arm 134) and a shaft of the bolt extending up through the arm slot 186 of the support frame 130 and through the pad fastener hole 270. A nut 276 such as a square nut can be seated within the square fastener opening 262, and can be threaded onto the fastener 272 to clamp the seat pad base 142 to the arm 134 of the support frame 130. The walls 264 can engage the nut 276 to inhibit rotation of the nut 276, allowing the nut 276 to be rotated relative to the fastener 272 as the fastener 272 is turned, so that the fastener 272 can be rotated to tighten or loosen the clamping of the seat pad base 142 to the arm 134 of the support frame 130.

Accordingly, the fasteners 252 and 272 can be tightened to clamp the seat pad base 142 to the corresponding arm 134 of the support frame. Additionally, the fasteners 252 and/or 272 can be loosened to allow the fasteners 252 and 272 to slide along the arm slot 186 to provide for lateral and medial translation of the corresponding seat pad base 142 and the overall seat pad 140. Similarly, with the fasteners 252 and 272 loosened, the fastener 252 can slide along the pad fastener slot 250, allowing the seat pad 140 to be rotated relative to the corresponding arm 134 of the support frame 130. With the seat pad 140 translated and/or rotated to a different position, the fasteners 252 and 272 can be tightened to secure the seat pad 140 in position relative to the support frame 130. Thus, the seat pads 140 can be adjusted by translating and/or rotating the seat pads 140 relative to each other and relative to the support frame 130 and the bicycle frame 102. The overall seat 120 can also be adjusted relative to the bicycle frame 102 using the seat clamp 114, such as by sliding the rails 124 within the seat clamp 114 and then securing the rails 124 in place.

Opposite rectangular opening walls 244 can define slots 290 therein that extend down from the top of the walls 244, and opposite square opening walls 264 can also define slots 292 therein that extend down from the top of the walls 244.

Each seat pad base 142 can also include a web of interior walls 294 that can extend between the body 240, the rectangular opening walls 244, and the square opening walls 264. The interior walls 294, the rectangular opening walls 244, and the square opening walls 264 can extend below the body 240 of the seat pad base 142. Thus, the rectangular opening floor 246, the square opening floor 266, and bottom edges of the interior walls 294 of the seat pad base 142 can abut the corresponding pad support section 184 of the roof 180 of the support frame 130, while the lower edge of the body 240 of the seat pad base 142 can be elevated above the corresponding pad support section 184. This can be beneficial if the seat cushion 144 extends below the lower edge of the body 240 of the seat pad base 142. For example, this may occur, if a cover of the cushion 144 or other portion of the cushion 144 is wrapped around a lower edge of the body 240 of the seat pad base 142. In alternative embodiments where the seat cushion 144 does not extend below the lower edge of the body 240, the body 240 may extend down so that a lower edge of the body 240 is coplanar with the rectangular opening floor 246, the square opening floor 266, and bottom edges of the interior walls 294 of the seat pad base 142 in the main pad portion 150, so that all of these features may abut the corresponding pad support section 184 of the support frame 130.

Referring to FIGS. 9-10, 30-32, and 33-34, each seat pad 140 can also include a rectangular insert 310 that is seated in the rectangular fastener opening 242. The rectangular insert 310 can include a roof 312 that can be seated within the opening with a top of the roof 312 of the insert 310 being substantially coplanar with a top of the roof 230 of the main base portion 220 of the pad base 142. Walls 314 can extend down from the roof 312 on opposite sides of the fastener 252 to inhibit upward movement of the nut 256, thereby keeping the nut 256 seated adjacent to the floor 246 of the rectangular fastener opening 242, but allowing the nut 256 and the fastener 252 to slide along the pad fastener slot 250. The rectangular insert 310 can also include insert arms 316 that extend out from opposite sides of the rectangular insert 310 with a finger 318 that extends out from each of the arms 316. The arms 316 can extend into the slots 290 so that the fingers 318 can extend under the roof 230 of the main base portion 220 of the pad base 142 to engage the roof 230 and assist in keeping the rectangular insert 310 seated in the rectangular fastener opening 242 (see FIG. 10).

Referring to FIGS. 9-10, 30-32, and 33-34, each seat pad 140 can also include a square insert 330 that is seated in the square fastener opening 262. The square insert 330 can include a roof 332 that can be seated within the opening with a top of the roof 332 of the insert 330 being substantially coplanar with a top of the roof 230 of the main base portion 220 of the pad base 142. Walls 334 can extend down from the roof 332 on opposite sides of the fastener 272 to inhibit upward movement of the nut 276, thereby keeping the nut 276 seated adjacent to the floor 266 of the square fastener opening 262. The square insert 330 can also include insert arms 336 that extend out from opposite sides of the square insert 330 with a finger 338 that extends out from each of the arms 336. The arms 336 can extend into the slots 292 so that the fingers 338 can extend under the roof 230 of the main base portion 220 of the pad base 142 to engage the roof 230 and assist in keeping the square insert 330 seated in the square fastener opening 262 (see FIG. 9).

The bases 142 and the inserts 310 and 330 can all be made of a material that is sufficiently strong and rigid, such as a metal or polymer material similar to those discussed above with respect to the support frame 130. Also, the bases 142 and the inserts 310 and 330 can be made by processes similar to those discussed above for the support frame 130.

Referring still to FIGS. 1-34, and particularly to FIGS. 20-29, the cushion 144 of each seat pad 140 will be discussed. As with the other parts of the seat 120, each cushion 144 can be a mirror image of the cushion 144 on the other side of the seat 120. The cushion 144 can cover at least a portion of the corresponding seat pad base 142, providing cushioning thereon.

As with the body of each seat pad base 142, each cushion 144 can be generally kidney bean shaped (also referred to as kidney shaped) with one lobe of the kidney bean shape (the medial side forming a main cushion portion 340) being wider than the other lobe of the kidney bean shape (the medial side forming an extension 342), and with a concave rounded front face and a convex rounded rear face. Thus, each seat pad cushion 144 can include the main cushion portion 340 that forms part of the main pad portion 150 and the cushion extension 342 that can extend laterally and forward from a lateral side of the main cushion portion 340. The cushion extension 342 can slope upward and forward from the main cushion portion 340, as with the body of the seat pad base 142, so that forward and upper faces of the cushion 144 can comprise concave sections. A continuous wall 344 can extend around a periphery of the cushion 144, including the main cushion portion 340 and the cushion extension 342. The continuous wall 344 can extend up to meet a roof 350 of the main cushion portion 340 and a roof 352 of the extension 342. The wall 344, the roof 350 of the main cushion portion 340, and the roof 352 of the extension 342 can all combine to form a continuous rounded body of the cushion 144. The roof 350 of the main cushion portion 340 may be substantially planer, but rounded at the edges to meet the wall 344. The roof 352 of the extension 342 can be straight in a forward-rearward direction, and a top surface of the roof 352 may form a concave curve in a transverse direction as the roof 352 extends laterally. Edges of the roof 352 may be rounded at the edges to meet the wall 344. Alternatively, the roof 350 and the roof 352 may both be rounded.

Each cushion 144 can be seated on a corresponding seat pad base 142, and can be secured thereto. For example, each cushion 144 may be secured to the corresponding seat pad base 142 with one or more securing mechanisms, such as a cover of the cushion 144 that is mechanically secured to the seat pad base 142 (e.g., with staples), an adhesive material, and/or an over molding process. Each cushion 144 may include a body that is a polymeric foam material, such as a molded material. Each cushion 144 can include a cover, which may be a different material from the body, or the cover may be the same material as the body, such as where the cushion includes a self-skinning molded foam.

At least part of a surface of the main cushion portion 340 that is configured to provide pressure to a rider can provide more grip than at least part of a surface of the cushion extension 342 that is configured to provide pressure to the rider. The relative amount of grip provided is determined by measuring a coefficient of static friction for an elastane polyester-polyurethane copolymer fabric relative to each of the two surfaces. The grip of surfaces may be altered by altering a type of material for the surfaces, and/or altering a content of the material. For example, at least a portion of the main cushion portion 340 that underlies and provides upward support to a rider's ischium (e.g., the rider's ischial tuberosity) may have a surface that is a gripping rubber surface that may or may not be textured, while at least a portion of the surface of the cushion extension 342 that provides medial pressure to provide lateral support to the rider's coxal bone has a surface with less grip than the textured gripping rubber surface. For example, the surface with less grip may be a vinyl surface, a leather surface, or a surface of an elastomeric fabric such as an elastane polyester-polyurethane copolymer. For example, the bicycle seat 120 may include a removable sleeve covering at least a portion of the cushion extension 342, and the surface with less grip may be a surface of the removable sleeve. As another example, the bicycle seat 120 may include a removable sleeve covering at least a portion of the main cushion portion 340, and the surface with more grip may be a surface of the removable sleeve. In other examples, the surface portion with more grip may be a surface of a patch that is secured to an underlying surface with an adhesive and/or stitching, and the surface portion with less grip may be a portion of the underlying surface that is not covered with the patch. In other examples, the surface portion with less grip may be a surface of a patch that is secured to an underlying surface with an adhesive and/or stitching, and the surface portion with more grip may be a portion of the underlying surface that is not covered with the patch.

In assembling the seat example of FIGS. 1-35, a nut 256 can be positioned in the rectangular fastener opening 242 of each seat pad base 142 and a rectangular insert 310 can be snapped into place in the rectangular fastener opening 242 over the nut 256. Similarly, a nut 276 can be positioned in the square fastener opening 262 of each seat pad base 142, and a square insert 330 can be snapped into place in the square fastener opening 262 over the nut 276. A cushion 144 can be placed over each corresponding seat pad base 142, and secured to the seat pad base 142. The rails 124 can be secured in the rail receptacles 170 of the support frame 130, and the knobs 160 can be secured on the forward ends of the rails 124. Each seat pad 140 can be positioned over the corresponding support frame arm 134 and secured thereto by inserting the fasteners 252 and 272 through the corresponding arm slots 186, and through the corresponding pad fastener slot 250 or pad fastener hole 270, and threading each fastener 252 and 272 into the corresponding nut 256 and 276. The fastener head and the nut positions could be reversed so that each fastener head is positioned within the seat pad and the nut is positioned below the corresponding arm slot 186. Before tightening the fasteners 252 and 272, the seat pads 140 can be adjusted to a desired position by translating and/or rotating the seat pad 140. The rails 124 can be positioned in a desired position in the seat clamp 114, and can be secured therein by tightening the seat clamp 114. After riding, the overall seat 110 and/or the seat pads 140 can be re-adjusted, and such riding and adjustment can continue in an iterative process until a satisfactory fit is achieved.

Figure 35:
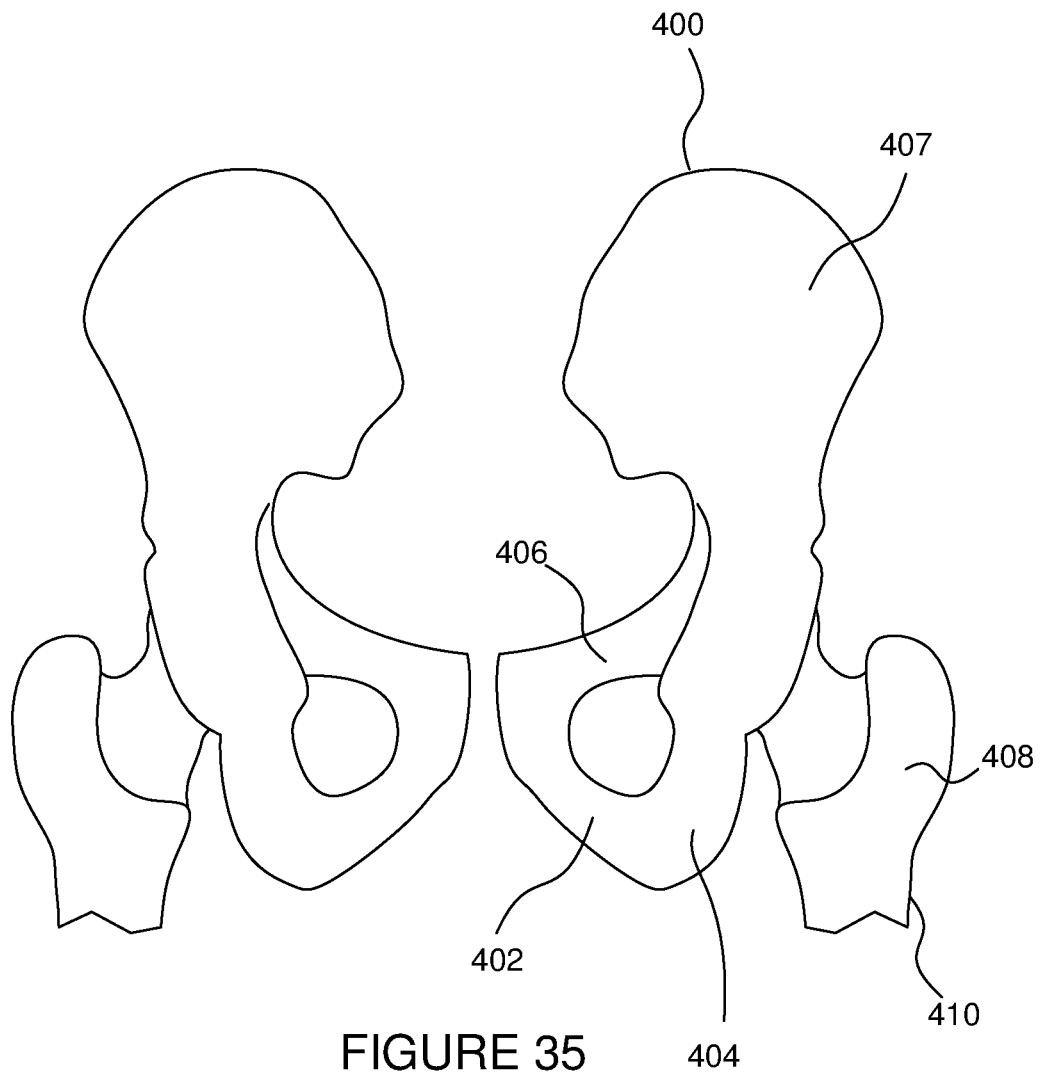
FIG. 35 is a simplified rear view of human coxal bones and upper extremities of human femur bones.
Figure 36:
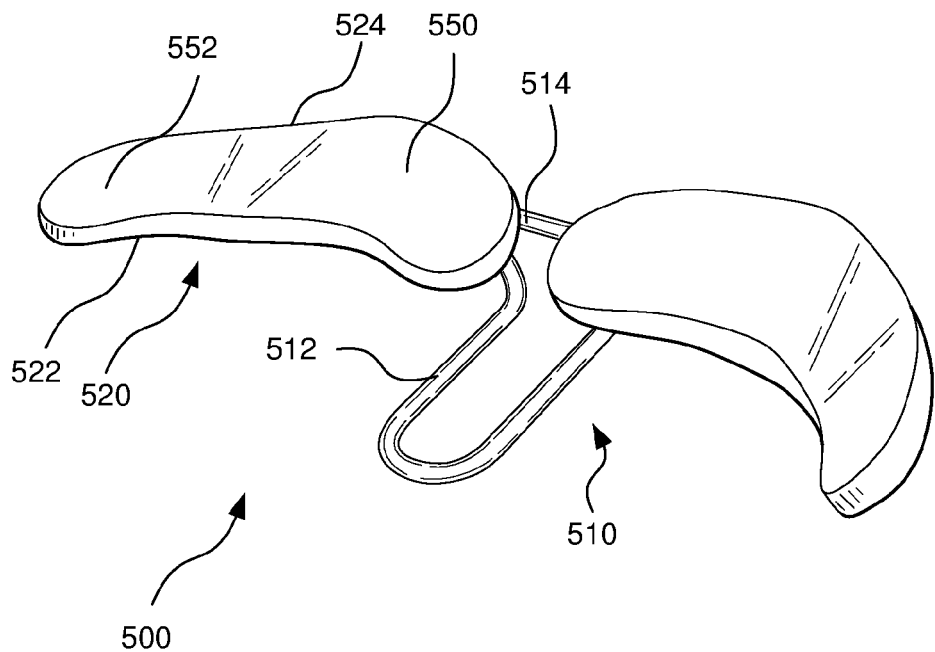
FIG. 36 is a front left perspective view of another bicycle seat.

Referring to FIG. 35, a simplified diagram of some bones in the hip area of a rider are illustrated. The bones can include left and right coxal bones 400, sometimes referred to as hip bones. Each coxal bone 400 can include an ischium 402, which can include an ischial tuberosity 404, which typically receives pressure from a seat such as a chair when a person is seated. The coxal bone 400 also includes a pubis 406 that extends forward from the ischium 402, and an ilium 407 that extends up from the pubis and ischium 402. Additionally, an upper extremity 408 of a rider's femur 410 can be positioned laterally from the coxal bone 400, with a head of the femur positioned against a cup formed by the coxal bone 400. The seat pads 140 can be adjusted to positions wherein a rider's left and right ischiums 402 (typically the left and right ischial tuberosities) align with and are supported by the main cushion portion 340, with the cushion extension 342 wrapping around laterally and forward from the main cushion portion 340 to provide medial support to each side of the rider's coxal bone 400. Such support can be provided by medial pressure (pressure with a medial component, though it can also have upward and/or forward components) directly against the rider's coxal bone 400 (though via the tissue of the rider's buttocks), and/or through pressure on the rider's femur 410, such as against the upper extremity 408 of the rider's femur 410.

While the description above is made with reference to the embodiment illustrated in FIGS. 1-35, other alternative shapes and structural features may be utilized. For example, referring to FIGS. 36-45, another example of a bicycle seat 500 will be discussed. The seat 500 can include a pre-existing single continuous metal rod support frame 510 that forms rails 512 and laterally-extending arms 514 with arm slots 516 therein. Left and right seat pads 520 can each include a seat pad base 522 formed by a plate such as a polymer or metal plate, and a cushion 524 mounted on the seat pad base 522. Each seat pad base 522 can include a pad fastener slot 530 and a pad fastener hole (not shown) therein. Threaded fasteners 540 such as carriage bolts can include heads above the seat pad base 522, with one extending downward through each fastener slot 530 and fastener hole, and further extending downward through the corresponding arm slot 516. Fastener nuts 542 can be threaded onto the threaded fasteners 540 to clamp each seat pad 520 in place. The arm slots 516 and the pad fastener slots 530 can allow the threaded fasteners 540 to slide therein when the fasteners 540 are loosened, to provide for translational and rotational adjustment of the seat pads 520 relative to each other and relative to the support frame 510.

As can be seen, each seat pad 520 can still include a kidney shape with a main pad portion 550 and an extension 552 forming lobes of the kidney shape. Additionally, the kidney shape can include a concave forward surface, a concave upper surface, and a convex rear surface, as the extension 552 extends laterally and forward from the main pad portion 550. The extension 552 can also extend upwardly from the main pad portion 550, as can be seen in FIGS. 43 and 44 with the front surface of the extension 552 extending above the front surface of the main pad portion 550 and the rear surface of the extension 552 extending above the rear surface of the main pad portion 550, relative to a horizontal plane, and even more of an upward extension relative to a plane of the main pad portion 550 and a pivotal plane between the seat pad 520 and the support frame 510, which can be along a supporting plane of the support frame 510.

Figure 46:
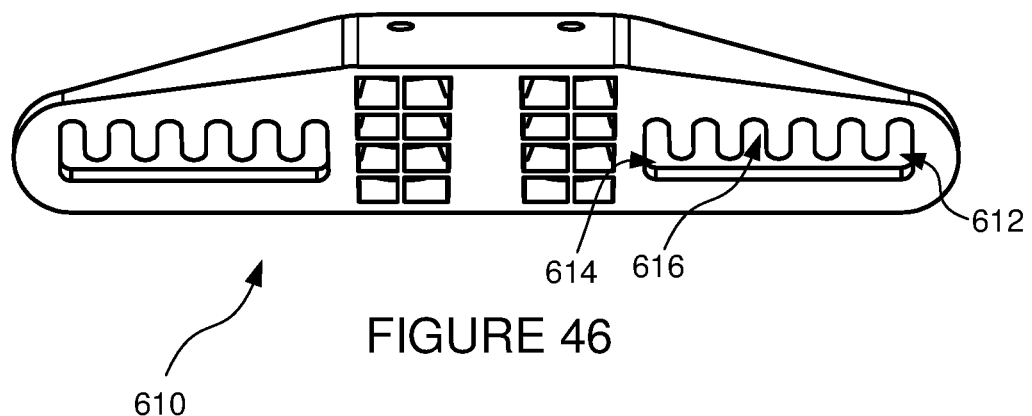
FIG. 46 is a top view of an alternative bicycle seat support frame.
Figure 47:
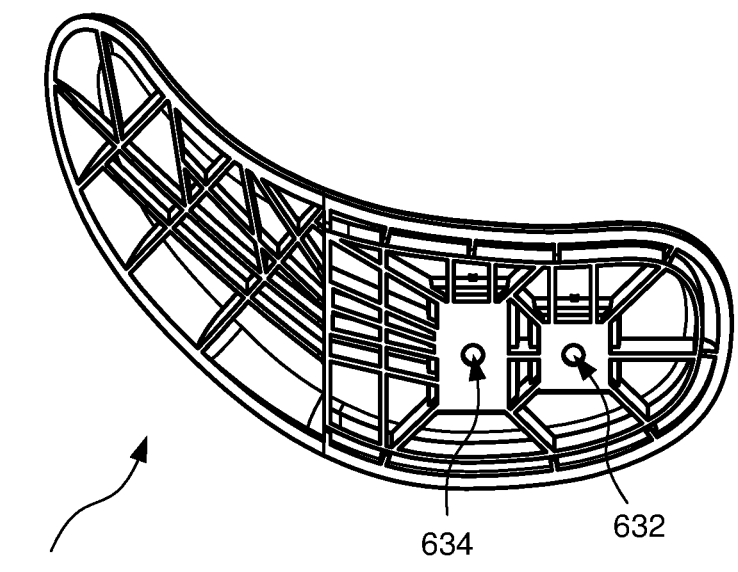
FIG. 47 is a bottom view of an alternative bicycle seat pad base.
Figure 48:
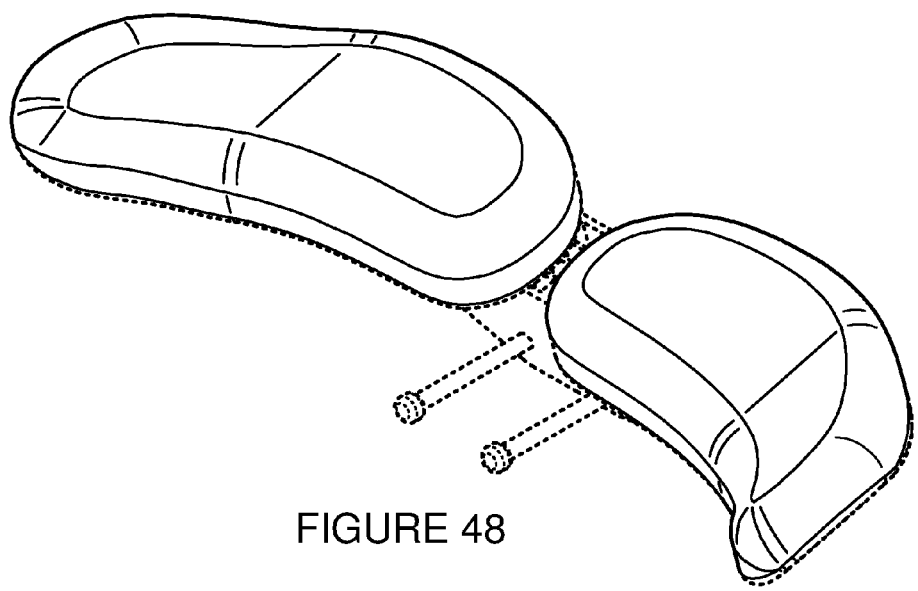
FIG. 48 is a top left perspective view of the bicycle seat of FIG. 1, illustrating an ornamental bicycle seat pad design embodiment.
Figure 49:
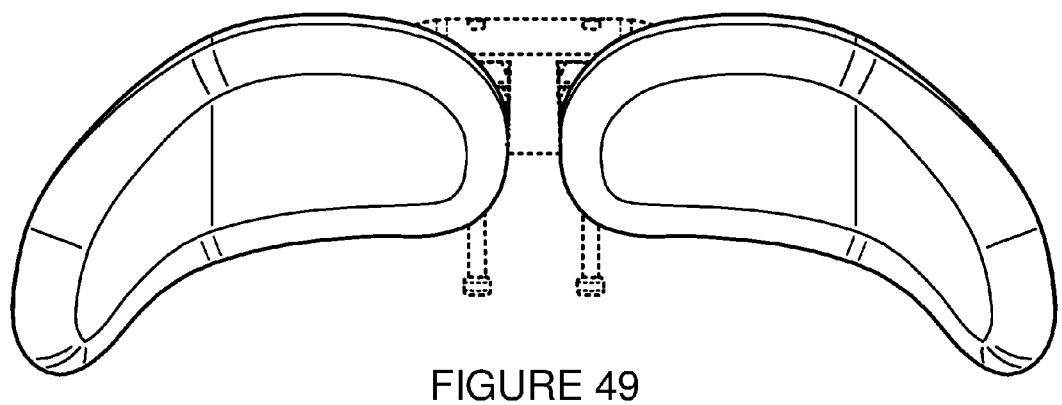
FIG. 49 is a top view of the bicycle seat pad design embodiment of FIG. 48.
Figure 50:
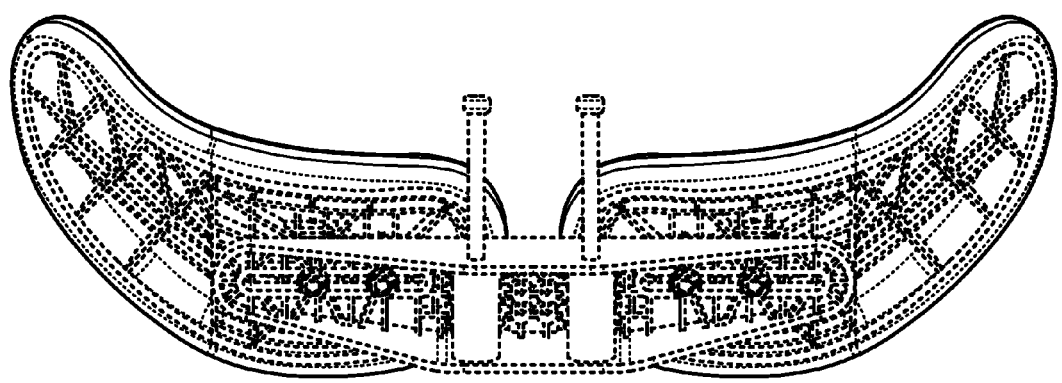
FIG. 50 is a bottom view of the bicycle seat pad design embodiment of FIG. 48.
Figure 51:
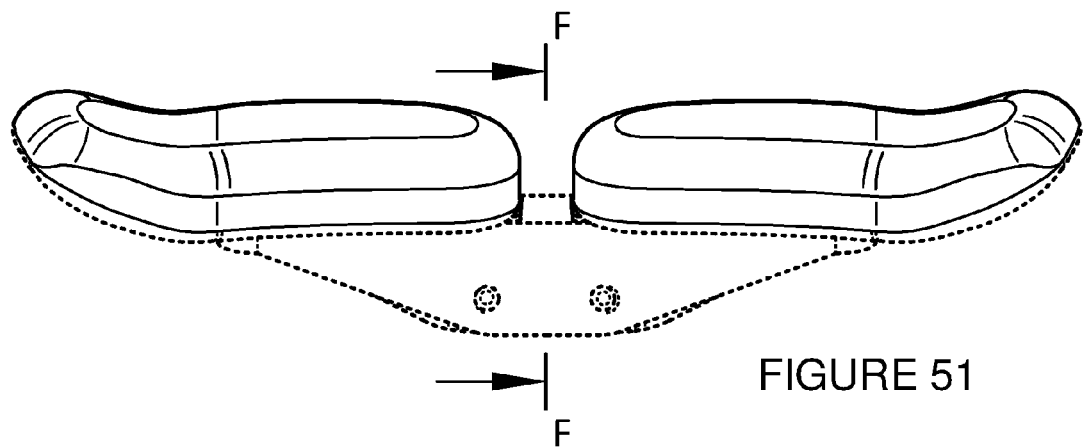
FIG. 51 is a front view of the bicycle seat pad design embodiment of FIG. 48.
Figure 52:
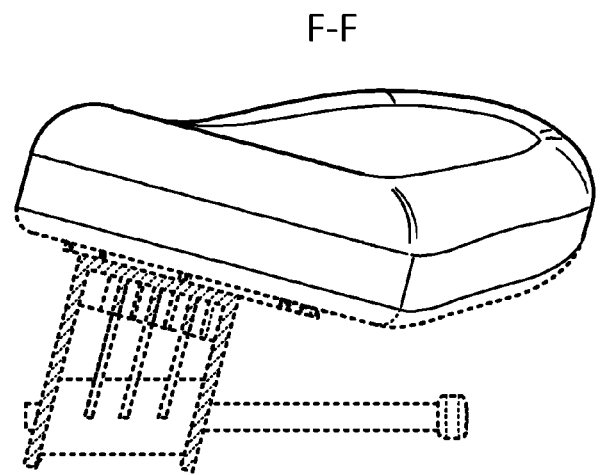
FIG. 52 is a sectional view taken along line F-F of FIG. 51.
Figure 53:
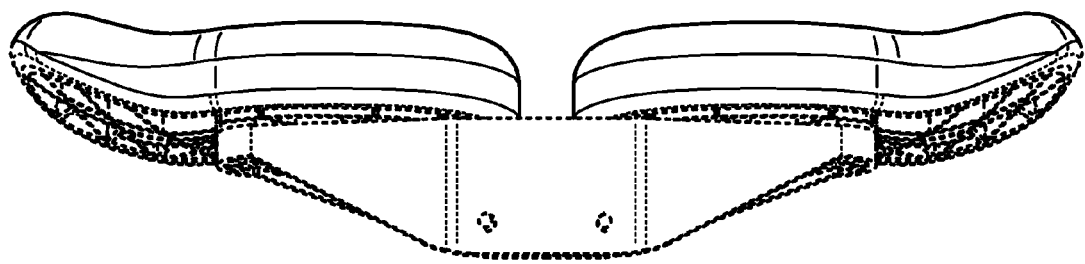
FIG. 53 is a rear view of the bicycle seat pad design embodiment of FIG. 48.
Figure 54:
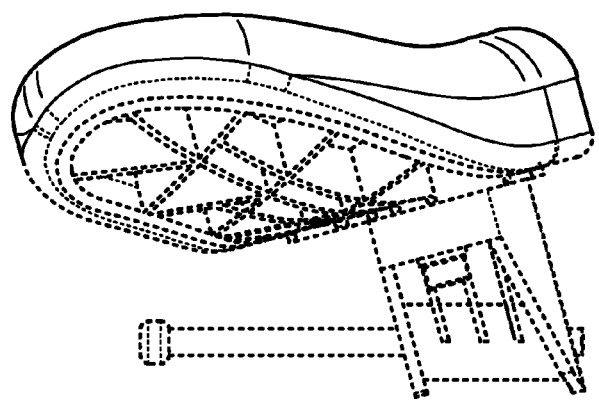
FIG. 54 is a left side view of the bicycle seat pad design embodiment of FIG. 48.
Figure 55:
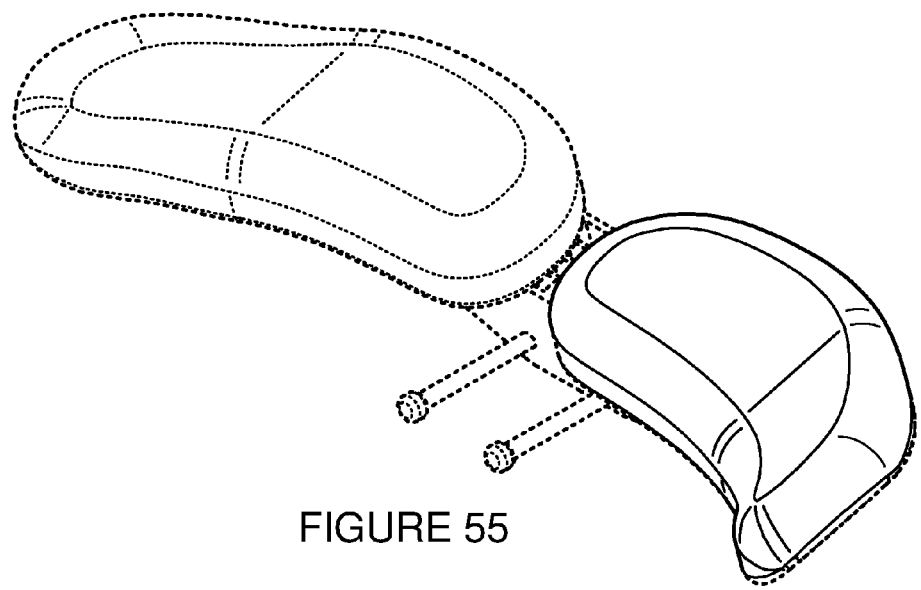
FIG. 55 is a top left perspective view of the bicycle seat of FIG. 1, illustrating another ornamental bicycle seat pad design embodiment.
Figure 56:
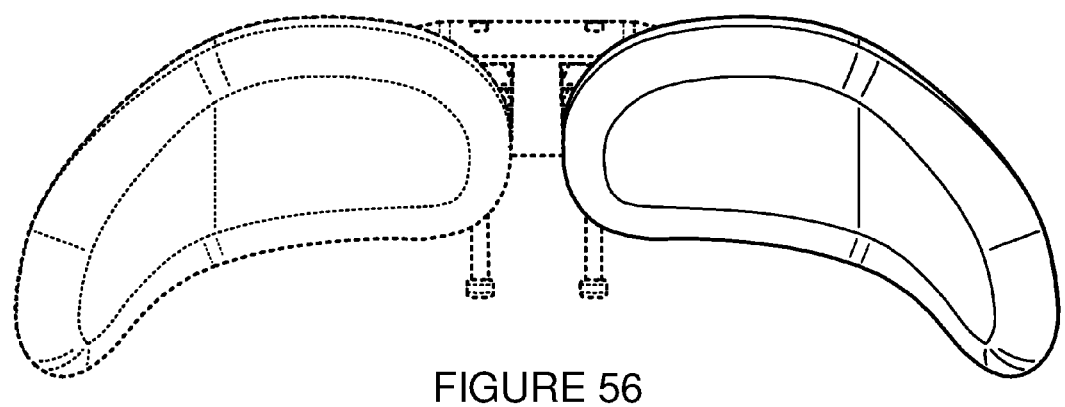
FIG. 56 is a top view of the bicycle seat pad design embodiment of FIG. 55.
Figure 57:
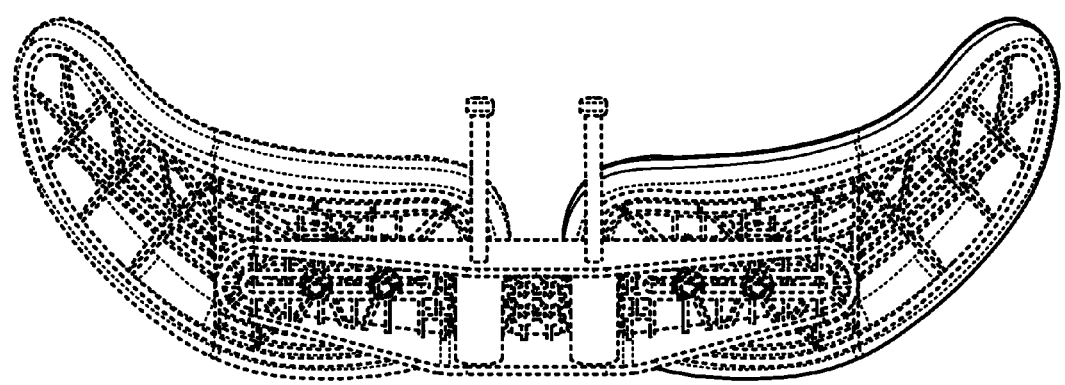
FIG. 57 is a bottom view of the bicycle seat pad design embodiment of FIG. 55.
Figure 58:
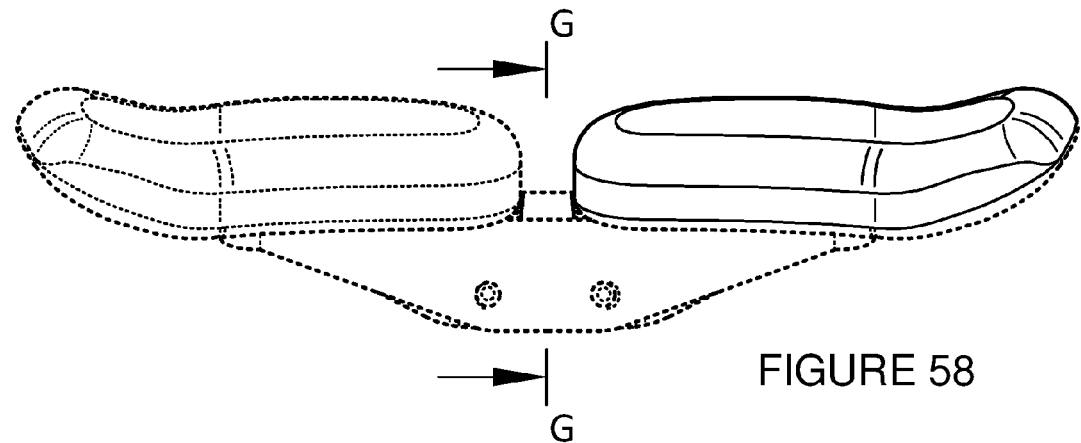
FIG. 58 is a front view of the bicycle seat pad design embodiment of FIG. 55.
Figure 59:
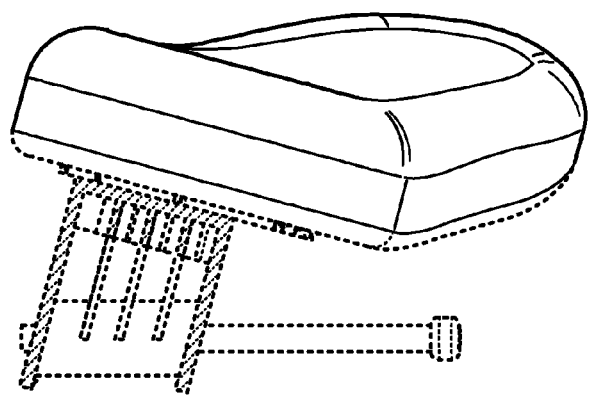
FIG. 59 is a sectional view taken along line G-G of FIG. 58.
Figure 60:
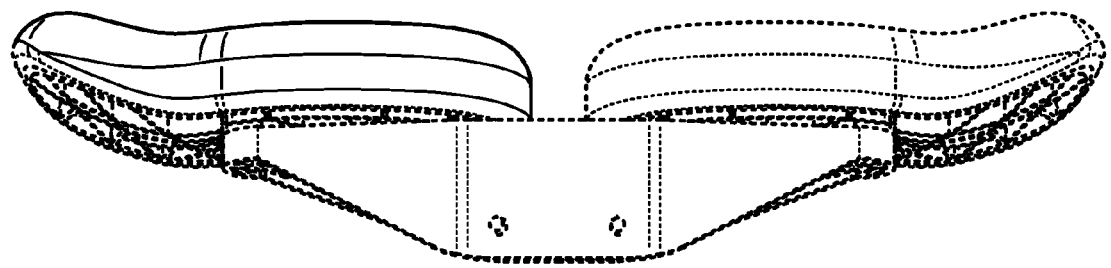
FIG. 60 is a rear view of the bicycle seat pad design embodiment of FIG. 55.
Figure 61:
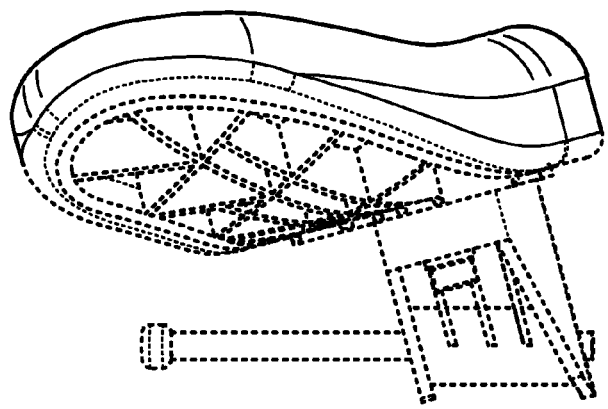
FIG. 61 is a left side view of the bicycle seat pad design embodiment of FIG. 55.
Figure 62:
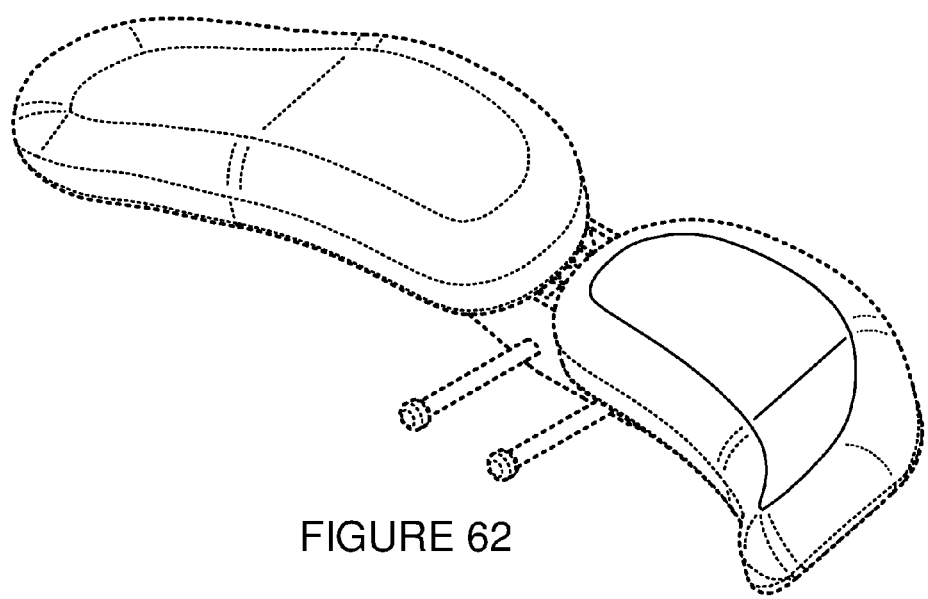
FIG. 62 is a top left perspective view of the bicycle seat of FIG. 1, illustrating another ornamental bicycle seat pad design embodiment.
Figure 63:
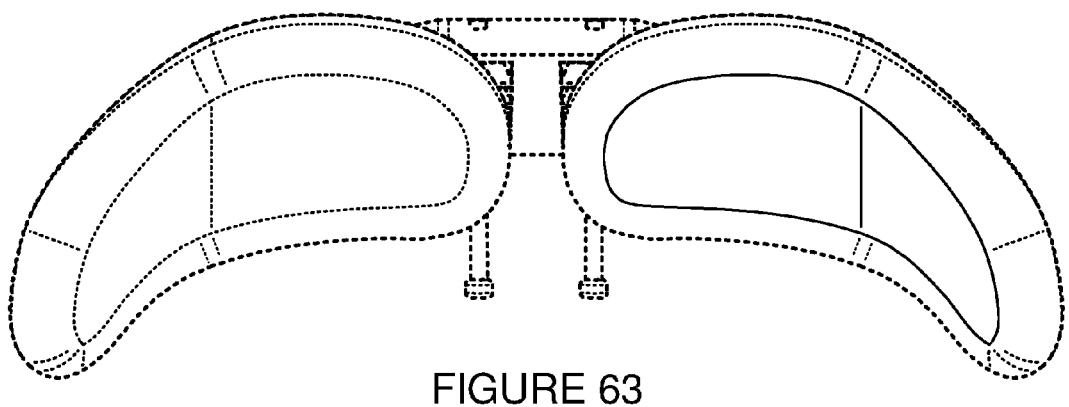
FIG. 63 is a top view of the bicycle seat pad design embodiment of FIG. 62.
Figure 64:
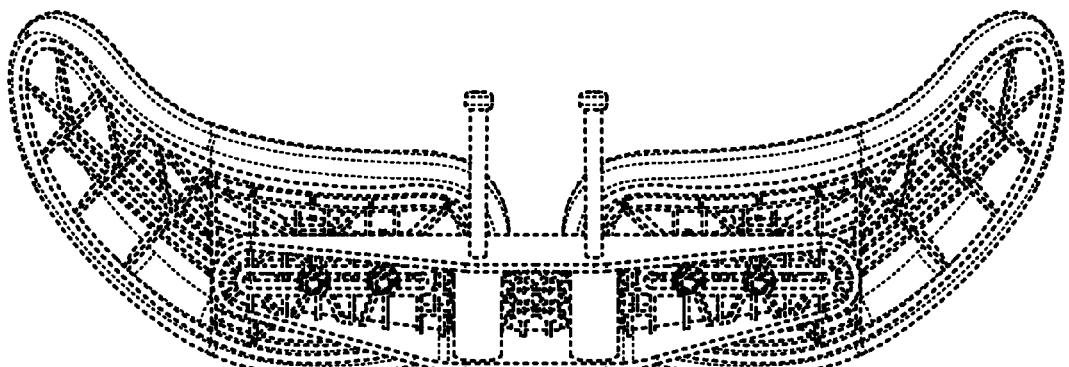
FIG. 64 is a bottom view of the bicycle seat pad design embodiment of FIG. 62.
Figure 65:
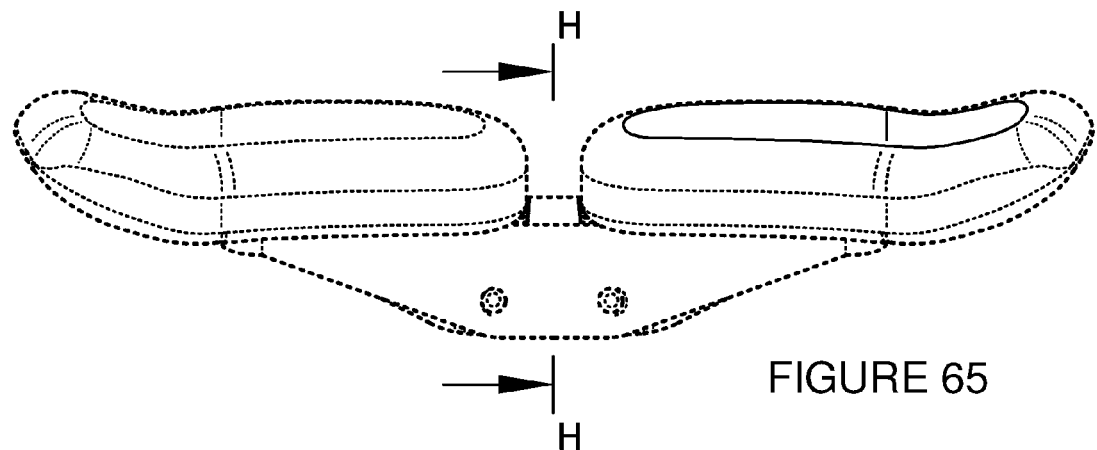
FIG. 65 is a front view of the bicycle seat pad design embodiment of FIG. 62.
Figure 66:
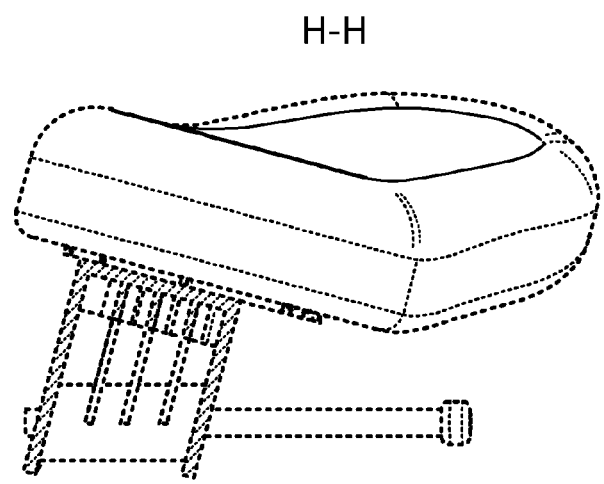
FIG. 66 is a sectional view taken along line H-H of FIG. 62.
Figure 67:
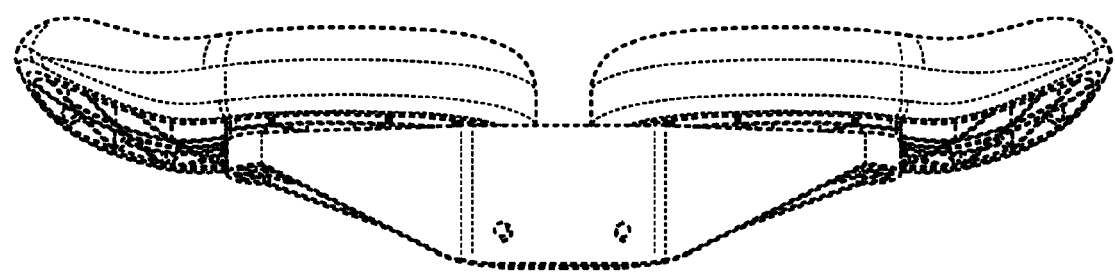
FIG. 67 is a rear view of the bicycle seat pad design embodiment of FIG. 62.
Figure 68:
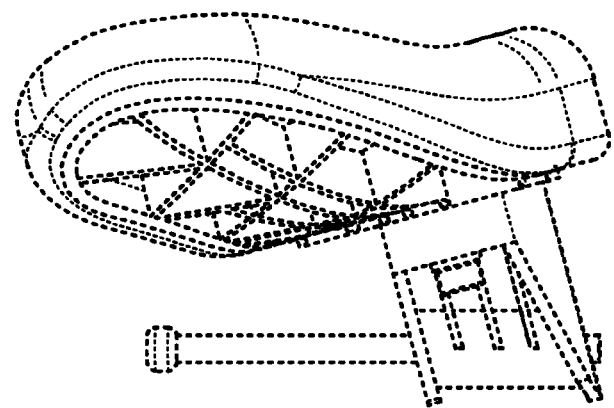
FIG. 68 is a left side view of the bicycle seat pad design embodiment of FIG. 62.
Figure 69:
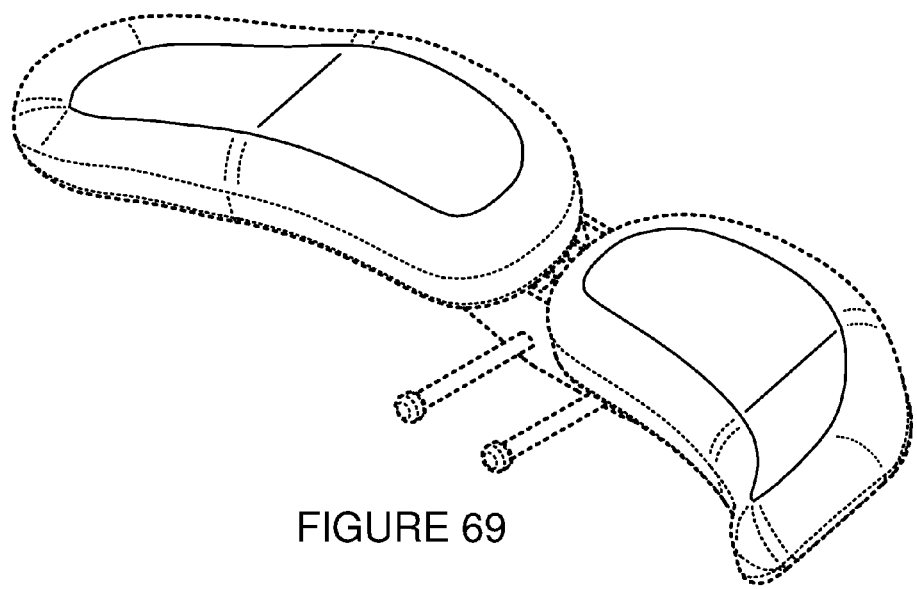
FIG. 69 is a top left perspective view of the bicycle seat of FIG. 1, illustrating another ornamental bicycle seat pad design embodiment.
Figure 70:
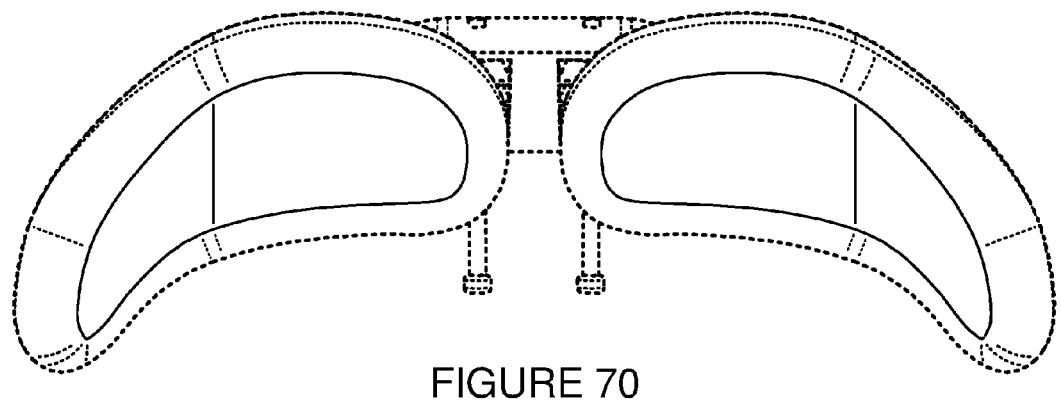
FIG. 70 is a top view of the bicycle seat pad design embodiment of FIG. 69.
Figure 71:
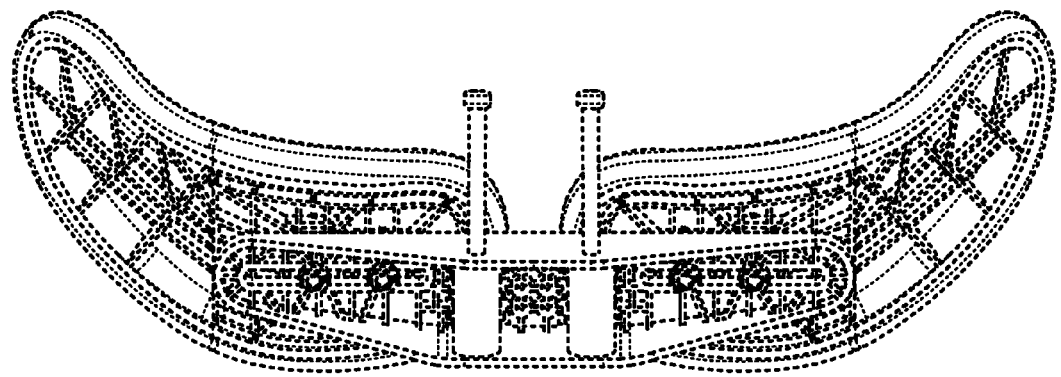
FIG. 71 is a bottom view of the bicycle seat pad design embodiment of FIG. 69.
Figure 72:
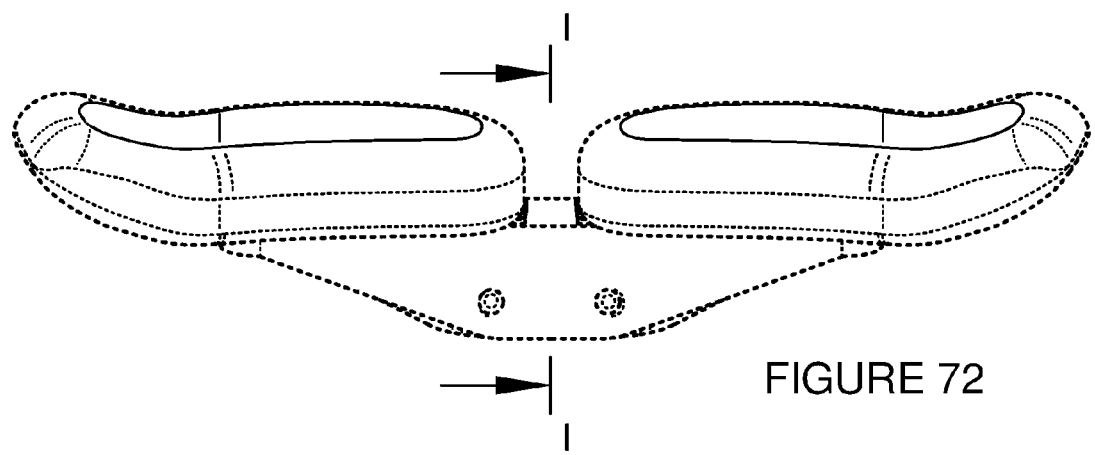
FIG. 72 is a front view of the bicycle seat pad design embodiment of FIG. 69.
Figure 73:
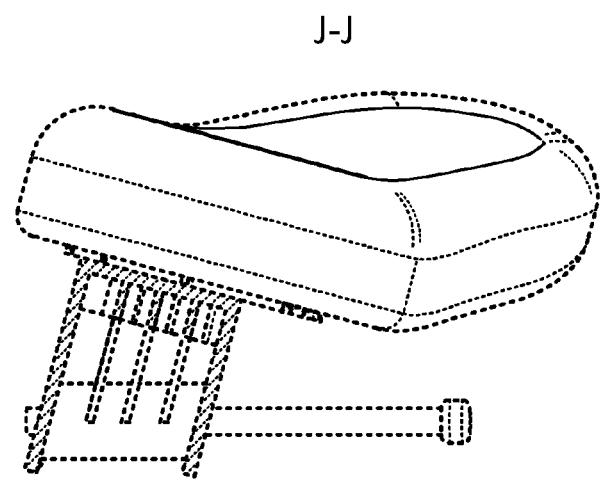
FIG. 73 is a view taken along line I-I of FIG. 72.
Figure 74:
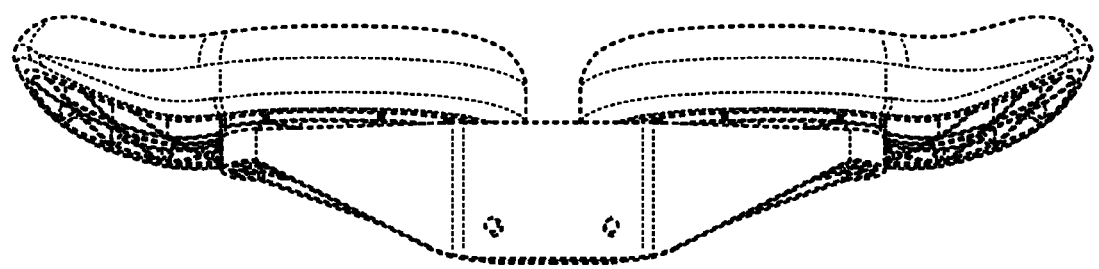
FIG. 74 is a rear view of the bicycle seat pad design embodiment of FIG. 69.
Figure 75:
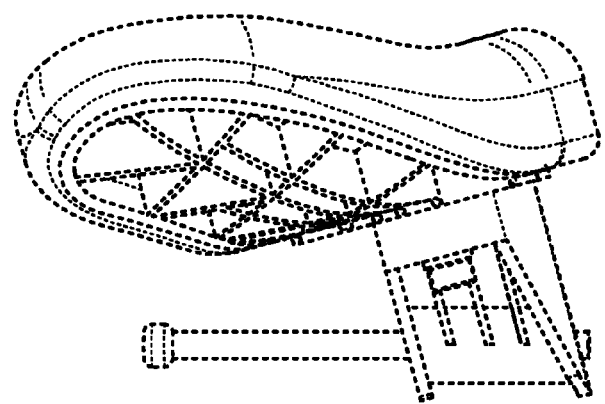
FIG. 75 is a left side view of the bicycle seat pad design embodiment of FIG. 69.
Figure 76:
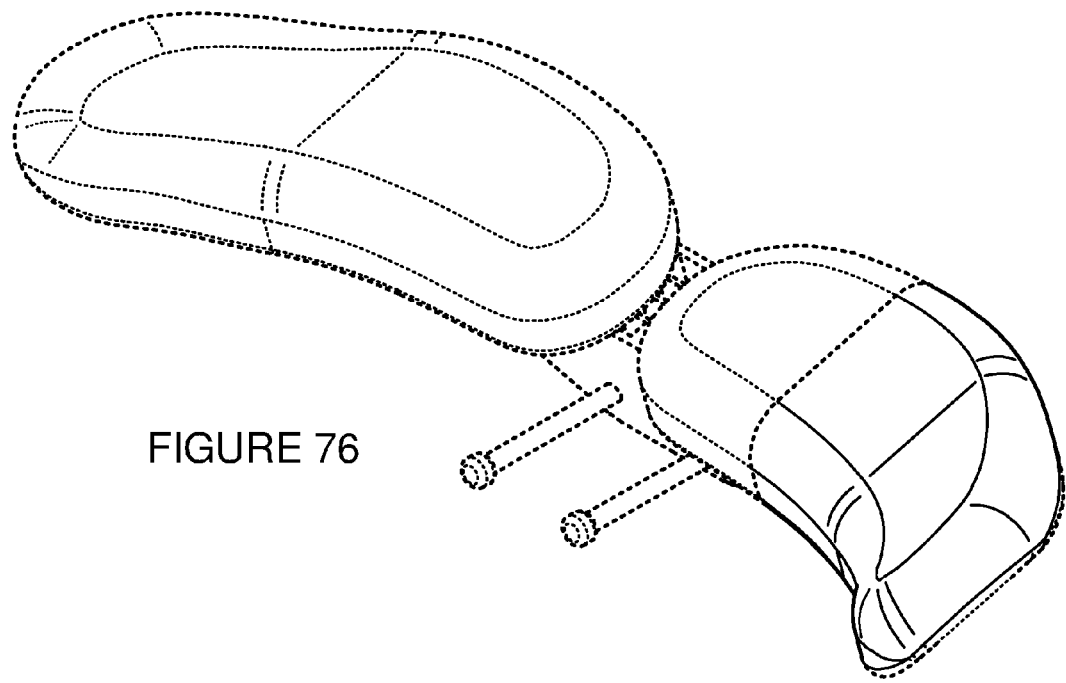
FIG. 76 is a top left perspective view of the bicycle seat of FIG. 1, illustrating another ornamental bicycle seat pad design embodiment.
Figure 77:
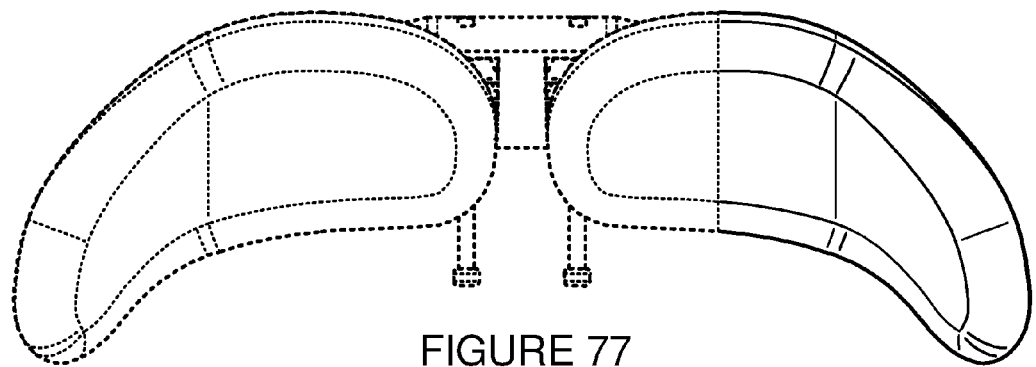
FIG. 77 is a top view of the bicycle seat pad design embodiment of FIG. 76.
Figure 78:
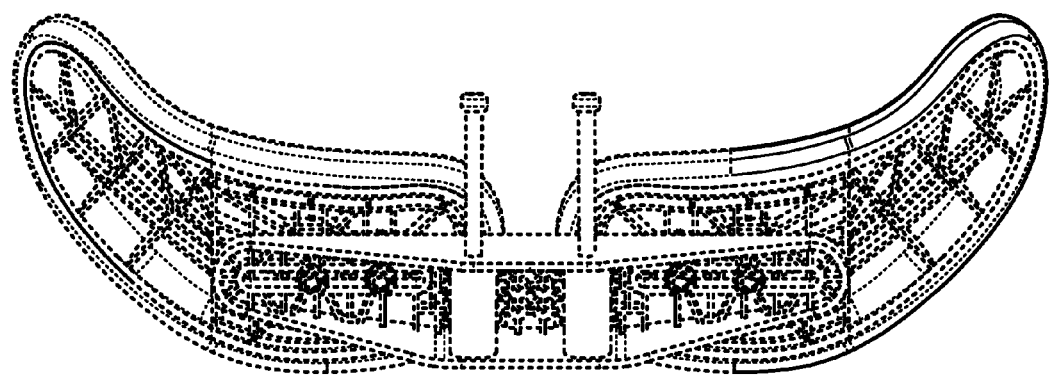
FIG. 78 is a bottom view of the bicycle seat pad design embodiment of FIG. 76.
Figure 79:
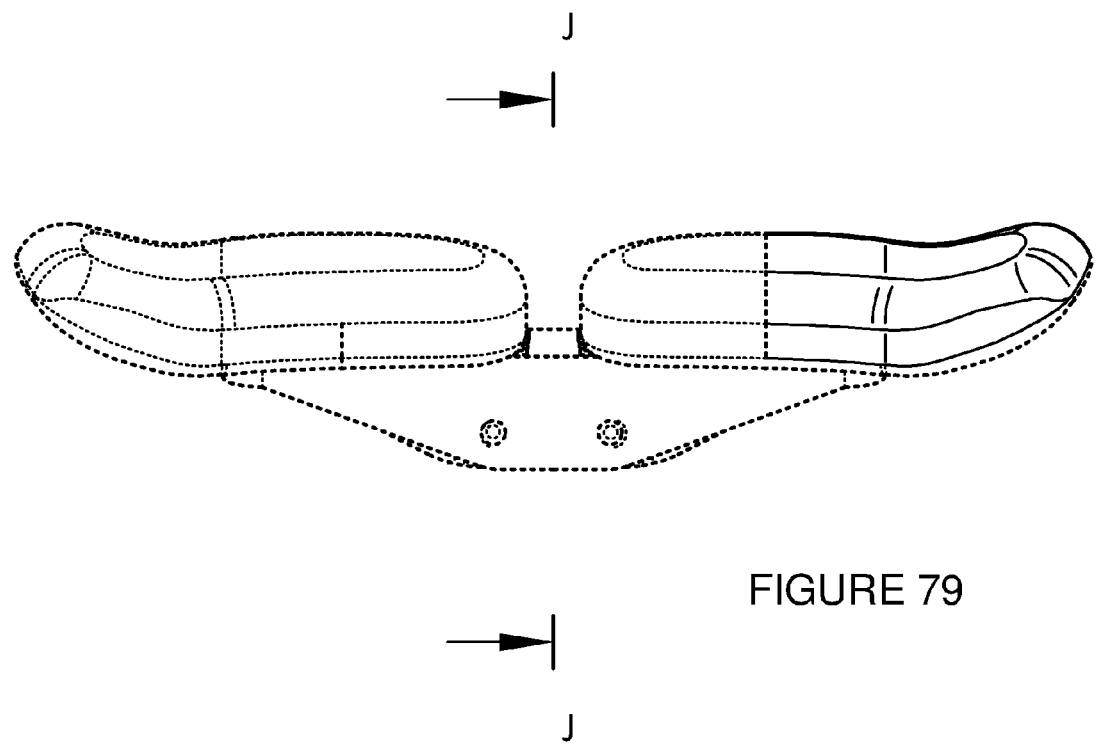
FIG. 79 is a front view of the bicycle seat pad design embodiment of FIG. 76.
Figure 80:
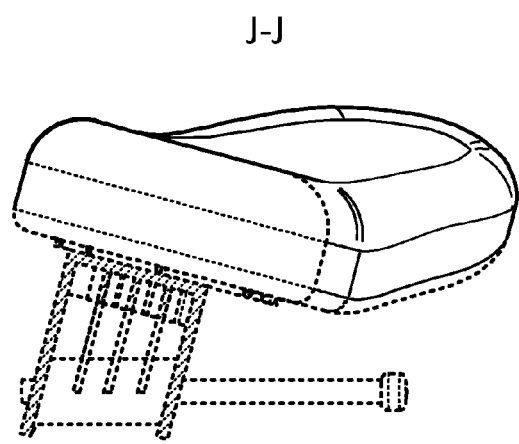
FIG. 80 is a view taken along line J-J of FIG. 79.
Figure 81:
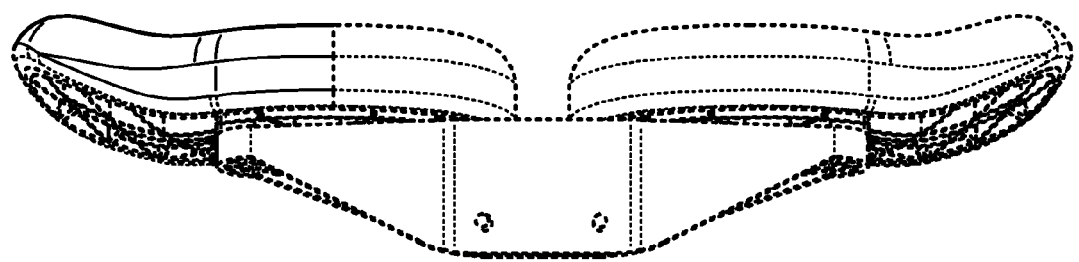
FIG. 81 is a rear view of the bicycle seat pad design embodiment of FIG. 76.
Figure 82:
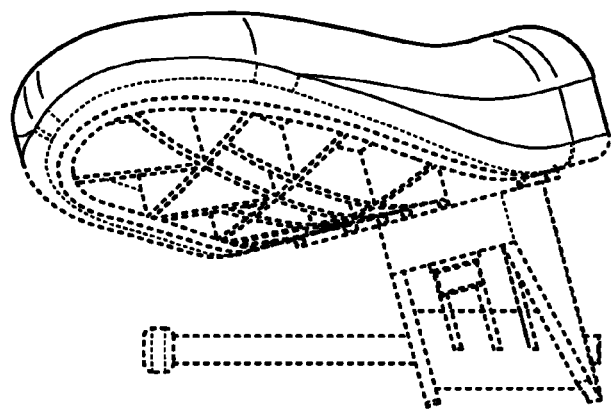
FIG. 82 is a left side view of the bicycle seat pad design embodiment of FIG. 76.
Figure 83:
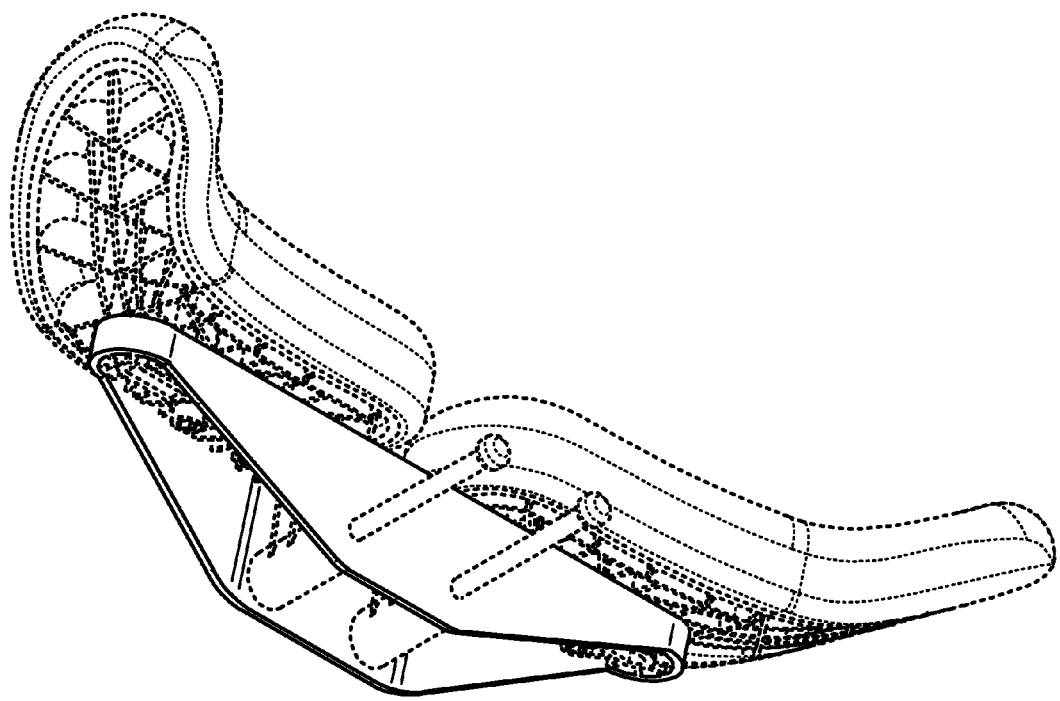
FIG. 83 is a bottom right perspective view of the bicycle seat of FIG. 1, illustrating an ornamental bicycle support frame design embodiment. The design is illustrated in FIG. 83 with attached seat pads and rails to provide context, but subsequent figures illustrate the design with the support frame alone.
Figure 84:
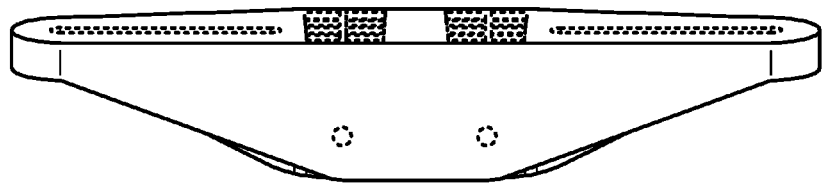
FIG. 84 is a front view of the support frame design embodiment of FIG. 83.
Figure 85:
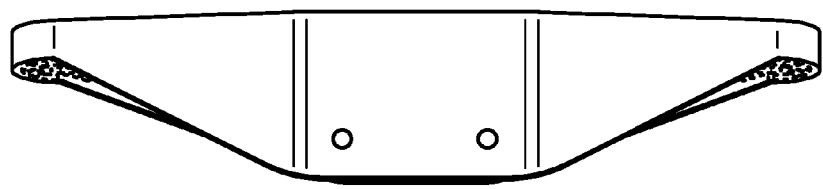
FIG. 85 is a rear view of the support frame design embodiment of FIG. 83.
Figure 86:
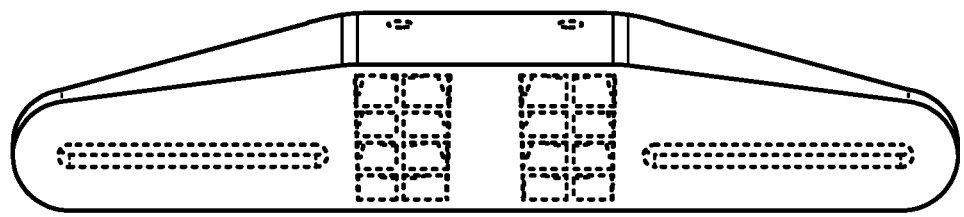
FIG. 86 is a top view of the support frame design embodiment of FIG. 83.
Figure 87:
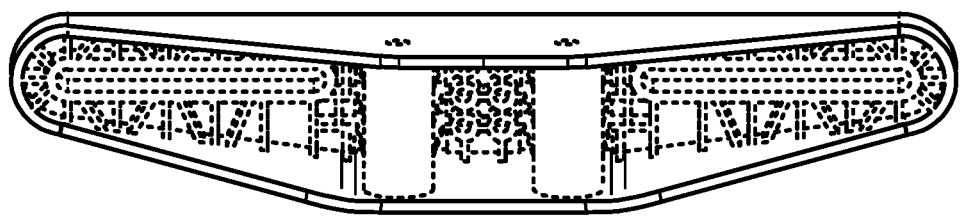
FIG. 87 is a bottom view of the support frame design embodiment of FIG. 83.
Figure 88:
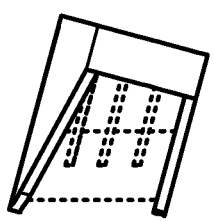
FIG. 88 is a right side view of the support frame design embodiment of FIG. 83.

Referring now to FIGS. 46-47, an alternative bicycle seat will be discussed. In this alternative, the features can be the same as for the bicycle seat discussed above with reference to FIGS. 1-34. However, the support frame 610 can include arm slots 612 that each include a main section 614 that extends in a lateral-medial direction. Each arm slot 612 can also include multiple angled sections 616 that each extend at an angle to the main section 614. For example, as illustrated in FIG. 46, the angled sections 616 can each extend from the main section 614 in a purely forward-rearward direction, while the main section 614 can extend in a purely transverse direction. Alternatively, the arm slots 612 may include sections extending in different directions from those illustrated in FIG. 46 or in the other figures. For example, each side of the support frame could include a main section of the arm slot that angles forward or rearward as it extends away from the medial plane. Also, the arm slot or a pad slot could extend along a curve. For example, a main arm slot extending along a curve could allow the seat pads to be translated along that curve.

Referring now to FIG. 47, an alternative seat pad base 630 is illustrated in the form of a right seat pad base, and a mirror image could be provided for a left seat pad base. Each seat pad base 630 can be the same as the seat pad base 142 discussed above, except that the seat pad base 630 can include a medial pad fastener hole 632 and a lateral pad fastener hole 634 instead of the pad fastener hole 270 and pad fastener slot 250 discussed above. The seat pad base 630 could be used with the support frame 130 discussed above, without providing for rotational adjustment of the seat pad. Alternatively, the seat pad base 630 can be used with the support frame 610. In this case, adjustment of each seat pad base 630 can be performed by sliding fasteners that extend through the slot 612 in the support frame 610 and through the pad fastener holes 632 in the seat pad base 630 along the slot 612. Translational adjustment can be performed by sliding the fasteners along the main section 614, and rotational adjustment can be performed by sliding one of the fasteners along an angled section 616 of the slot 612.

The functions of the bicycle seat embodiments discussed above can be performed with structures having a variety of different materials, and a variety of different shapes. However, the components of the bicycle seat embodiments illustrated in the figures have aesthetically pleasing ornamental appearances. Some particular ornamental features are set forth as designs illustrated in FIGS. 48-88. In particular, FIGS. 48-54 illustrate a design embodiment for the overall seat cushion shape for both seat cushions from the seat of FIG. 1, excluding the curved lower surfaces of the cushions. FIGS. 55-61 illustrate a design embodiment for this overall seat cushion shape for the seat of FIG. 1, but only for a left seat cushion. A similar design can be illustrated for the right seat cushion, of course. FIGS. 62-68 illustrate a design for a top surface of the left cushion of the seat of FIG. 1 (the portions of the top surface, which do not curve in a forward-rearward direction in the positions illustrated in FIGS. 62-68). Again, a similar design can be illustrated for the right seat cushion. FIGS. 69-75 illustrate a design for top surfaces of both seat cushions of the seat of FIG. 1. FIGS. 76-82 illustrate a design for the overall seat cushion shape, but excluding a bottom portion, and excluding a medial portion on the medial side of a vertical forward-rearward plane extending through the main seat portion lobe of the cushion's general kidney shape. A similar design can include the same portion of the seat shape for just the right cushion, or for both cushions. Also, a design can include just the top portion (as in the designs of FIGS. 62-75) of one or both seat cushions, but excluding the portion(s) of the top surface on the medial side of this vertical forward-rearward plane.

FIGS. 83-88 illustrate a design for the overall shape of the rear wall, forward wall, and end walls of the support frame of the bicycle seat of FIG. 1, but excluding the features of the upper surface of the roof. Alternatively, the design could include one or more features of the roof, such as the features of the arm slots and/or arm slot walls, and or the openings and/or walls above the receptacles of the support frame. Also, the design could exclude the front wall, the rear wall, and/or the end walls of the support frame. The design could also include some features of the receptacles, and could possibly also include the rails and/or knobs.

Figure 37:
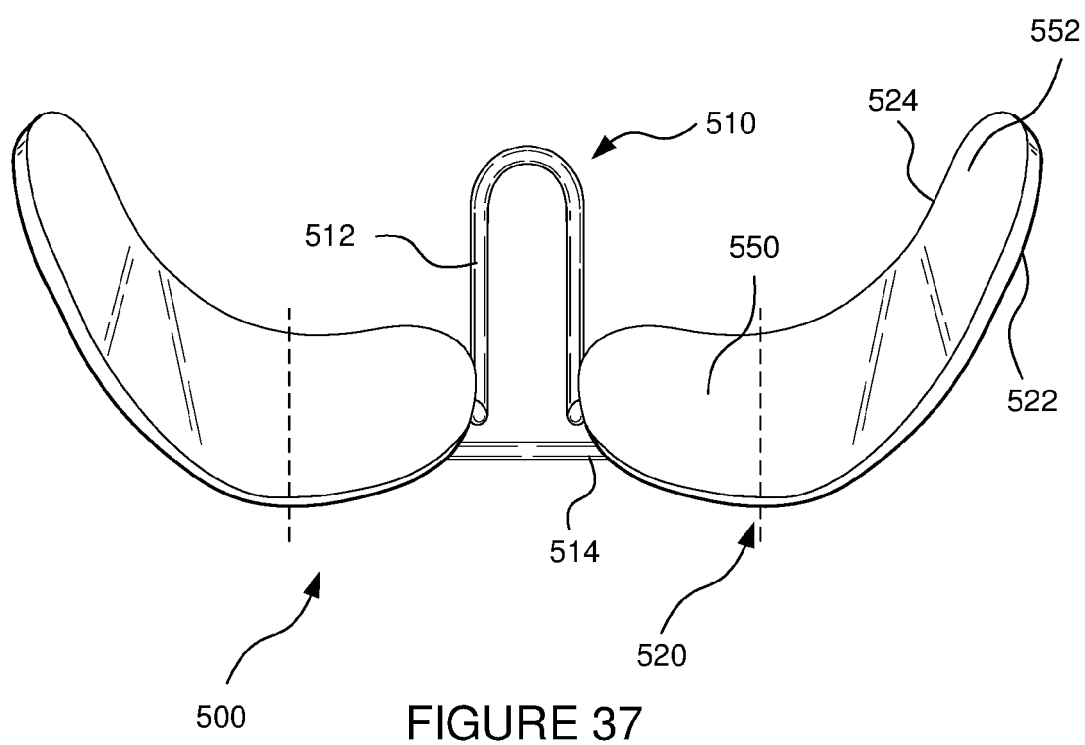
FIG. 37 is a top view of the bicycle seat of FIG. 36.
Figure 38:
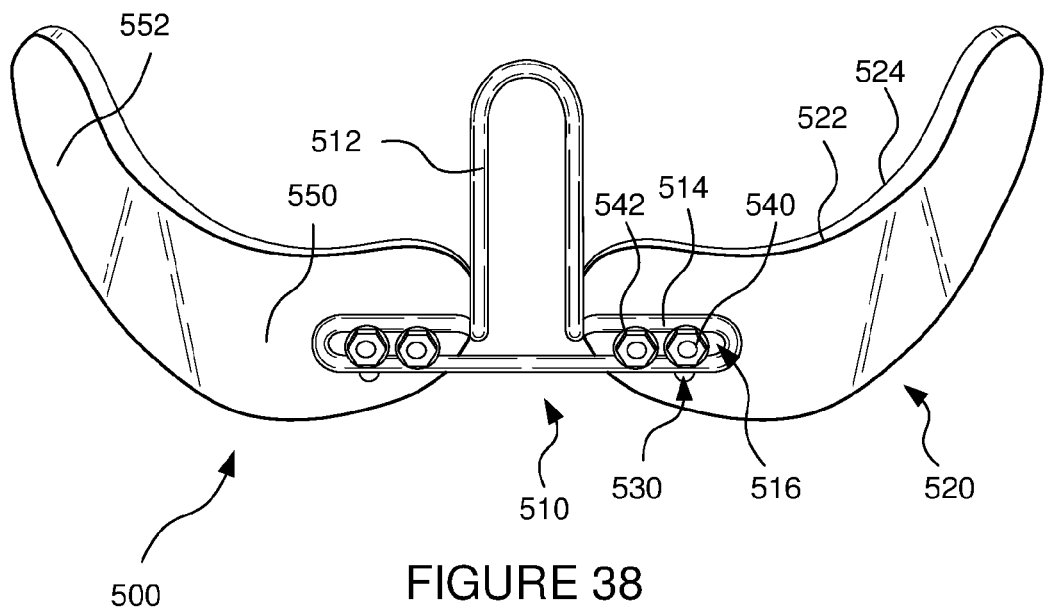
FIG. 38 is a bottom view of the bicycle seat of FIG. 36.
Figure 39:
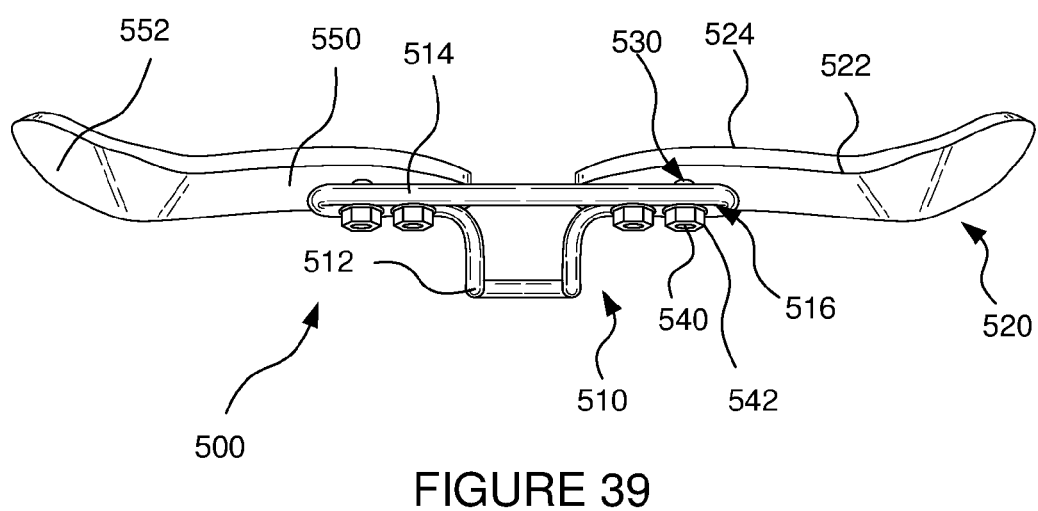
FIG. 39 is a rear view of the bicycle seat of FIG. 36.

Additionally, the seat illustrated in FIGS. 36-45 illustrates another design embodiment, and the seat pads of that design embodiment can present ornamental designs, such as a design covering the top and side visible surfaces of one or both cushions, just the top surface of one or both cushions, just the side surfaces of one or both cushions, or the top surface (or top and side visible surfaces, or just side visible surfaces) of just a portion of one or both cushions that is laterally beyond left and right planes illustrated by dashed lines in FIG. 37.

Also, the ornamental designs can include combinations of the ornamental features discussed above, such as an ornamental design embodiment that includes ornamental features of the seat pad(s) and the support frame.

Figure 89:
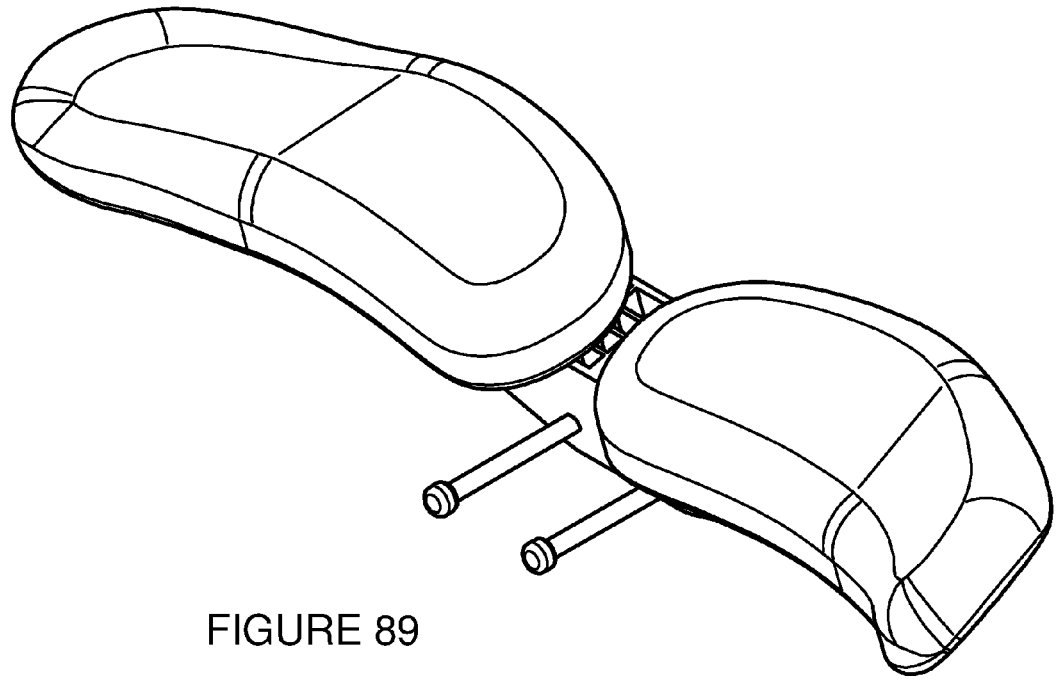
FIG. 89 is a top left perspective view of the bicycle seat of FIG. 1 with the seat pads in an alternative position that is different from the position in FIG. 1.
Figure 90:
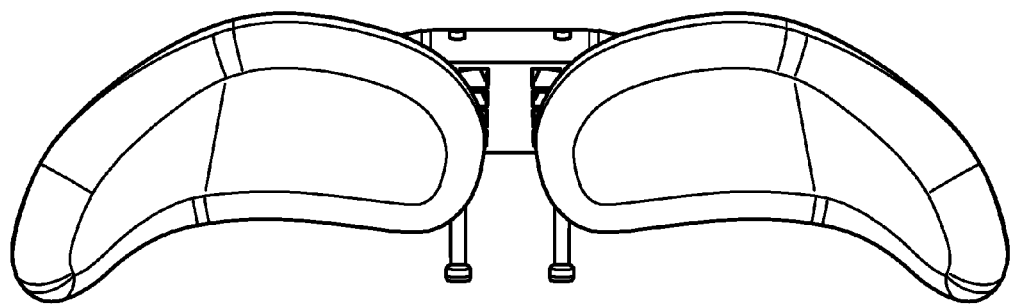
FIG. 90 is a top view of the bicycle seat of FIG. 89.
Figure 91:
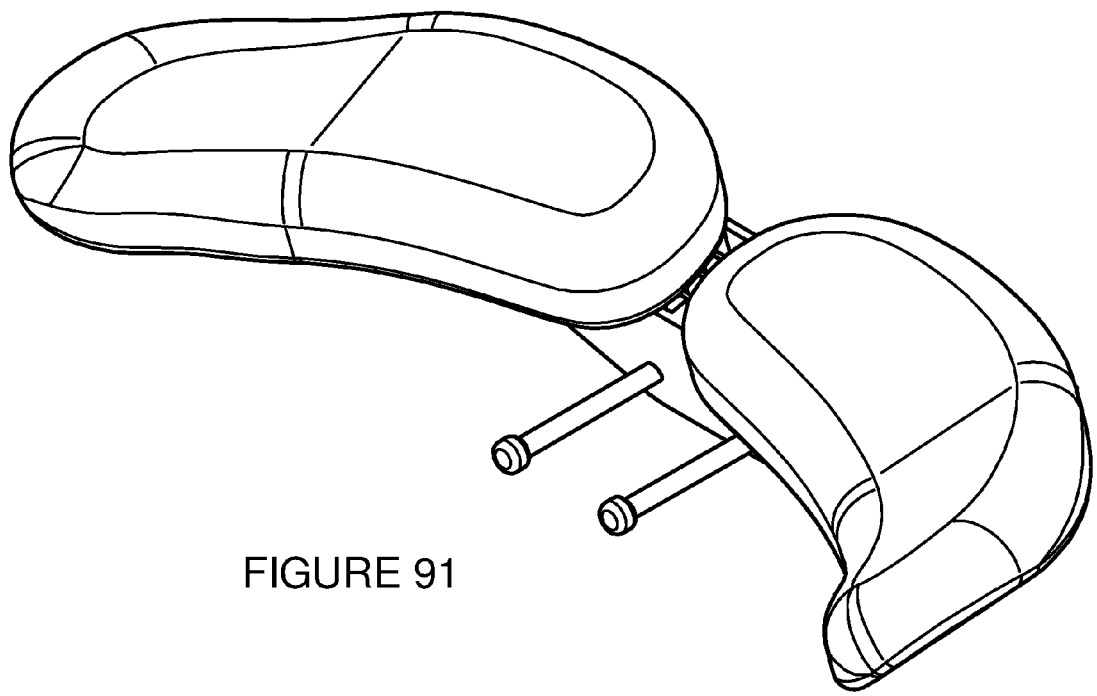
FIG. 91 is a top left perspective view of the bicycle seat of FIG. 1 with the seat pads in another alternative position that is different from the position in FIG. 1.
Figure 92:
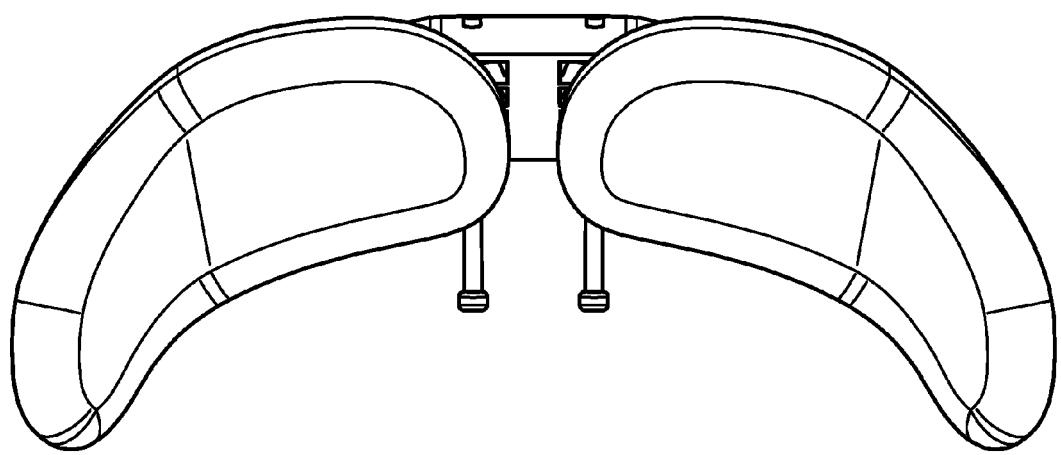
FIG. 92 is a top view of the bicycle seat of FIG. 91.
Figure 93:
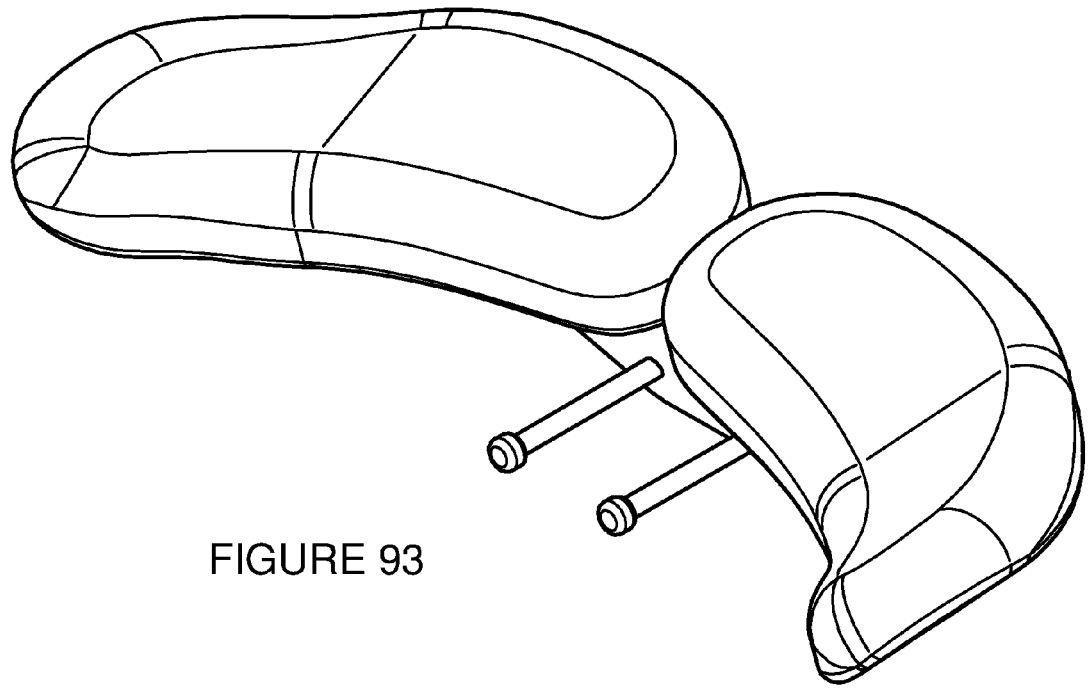
FIG. 93 is a top left perspective view of the bicycle seat of FIG. 1 with the seat pads in yet another alternative position that is different from the position in FIG. 1.
Figure 94:
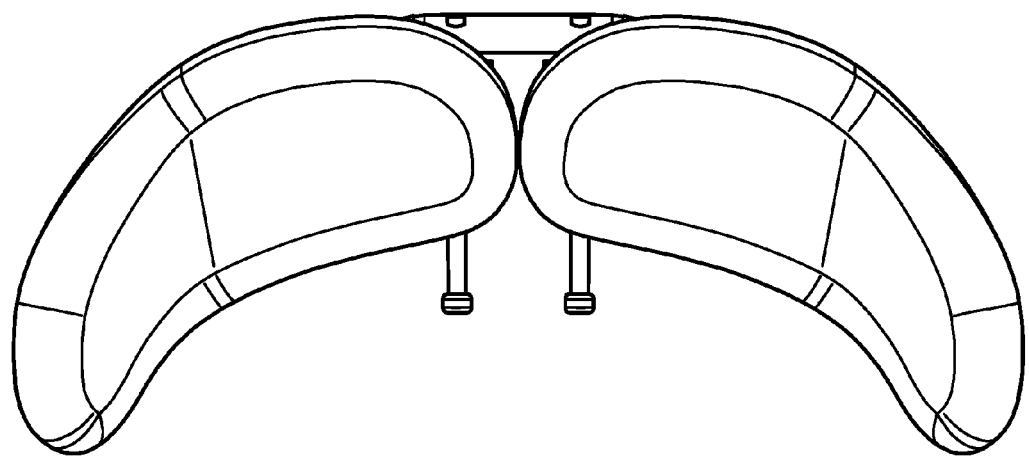
FIG. 94 is a top view of the bicycle seat of FIG. 93.
Figure 95:
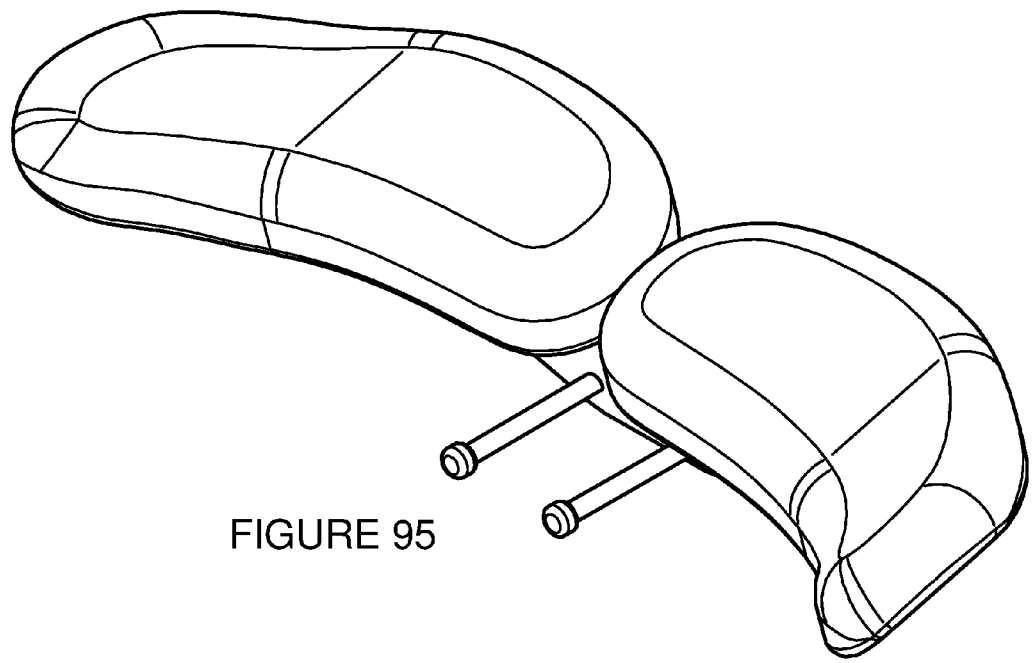
FIG. 95 is a top left perspective view of the bicycle seat of FIG. 1 with the seat pads in yet another alternative position that is different from the position in FIG. 1.
Figure 96:
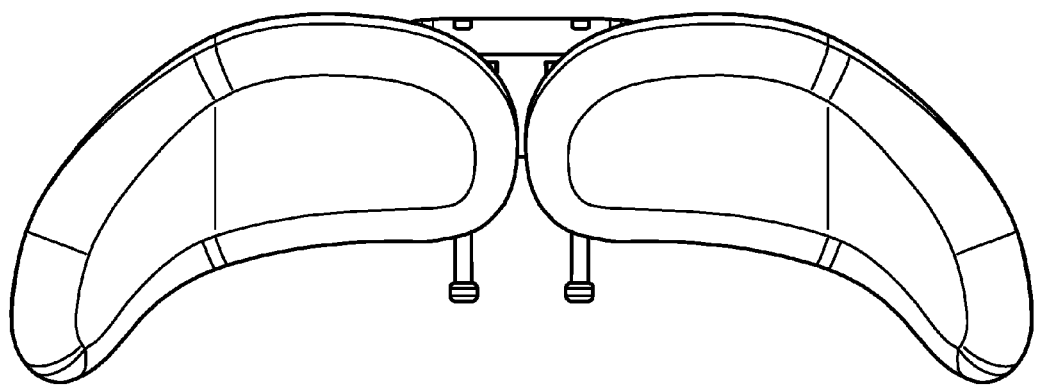
FIG. 96 is a top view of the bicycle seat of FIG. 95.
Figure 97:
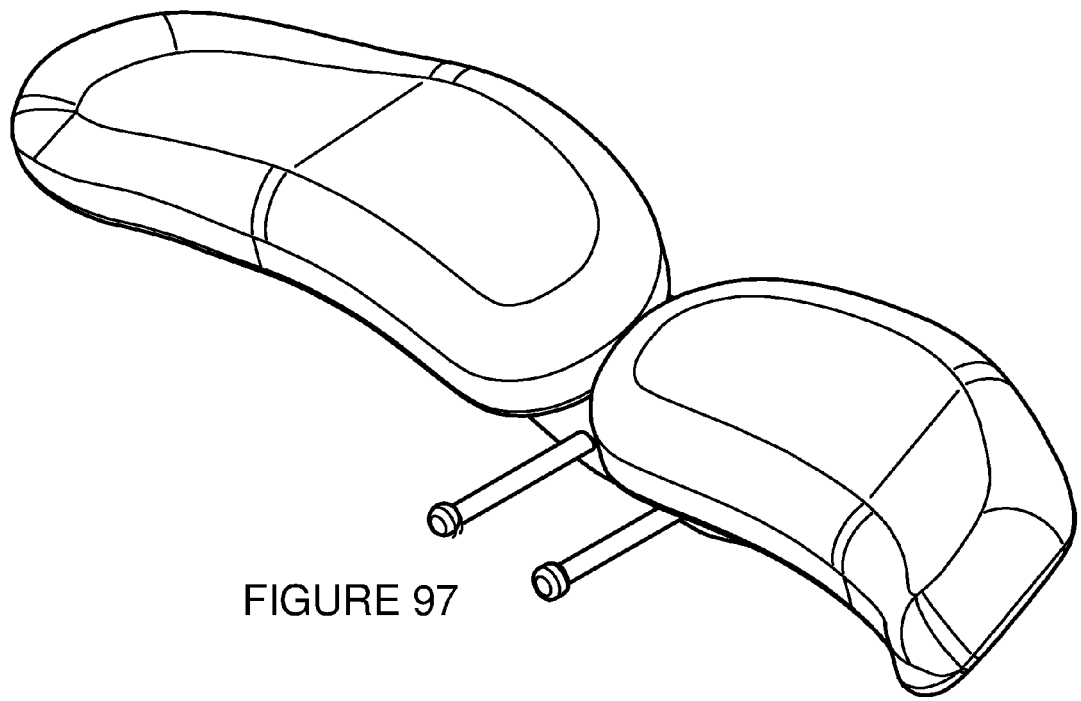
FIG. 97 is a top left perspective view of the bicycle seat of FIG. 1 with the seat pads in yet another alternative position that is different from the position in FIG. 1.
Figure 98:
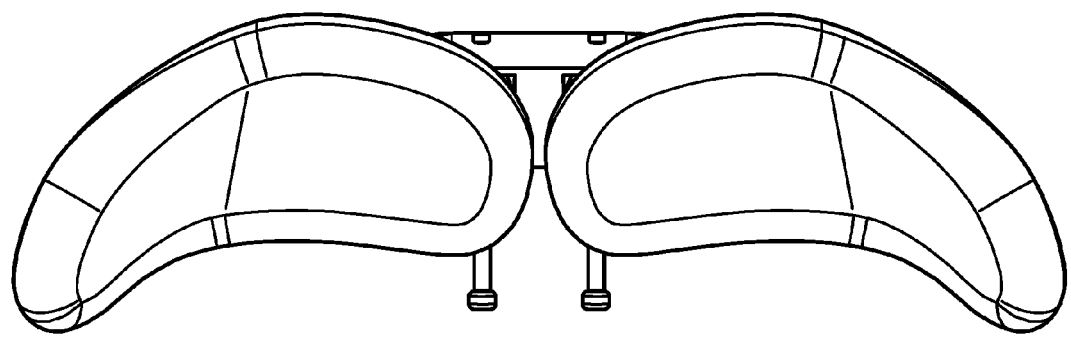
FIG. 98 is a top view of the bicycle seat of FIG. 97.
Figure 99:
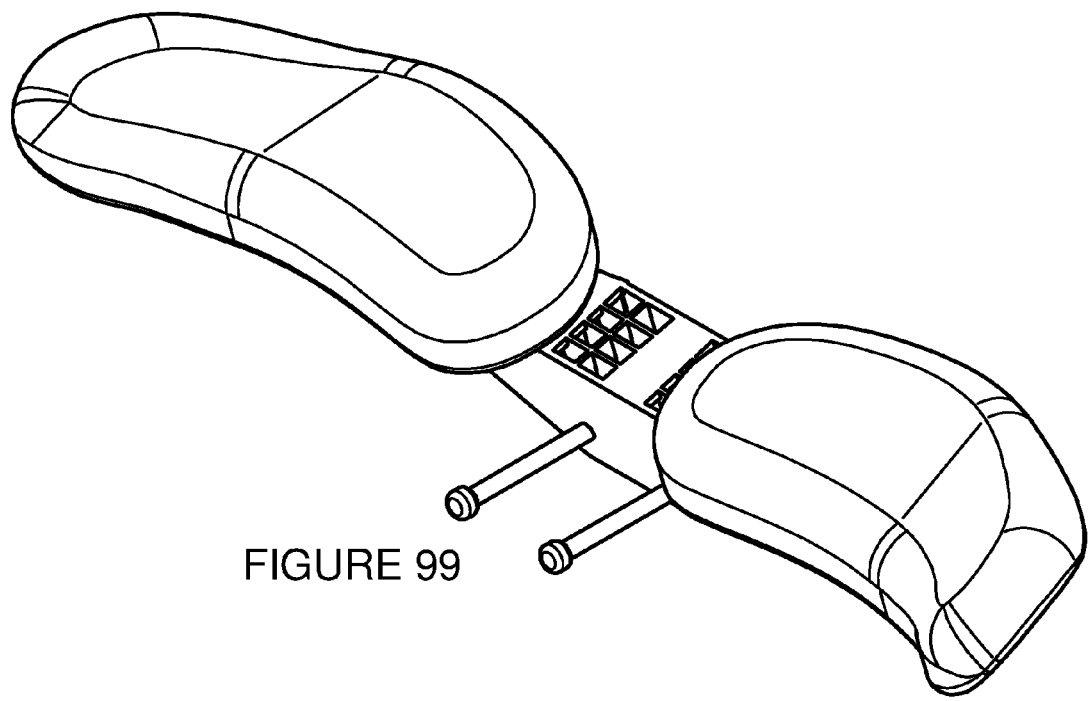
FIG. 99 is a top left perspective view of the bicycle seat of FIG. 1 with the seat pads in yet another alternative position that is different from the position in FIG. 1.
Figure 100:
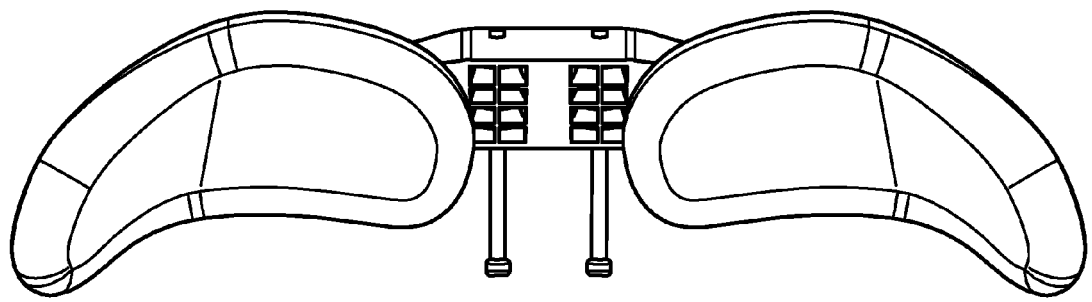
FIG. 100 is a top view of the bicycle seat of FIG. 99.
Figure 101:
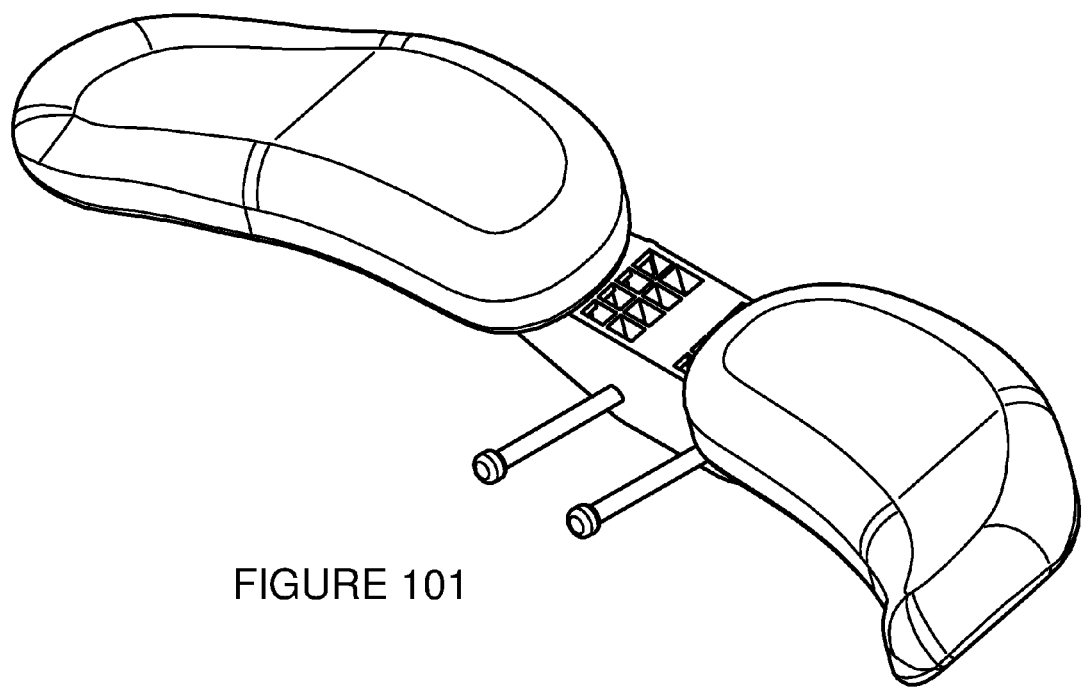
FIG. 101 is a top left perspective view of the bicycle seat of FIG. 1 with the seat pads in yet another alternative position that is different from the position in FIG. 1.
Figure 102:
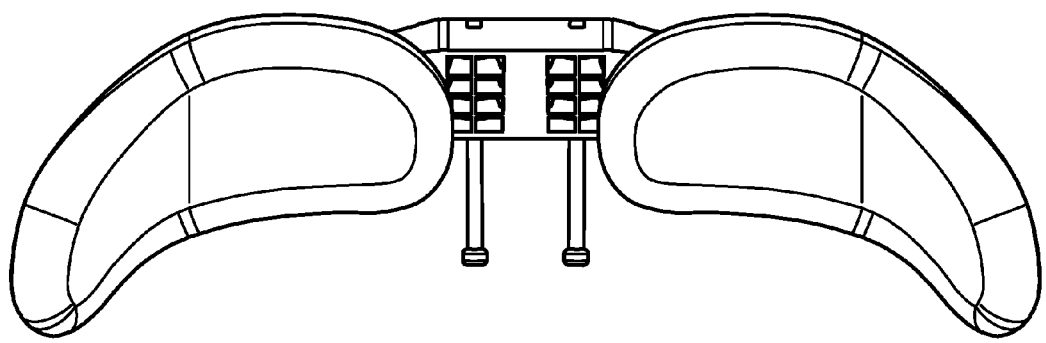
FIG. 102 is a top view of the bicycle seat of FIG. 101.
Figure 103:
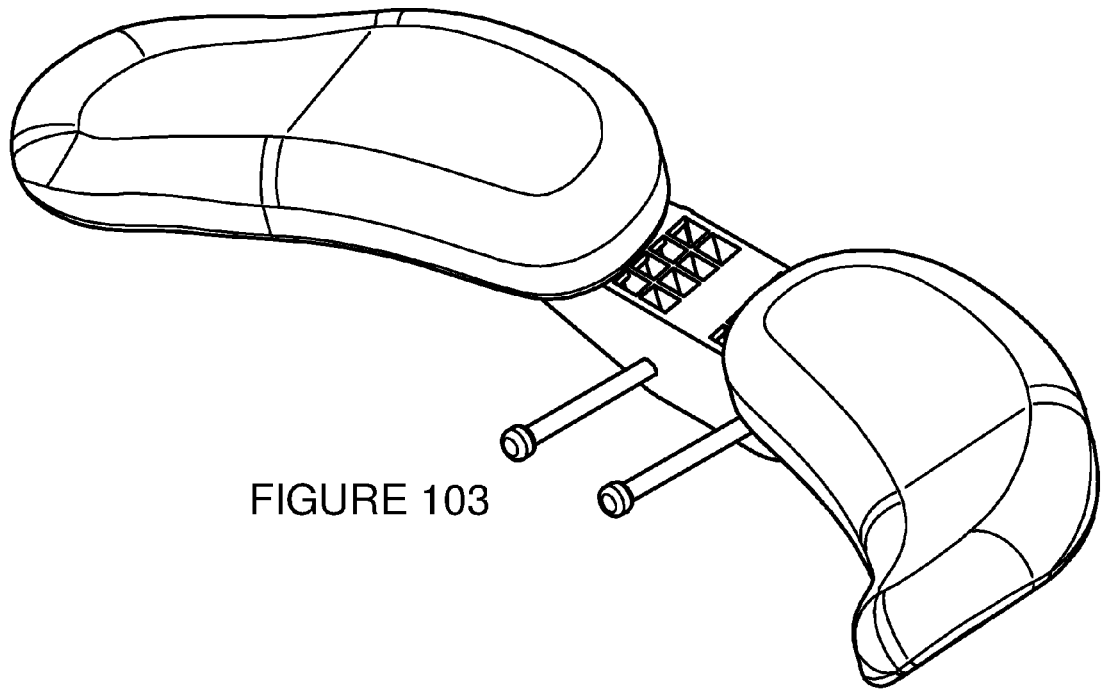
FIG. 103 is a top left perspective view of the bicycle seat of FIG. 1 with the seat pads in yet another alternative position that is different from the position in FIG. 1.
Figure 104:
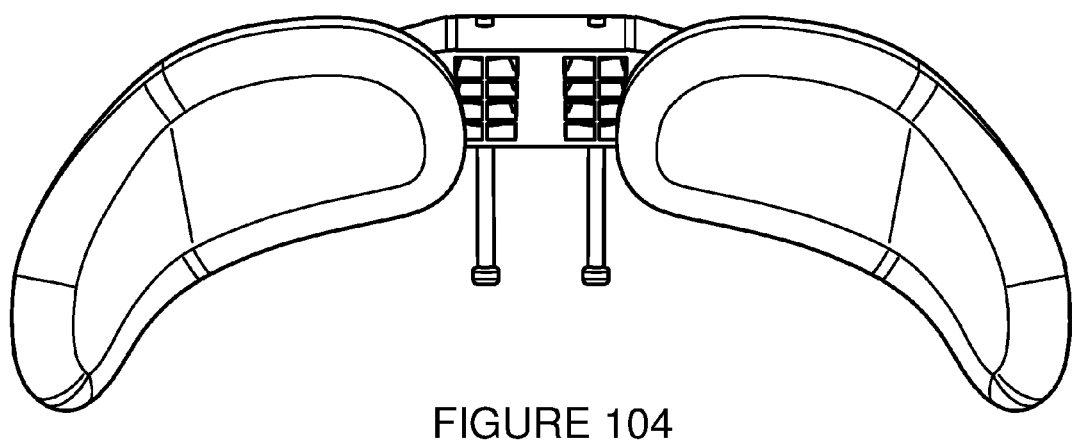
FIG. 104 is a top view of the bicycle seat of FIG. 103.

Additionally, each of the designs discussed above that includes more than just a seat pad can include any of multiple alternative positions of the seat pads relative to each other and/or relative to the support frame, which can result from the adjustments of the seat pads discussed herein. A first alternative position is illustrated in FIGS. 89-90. A second alternative position is illustrated in FIGS. 91-92. A third alternative position is illustrated in FIGS. 93-94. A fourth alternative position is illustrated in FIGS. 95-96. A fifth alternative position is illustrated in FIGS. 97-98. A sixth alternative position is illustrated in FIGS. 99-100. A seventh alternative position is illustrated in FIGS. 101-102. An eight alternative position is illustrated in FIGS. 103-104.

III. Example Seat Adjustment

Figure 105:
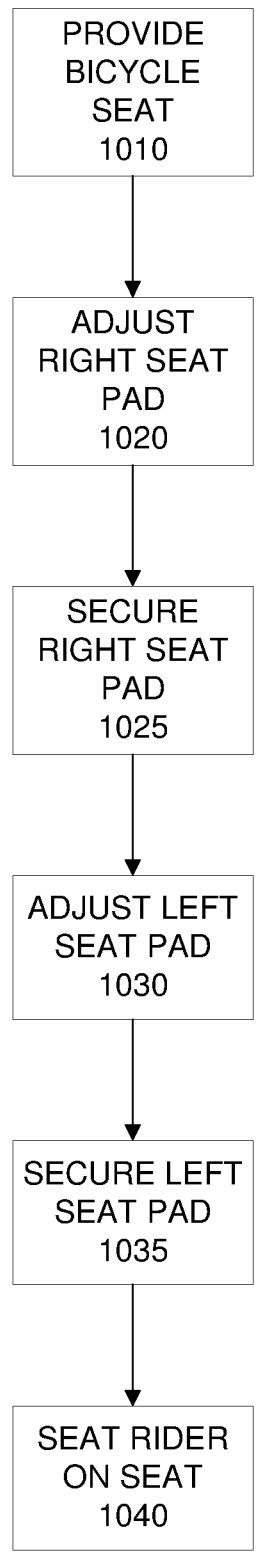
FIG. 105 is a flowchart illustrating a technique for adjusting a bicycle seat.

An example of adjusting a bicycle seat will now be discussed with reference to the flowchart of FIG. 105. The method can include providing 1010 the bicycle seat. The bicycle seat can include one or more of the bicycle seat features discussed above. For example, the bicycle seat can include a support frame secured to an attachment structure that is configured to be attached to a bicycle frame of a bicycle; a right seat pad attached to the support frame; and a left seat pad attached to the support frame. The right seat pad can be adjusted 1020 to a right seat pad position, with the adjusting of the right seat pad comprising translating and rotating the right seat pad relative to the left seat pad, and the right seat pad position comprising a position wherein a right main pad portion of the right seat pad directly provides upward support to a rider's right ischium, and wherein a right extension of the right seat pad extends to the right and forward beyond the right main pad portion. The right seat pad can be secured 1025 to the support frame in the right seat pad position. The left seat pad can be adjusted 1030 to a left seat pad position. The adjusting 1030 of the left seat pad can include translating and rotating the left seat pad relative to the right seat pad. The left seat pad position can include a position wherein a left main pad portion of the left seat pad directly provides upward support to the rider's left ischium and wherein a left extension of the left seat pad extends to the left and forward beyond the left main pad portion. The left seat pad can be secured 1035 to the support frame in the left seat pad position. A rider can be seated 1040 on the seat with the right seat pad in the right seat pad position and the left seat pad in the left seat pad position. Additionally, the following can be performed with the bicycle seat with the rider seated on the seat: the right main pad portion of the right seat pad providing upward support to the rider's right ischium; the right extension of the right seat pad extending to the right and forward beyond the right main pad portion, with the right extension applying a medial pressure against the rider's right coxal bone (such as directly applying such pressure or applying such pressure via an upper extremity of the rider's right femur bone); the left main pad portion of the left seat pad providing upward support to the rider's left ischium; and the left extension of the left seat pad extending to the left and forward beyond the left main pad portion, with the left extension applying a medial pressure against the rider's left coxal bone (such as directly applying such pressure or applying such pressure via an upper extremity of the rider's right femur bone).

The support frame may further include the following: a right arm secured to the attachment structure and extending laterally to the right from a vertically-oriented medial plane of the bicycle seat; and a left arm secured to the attachment structure and extending laterally to the left from the medial plane, wherein the right seat pad is configured to be secured to the right arm and adjusted relative to the right arm, and wherein the left seat pad is configured to be secured to the left arm and adjustable relative to the left arm. The adjusting of the right seat pad can include sliding a fastener along a right arm slot in the right arm, and the adjusting of the left seat pad can include sliding a fastener along a left arm slot in the left arm. The adjusting of the right seat pad can include sliding a fastener along a right pad slot in the right seat pad, and the adjusting of the left seat pad can include sliding a fastener along a left pad slot in the left seat pad.

In the adjustment, the support frame may further include the following: a right arm secured to the attachment structure and extending laterally to the right of a vertically-oriented medial plane of the bicycle seat; and a left arm secured to the attachment structure and extending laterally to the left of the medial plane, wherein the right seat pad is configured to be secured to the right arm and adjusted relative to the right arm, and wherein the left seat pad is configured to be secured to the left arm and adjustable relative to the left arm. The adjusting of the right seat pad may further comprise sliding a first right side fastener along a first right arm slot section of a right arm slot extending laterally along the right arm, and sliding a second right side fastener along the first arm slot section and along a right-side angled slot section that extends at an angle to the first right arm slot section. The securing of the right seat pad can include securing the first and second right side fasteners. The adjusting of the left seat pad may include sliding a first left side fastener along a first left arm slot section of a left arm slot extending laterally along the left arm, and sliding a second left side fastener along the first left arm slot section and along a left-side angled slot section that extends at an angle to the first left arm slot section. The securing of the left seat pad can include securing the first left side fastener and securing the second left side fastener.

The right-side angled slot section can be a section of the right arm slot, and the left-side angled slot section can be a section of the left arm slot. Alternatively, the right-side angled slot section can be a section of a right seat pad slot in the right seat pad, and the left-side angled slot section can be a section of a left seat pad slot in the left seat pad.

The adjusting of the right set pad can include sliding a right side fastener along a right arm slot section in a right arm slot in a right arm of the support frame to translate the right seat pad, and rotating the right seat pad around the right side fastener to rotate the right seat pad. Similarly, the adjusting of the left seat pad can include sliding a left side fastener along a left arm slot section in a left arm slot in a left arm of the support frame to translate the left seat pad, and rotating the left seat pad around the left side fastener to rotate the left seat pad.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A method of adjusting a bicycle seat for a rider comprising:

providing the bicycle seat, with the bicycle seat comprising:

a support frame secured to an attachment structure that is configured to be attached to a bicycle frame of a bicycle;
a right seat pad attached to the support frame; and
a left seat pad attached to the support frame;
adjusting the right seat pad to a right seat pad position, the adjusting of the right seat pad comprising translating and rotating the right seat pad relative to the left seat pad, and the right seat pad position comprising a position wherein a right main pad portion of the right seat pad aligning with and providing upward support to a rider's right ischium, and wherein a right extension of the right seat pad extends to the right and forward beyond the right main pad portion;
securing the right seat pad to the support frame in the right seat pad position;
adjusting the left seat pad to a left seat pad position, the adjusting of the left seat pad comprising translating and rotating the left seat pad relative to the right seat pad, and the left seat pad position comprising a position wherein a left main pad portion of the left seat pad aligning with and providing upward support to the rider's left ischium, and wherein a left extension of the left seat pad extends to the left and forward beyond the left main pad portion;
securing the left seat pad to the support frame in the left seat pad position;
seating the rider on the seat with the right seat pad in the right seat pad position and the left seat pad in the left seat pad position, and performing the following with the bicycle seat with the rider seated on the seat:
the right main pad portion of the right seat pad providing upward support to the rider's right ischium;
the right extension of the right seat pad extending to the right and forward beyond the right main pad portion, with the right extension applying a medial pressure against the rider's right coxal bone;
the left main pad portion of the left seat pad providing upward support to the rider's left ischium; and
the left extension of the left seat pad extending to the left and forward beyond the left main pad portion, with the left extension applying a medial pressure against the rider's left coxal bone.

2. The method of claim 1, wherein the support frame further comprises:
a right arm secured to the attachment structure and extending laterally to the right from a vertically-oriented medial plane of the bicycle seat; and
a left arm secured to the attachment structure and extending laterally to the left from the medial plane, wherein the right seat pad is configured to be secured to the right arm and adjusted relative to the right arm, and wherein the left seat pad is configured to be secured to the left arm and adjustable relative to the left arm.

3. The method of claim 2, wherein:
the adjusting of the right seat pad comprises sliding a fastener along a right arm slot in the right arm; and
the adjusting of the left seat pad comprises sliding a fastener along a left arm slot in the left arm.

4. The method of claim 1, wherein:
the adjusting of the right seat pad comprises sliding a fastener along a right pad slot in the right seat pad; and
the adjusting of the left seat pad comprises sliding a fastener along a left pad slot in the left seat pad.

5. The method of claim 1, wherein:
the support frame further comprises:
a right arm secured to the attachment structure and extending laterally to the right of a vertically-oriented medial plane of the bicycle seat; and
a left arm secured to the attachment structure and extending laterally to the left of the medial plane, wherein the right seat pad is configured to be secured to the right arm and adjusted relative to the right arm, and wherein the left seat pad is configured to be secured to the left arm and adjustable relative to the left arm;
the adjusting of the right seat pad comprises:
sliding a first right side fastener along a first right arm slot section of a right arm slot extending laterally along the right arm; and
sliding a second right side fastener along the first arm slot section and along a right-side angled slot section that extends at an angle to the first right arm slot section;
the securing of the right seat pad comprises securing the first right side fastener and securing the second right side fastener;
the adjusting of the left seat pad comprises:
sliding a first left side fastener along a first left arm slot section of a left arm slot extending laterally along the left arm; and
sliding a second left side fastener along the first left arm slot section and along a left-side angled slot section that extends at an angle to the first left arm slot section; and
the securing of the left seat pad comprises securing the first left side fastener and securing the second left side fastener.

6. The method of claim 5, wherein the right-side angled slot section is a section of the right arm slot, and the left-side angled slot section is a section of the left arm slot.

7. The method of claim 5, wherein the right-side angled slot section is a section of a right seat pad slot in the right seat pad, and wherein the left-side angled slot section is a section of a left seat pad slot in the left seat pad.

8. The method of claim 1, wherein:
the adjusting of the right seat pad comprises:
sliding a right side fastener along a right arm slot section in a right arm slot in a right arm of the support frame to translate the right seat pad; and
rotating the right seat pad around the right side fastener to rotate the right seat pad;
the adjusting of the left seat pad comprises:
sliding a left side fastener along a left arm slot section in a left arm slot in a left arm of the support frame to translate the left seat pad; and
rotating the left seat pad around the left side fastener to rotate the left seat pad.

* * * * *